US009866417B2

(12) United States Patent
Guo et al.

(10) Patent No.: US 9,866,417 B2
(45) Date of Patent: Jan. 9, 2018

(54) TRANSMISSION METHOD OF DEMODULATION REFERENCE SIGNAL, BASE STATION AND USER EQUIPMENT

(71) Applicant: ZTE Corporation, Shenzhen (CN)

(72) Inventors: Senbao Guo, Shenzhen (CN); Yunfeng Sun, Shenzhen (CN); Zhisong Zuo, Shenzhen (CN); Wenfeng Zhang, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 130 days.

(21) Appl. No.: 14/769,167

(22) PCT Filed: Dec. 31, 2013

(86) PCT No.: PCT/CN2013/091074
§ 371 (c)(1),
(2) Date: Aug. 20, 2015

(87) PCT Pub. No.: WO2014/127676
PCT Pub. Date: Aug. 28, 2014

(65) Prior Publication Data
US 2015/0381395 A1 Dec. 31, 2015

(30) Foreign Application Priority Data
Feb. 22, 2013 (CN) .......................... 2013 1 0057668

(51) Int. Cl.
H04L 27/26 (2006.01)
H04L 5/00 (2006.01)
H04L 5/22 (2006.01)

(52) U.S. Cl.
CPC ........ H04L 27/2607 (2013.01); H04L 5/0014 (2013.01); H04L 5/0051 (2013.01); H04L 5/22 (2013.01)

(58) Field of Classification Search
None
See application file for complete search history.

(56) References Cited

U.S. PATENT DOCUMENTS

2011/0194551 A1* 8/2011 Lee ...................... H04B 7/0626
370/342
2011/0228735 A1* 9/2011 Lee, II .................. H04L 5/0051
370/329

(Continued)

FOREIGN PATENT DOCUMENTS

CN 102843325 A 12/2012
CN 102857458 A 1/2013

(Continued)

OTHER PUBLICATIONS

Supplementary European Search Report of EP 13876079, dated Jan. 7, 2016.

(Continued)

Primary Examiner — Diane Lo
(74) Attorney, Agent, or Firm — Banner & Witcoff, Ltd.

(57) ABSTRACT

Disclosed are a method for transmitting a demodulation reference signal (DMRS), a base station and a user equipment, related to the LTE Advanced system. The method for transmitting the DMRS disclosed in the present document includes: a base station transmitting a plurality of demodulation reference signal (DMRS) ports through frequency division multiplexing (FDM) and/or code division multiplexing (CDM) and/or time division multiplexing (TDM). The embodiment of the present invention further discloses a base station and a user equipment. The technical scheme of the present application greatly boosts the DMRS demodulation performance, especially taking into account its use in the 256QAM modulation method in future, balances interpolation performance of various PRB Pairs in one sub- (Continued)

frame, and it avoids a collision between a DMRS and a RCRS, a PSS/SSS as well as a CSI-RS.

20 Claims, 31 Drawing Sheets

(56) References Cited

U.S. PATENT DOCUMENTS

| | | | |
|---|---|---|---|
| 2011/0292847 A1* | 12/2011 | Yoon | H04L 5/0007 370/280 |
| 2013/0039291 A1 | 2/2013 | Blankenship et al. | |
| 2013/0265980 A1* | 10/2013 | Zhu | H04L 1/06 370/329 |
| 2014/0112287 A1 | 4/2014 | Chun et al. | |
| 2014/0293944 A1* | 10/2014 | Kim | H04W 72/042 370/329 |
| 2015/0263839 A1* | 9/2015 | He | H04L 27/2657 370/329 |

FOREIGN PATENT DOCUMENTS

| | | |
|---|---|---|
| CN | 102857459 A | 1/2013 |
| CN | 102868430 A | 1/2013 |
| WO | 2012177047 A2 | 12/2012 |

OTHER PUBLICATIONS

International Search Report of PCT/CN2013/091074, dated Apr. 3, 2014.

* cited by examiner

TRANSMISSION METHOD OF DEMODULATION REFERENCE SIGNAL, BASE STATION AND USER EQUIPMENT

TECHNICAL FIELD

The present document relates to the Long Term Evolution Advanced System (called as LTE-Advanced), and more particularly, to a method for transmitting a demodulation reference signal and device in the LTE-Advanced.

BACKGROUND OF THE RELATED ART

In the LTE Release R8/R9, the CRS (Common Reference Signal) is designed in order to measure channel quality and demodulate received data symbols, and a UE (User Equipment) can perform a channel measurement through the CRS to determine that the UE reselects a cell and switches to the target cell, and it measures the channel quality in the UE connected state, and when the interference level is relatively high, the physical layer cuts off the connection through a high-layer related wireless link connection failure signaling. In order to further improve the average spectrum utilization rate of a cell, the cell-edge spectrum utilization rate and throughput of each UE, the LTE R10 defines two reference signals respectively: CSI-RS (channel information reference signal) and DMRS (demodulation reference signal), wherein the CSI-RS is used for the channel measurement, and PMI (Precoding Matrix Indicator), CQI (Channel Quality Indicator) and RI (Rank Indicator) which the UE needs to feed back to the eNB can be calculated by measuring the CSI-RS. The DMRS can be used to make the UE transparently receive downlink data without having to know an appropriate precoding weight of the base station side, thus reducing the restrictions of a codebook on the weight at the same time of reducing the PDCCH load. In addition, the DMRS is used to support dynamically and transparently switching between the SU-MIMO and the MU-MIMO, support an interference estimation using the DMRS, which can greatly improve the interference cancellation performance of the receiving side.

New types of carriers are introduced in the late R11, and the newly introduced types of carriers mainly use the ePDCCH for transmitting control channels, so that the R10 is not compatible with the control channel region of the carriers. When originally designing the reference signal, it mainly considers using the first four OFDM symbols for the control channel region, and the first four OFDM symbols are not suitable for placing various reference signals (except of the CRS which is used for demodulating the PDCCH). For the DMRS enhancement, due to the restrictions of the control channel in design, it may affect the demodulation performance of the DMRS. In addition, because the PSS/SSS needs to be transmitted in the NCT sub-frame, in order to avoid a collision between the DMRS and the PSS/SSS, the enhancement design of the DMRS is required.

SUMMARY OF THE INVENTION

To solve the technical problem, the present document provides a method for transmitting a demodulation reference signal, a base station and a user equipment to avoid a collision between a DMRS and a PSS/SSS.

To solve the abovementioned technical problem, the present document discloses a method for transmitting a demodulation reference signal, comprising:

a base station transmitting a plurality of demodulation reference signal (DMRS) ports through frequency division multiplexing (FDM) and/or code division multiplexing (CDM) and/or time division multiplexing (TDM).

Preferably, in the abovementioned method, the base station transmits the DMRS in at least one OFDM group, wherein OFDM symbols x1~xn constitute one OFDM symbol group {x1, x2, . . . xn}, xn<14, 0<n<5, and xn and n are integers.

Preferably, in the abovementioned method, when a cyclic prefix (CP) has a normal cyclic prefix length, the base station transmits at least one of the following DMRS ports in the $\{0^{th}, 1^{st}, 5^{th}, 6^{th}, 10^{th}, 11^{th}\}$ subcarriers of the OFDM symbol group {0, 12}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group {1, 13}:

DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group {0, 9}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group {1, 10}:

DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group {0, 8}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group {1, 9}:

DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group {0, 7}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group {1, 8}:

DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group {0, 5}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group {1, 6}:

DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol {0}:

DMRS port 7, DMRS port 8, DMRS port 11 and DMRS port 13;

it transmits at least one of the following DMRS ports in the $\{0^{th}, 1^{st}, 5^{th}, 6^{th}, 10^{th}, 11^{th}\}$ subcarriers of the OFDM symbol {1}:

DMRS port 9, DMRS port 10, DMRS port 12 and DMRS port 14.

Preferably, in the abovementioned method, when the CP has a normal cyclic prefix length, the base station transmits at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 13\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of OFDM symbol group $\{1, 9\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 10\}$:
DMRS port 9, DMRS port 10, DMRS port 12 and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 9\}$:
DMRS port 9, DMRS port 10, DMRS port 12 and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol $\{2\}$:
DMRS port 9, DMRS port 10, DMRS port 12 and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7 and DMRS port 8.

Preferably, in the abovementioned method, when the CP has a normal cyclic prefix length, the base station transmits at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 13\}$:
DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12 and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 9\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 6\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol $\{3\}$:
DMRS port 9, DMRS port 10, DMRS port 12 and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7 and DMRS port 8.

Preferably, in the abovementioned method, when the CP has a normal cyclic prefix length, the base station transmits at least one of the following DMRS ports in the {$0^{th}$, $1^{st}$, $5^{th}$, $6^{th}$, $10^{th}$, $11^{th}$} subcarriers of the OFDM symbol group {1, 11}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  DMRS port 9, DMRS port 10, DMRS port 12 and DMRS port 14.

Preferably, in the abovementioned method, when the CP has a normal cyclic prefix length, the base station transmits at least one of the following DMRS ports in the {$0^{th}$, $1^{st}$, $5^{th}$, $6^{th}$, $10^{th}$, $11^{th}$} subcarriers of the OFDM symbol group {1, 10}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  DMRS port 9, DMRS port 10, DMRS port 12 and DMRS port 14; or
  it transmits at least one of the following DMRS ports in the {$0^{th}$, $1^{st}$, $5^{th}$, $6^{th}$, $10^{th}$, $11^{th}$} subcarriers of the OFDM symbol group {1, 8}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 10}:
  DMRS port 9, DMRS port 10, DMRS port 12 and DMRS port 14; or
  it transmits at least one of the following DMRS ports in the {$0^{th}$, $1^{st}$, $5^{th}$, $6^{th}$, $10^{th}$, $11^{th}$} subcarriers of the OFDM symbol group {1, 6}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 8}:
  DMRS port 9, DMRS port 10, DMRS port 12 and DMRS port 14.

Preferably, in the abovementioned method, when the CP has a normal cyclic prefix length, the base station transmits at least one of the following DMRS ports in the {$0^{th}$, $1^{st}$, $5^{th}$, $6^{th}$, $10^{th}$, $11^{th}$} subcarriers of the OFDM symbol group {1, 11}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {2, 12}:
  DMRS port 9, DMRS port 10, DMRS port 12 and DMRS port 14;
  or,
  it transmits at least one of the following DMRS ports in the {$0^{th}$, $1^{st}$, $5^{th}$, $6^{th}$, $10^{th}$, $11^{th}$} subcarriers of the OFDM symbol group {3, 11}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {4, 12}:
  DMRS port 9, DMRS port 10, DMRS port 12 and DMRS port 14;
  or, it transmits at least one of the following DMRS ports in the {$0^{th}$, $1^{st}$, $5^{th}$, $6^{th}$, $10^{th}$, $11^{th}$} subcarriers of the OFDM symbol group {1, 9}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  DMRS port 9, DMRS port 10, DMRS port 12 and DMRS port 14;
  or, it transmits at least one of the following DMRS ports in the {$0^{th}$, $1^{st}$, $5^{th}$, $6^{th}$, $10^{th}$, $11^{th}$} subcarriers of the OFDM symbol group {1, 9}:
  DMRS port 9, DMRS port 10, DMRS port 12 and DMRS port 14;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  or, it transmits at least one of the following DMRS ports in the {$0^{th}$, $1^{st}$, $5^{th}$, $6^{th}$, $10^{th}$, $11^{th}$} subcarriers of the OFDM symbol group {1, 8}:
  DMRS port 7, DMRS port 8, DMRS port 11 and DMRS port 13;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  DMRS port 9, DMRS port 10, DMRS port 12 and DMRS port 14;
  or, it transmits at least one of the following DMRS ports in the {$0^{th}$, $1^{st}$, $5^{th}$, $6^{th}$, $10^{th}$, $11^{th}$} subcarriers of the OFDM symbol group {1, 8}:
  DMRS port 9, DMRS port 10, DMRS port 12 and DMRS port 14;
  it transmits at least one of the following DMRS ports in the {$0^{th}$, $1^{st}$, $5^{th}$, $6^{th}$, $10^{th}$, $11^{th}$} subcarriers of the OFDM symbol group {3, 12}:
  DMRS port 7, DMRS port 8, DMRS port 11 and DMRS port 13.

Preferably, in the abovementioned method, when the base station uses one layer to transmit data, the DMRS port 7 or port 8 is transmitted in corresponding subcarriers of a corresponding OFDM symbol;
  when the base station uses two layers to transmit data, the DMRS port 7 and port 8 are transmitted in corresponding subcarriers of a corresponding OFDM symbol, and two consecutive subcarriers of the same OFDM symbol use a CDM method to multiplex two DMRS ports, wherein orthogonal masks can be [1, 1] and [1, −1];
  when the base station uses three layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein orthogonal masks can be [1, 1] and [1, −1]; and the port 9 is transmitted in a corresponding subcarrier of a corresponding OFDM symbol;
  when the base station uses four layers to transmit data, the DMRS port 7, port 8, port 9 and port 10 are transmitted in corresponding subcarriers of corresponding OFDM symbols, two consecutive subcarriers of the same OFDM symbol use the CDM method to multiplex two DMRS ports, wherein orthogonal masks can be [1, 1] and [1, −1];
  when the base station uses five layers to transmit data, the DMRS port 7, port 8 and port 11 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein orthogonal masks are any three of [1, 1, 1, 1], [1, 1, −1, −1], [1, −1, −1, 1] and [1, −1, 1, −1], and the DMRS ports 9 and 10 are transmitted in corresponding subcarriers of a corresponding OFDM symbol, and two consecutive subcarriers of the same OFDM symbol use the CDM method to multiplex two DMRS ports, wherein the orthogonal masks can be [1, 1] and [1, −1];

when the base station uses six layers to transmit data, the DMRS port 7, port 8 and port 11 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses seven layers to transmit data, the DMRS port 7, port 8, port 11 and port 13 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses eight layers to transmit data, the DMRS port 7, port 8, port 11 and port 13 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10, port 12 and port 14 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1]

Preferably, in the abovementioned method, when the CP has a normal cyclic prefix length, the base station transmits at least one of the following DMRS ports in the $\{1^{st}, 6^{th}, 11^{th}\}$ subcarriers of the OFDM symbol group $\{1, 3, 11, 12\}$:

DMRS ports 7, 8, 11 and 13;
it transmits at least one of the following DMRS ports in the $\{0^{th}, 5^{th}, 10^{th}\}$ subcarriers of the OFDM symbol group $\{1, 3, 11, 12\}$:
DMRS port 9, DMRS port 10, DMRS port 12 and DMRS port 14; or
it transmits at least one of the following DMRS ports in the $\{1^{st}, 6^{th}, 11^{th}\}$ subcarriers of the OFDM symbol group $\{1, 3, 9, 10\}$:
DMRS port 7, DMRS port 8, DMRS port 11 and DMRS port 13;
it transmits at least one of the following DMRS ports in the $\{0^{th}, 5^{th}, 10^{th}\}$ subcarriers of the OFDM symbol group $\{1, 3, 9, 10\}$:
DMRS port 9, DMRS port 10, DMRS port 12 and DMRS port 14; or,
it transmits at least one of the following DMRS ports in the $\{1^{st}, 6^{th}, 11^{th}\}$ subcarriers of the OFDM symbol group $\{1, 3, 8, 9\}$:
DMRS port 7, DMRS port 8, DMRS port 11 and DMRS port 13;
it transmits at least one of the following DMRS ports in the $\{0^{th}, 5^{th}, 10^{th}\}$ subcarriers of the OFDM symbol group $\{1, 3, 8, 9\}$:
DMRS port 9, DMRS port 10, DMRS port 12 and DMRS port 14; or,
it transmits at least one of the following DMRS ports in the $\{1^{st}, 6^{th}, 11^{th}\}$ subcarriers of the OFDM symbol group $\{1, 3, 7, 8\}$:
DMRS port 7, DMRS port 8, DMRS port 11 and DMRS port 13;
it transmits at least one of the following DMRS ports in the $\{0^{th}, 5^{th}, 10^{th}\}$ subcarriers of the OFDM symbol group $\{1, 3, 7, 8\}$:
DMRS port 9, DMRS port 10, DMRS port 12 and DMRS port 14; or
it transmits at least one of the following DMRS ports in the $\{1^{st}, 6^{th}, 11^{th}\}$ subcarriers of the OFDM symbol group $\{1, 3, 5, 6\}$:
DMRS port 7, DMRS port 8, DMRS port 11 and DMRS port 13;
it transmits at least one of the following DMRS ports in the $\{0^{th}, 5^{th}, 10^{th}\}$ subcarriers of the OFDM symbol group $\{1, 3, 5, 6\}$:
DMRS port 9, DMRS port 10, DMRS port 12 and DMRS port 14; or
it transmits at least one of the following DMRS ports in the $\{1^{st}, 6^{th}, 11^{th}\}$ subcarriers of the OFDM symbol group $\{1, 3\}$:
DMRS port 7, DMRS port 8, DMRS port 11 and DMRS port 13;
it transmits at least one of the following DMRS ports in the $\{0^{th}, 5^{th}, 10^{th}\}$ subcarriers of the OFDM symbol group $\{1, 3\}$:
DMRS port 9, DMRS port 10, DMRS port 12 and DMRS port 14.

Preferably, in the abovementioned method, when the CP has a normal cyclic prefix length, the base station transmits at least one of the following DMRS ports in the $\{1^{st}, 6^{th}, 11^{th}\}$ subcarriers of the OFDM symbol group $\{1, 3, 10, 12\}$:
DMRS port 7, DMRS port 8, DMRS port 11 and DMRS port 13;

it transmits at least one of the following DMRS ports in the {0$^{th}$, 5$^{th}$, 10$^{th}$} subcarriers of the OFDM symbol group {1, 3, 10, 12}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {1, 3, 8, 10}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {1, 3, 8, 10}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {1, 3, 6, 8}:
DMRS port 7, DMRS port 8, DMRS port 11 and DMRS port 13;
it transmits at least one of the following DMRS ports in the {0$^{th}$, 5$^{th}$, 10$^{th}$} subcarriers of OFDM symbol group {1, 3, 6, 8}:
DMRS port 9, DMRS port 10, DMRS port 12 and DMRS port 14.

Preferably, in the abovementioned method, when the CP has a normal cyclic prefix length, the base station transmits at least one of the following DMRS ports in the {1$^{st}$, 6$^{th}$, 11$^{th}$} subcarriers of the OFDM symbol group {3, 4, 11, 12}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {3, 4, 11, 12}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {3, 4, 10, 11}:
DMRS port 7, DMRS port 8, DMRS port 11 and DMRS port 13;
it transmits at least one of the following DMRS ports in the {0$^{th}$, 5$^{th}$, 10$^{th}$} subcarriers of OFDM symbol group {3, 4, 10, 11}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {3, 4, 9, 10}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {3, 4, 9, 10}:
DMRS port 9, DMRS port 10, DMRS port 12 and DMRS port 14; or
it transmits at least one of the following DMRS ports in the {1$^{st}$, 6$^{th}$, 11$^{th}$} subcarriers of the OFDM symbol group {3, 4, 8, 9}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {3, 4, 8, 9}:
DMRS port 9, DMRS port 10, DMRS port 12 and DMRS port 14; or it transmits at least one of the following DMRS ports in the {1$^{st}$, 6$^{th}$, 11$^{th}$} subcarriers of the OFDM symbol group {3, 4}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {3, 4}:
DMRS port 9, DMRS port 10, DMRS port 12 and DMRS port 14.

Preferably, in the abovementioned method, when the CP has a normal cyclic prefix length, the base station transmits at least one of the following DMRS ports in the {1$^{st}$, 6$^{th}$, 11$^{th}$} subcarriers of the OFDM symbol group {2, 3, 11, 12}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {2, 3, 11, 12}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {1, 2, 11, 12}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {1, 2, 11, 12}:
DMRS port 9, DMRS port 10, DMRS port 12 and DMRS port 14; or,
it transmits at least one of the following DMRS ports in the {1$^{st}$, 6$^{th}$, 11$^{th}$} subcarriers of the OFDM symbol group {1, 2, 12, 13}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {1, 2, 12, 13}:
DMRS port 9, DMRS port 10, DMRS port 12 and DMRS port 14;
or, it transmits at least one of the following DMRS ports in the {1$^{st}$, 6$^{th}$, 11$^{th}$} subcarriers of the OFDM symbol group {0, 1, 12, 13}:
DMRS port 7, DMRS port 8, DMRS port 11 and DMRS port 13;
it transmits at least one of the following DMRS ports in the {0$^{th}$, 5$^{th}$, 10$^{th}$} subcarriers of the OFDM symbol group {0, 1, 12, 13}:
DMRS port 9, DMRS port 10, DMRS port 12 and DMRS port 14.

Preferably, in the abovementioned method, when the base station uses one layer to transmit data, the DMRS port 7 or port 8 is transmitted in a corresponding subcarrier resource element of a corresponding OFDM symbol;
when the base station uses two layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein orthogonal masks can be [1, 1] and [1, −1];
when the base station uses three layers to transmit data, the DMRS port 7 and port 8 are transmitted in corresponding subcarriers of a corresponding OFDM symbol, and two resource elements of the same subcarriers of two consecutive OFDM symbols or two closest adjacent OFDM symbols use the CDM method to multiplex two DMRS ports, wherein the orthogonal masks can be [1,1] and [1, −1]; the port 9 is transmitted in a corresponding subcarrier resource element of a corresponding OFDM symbol;

when the base station uses four layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1,1] and [1, −1]; the DMRS port 9 and port 10 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1];

when the base station uses five layers to transmit data, the DMRS port 7, port 8 and port 11 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are transmitted in corresponding subcarriers of corresponding OFDM symbols, the same subcarrier of two consecutive OFDM symbols or two closest adjacent OFDM symbols uses the CDM method to multiplex two DMRS ports, wherein the orthogonal masks are [1, 1] and [1, −1];

when the base station uses six layers to transmit data, the DMRS port 7, port 8 and port 11 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses seven layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses eight layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10, port 12 and port 14 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned method, when the CP has an extended cyclic prefix length, the base station transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{8, 9\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or it transmits at least one of the DMRS ports 7 and 8 in the $\{1^{st}, 4^{th}, 7^{th}, 10^{th}\}$ subcarriers of the OFDM symbol group $\{0, 1\}$;

it transmits at least one of the DMRS ports 7 and 8 in the $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10, 11\}$.

Preferably, in the abovementioned method, when the base station uses one layer to transmit data, the DMRS port 7 or port 8 is transmitted in a corresponding subcarrier resource element of a corresponding OFDM symbol;

when the base station uses two layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1,1] and [1, −1].

Preferably, in the abovementioned method, when the CP has an extended cyclic prefix length, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 7\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 6\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 3\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$;

it transmits at least one of the DMRS ports 7 and 8 in the $\{1^{st}, 4^{th}, 7^{th}, 10^{th}\}$ subcarriers of the OFDM symbol group $\{1, 4\}$ and the $\{2^{nd}, 5^{th}, 8^{th}, 11^{th}\}$ subcarriers of the OFDM symbol group $\{8, 10\}$.

Preferably, in the abovementioned method, when the base station uses one layer to transmit data, the DMRS port 7 or port 8 is transmitted in a corresponding subcarrier of a corresponding OFDM symbol;

when the base station uses two layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein the orthogonal masks are [1,1] and [1, −1].

The present document further discloses a method for transmitting a demodulation reference signal, comprising:

a user equipment receiving a plurality of demodulation reference signal (DMRS) ports through frequency division multiplexing (FDM) and/or code division multiplexing (CDM) and/or time division multiplexing (TDM).

Preferably, in the abovementioned method, the user equipment receives the DMRS in at least one OFDM group, wherein OFDM symbols x1~xn constitute one OFDM symbol group $\{x1, x2, \ldots xn\}$, xn<14, 0<n<5, and xn and n are integers.

Preferably, in the abovementioned method, when a cyclic prefix (CP) has a normal cyclic prefix length, the user equipment receives at least one of the following DMRS ports in the $\{0^{th}, 1^{st}, 5^{th}, 6^{th}, 10^{th}, 11^{th}\}$ subcarriers of the OFDM symbol group $\{0, 12\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 13\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 9\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 10\}$:

DMRS port 9, DMRS port 10, DMRS port 12 and DMRS port 14; or, it receives at least one of the following DMRS ports in the $\{0^{th}, 1^{st}, 5^{th}, 6^{th}, 10^{th}, 11^{th}\}$ subcarriers of the OFDM symbol group $\{0, 8\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 7\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 5\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 6\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1\}$:

DMRS port 9, DMRS port 10, DMRS port 12 and DMRS port 14.

Preferably, in the abovementioned method, when the CP has a normal cyclic prefix length, the user equipment receives at least one of the following DMRS ports in the $\{0^{th}, 1^{st}, 5^{th}, 6^{th}, 10^{th}, 11^{th}\}$ subcarrier of the OFDM symbol group $\{1, 12\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{2, 13\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{2, 10\}$:

DMRS port 9, DMRS port 10, DMRS port 12 and DMRS port 14; or, it receives at least one of the following DMRS ports in the $\{0^{th}, 1^{st}, 5^{th}, 6^{th}, 10^{th}, 11^{th}\}$ subcarriers of OFDM symbol group $\{1, 8\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{2, 9\}$:

DMRS port 9, DMRS port 10, DMRS port 12 and DMRS port 14; or, it receives at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol $\{2\}$:
DMRS port 9, DMRS port 10, DMRS port 12 and DMRS port 14; or,
it receives at least one of DMRS port 7 and DMRS port 8 in the $\{0^{th}, 1^{st}, 5^{th}, 6^{th}, 10^{th}, 11^{th}\}$ subcarriers of the OFDM symbol $\{1\}$.

Preferably, in the abovementioned method, when the CP has a normal cyclic prefix length, the user equipment receives at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarrier of the OFDM symbol group $\{3, 13\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12 and DMRS port 14; or,
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 9\}$:
DMRS port 9, DMRS port 10, DMRS port 12 and DMRS port 14; or, it receives at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 6\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol $\{1\}$:
it receives at least one of the following DMRS ports in the $\{0^{th}, 1^{st}, 5^{th}, 6^{th}, 10^{th}, 11^{th}\}$ subcarriers of the OFDM symbol $\{3\}$:
DMRS port 9, DMRS port 10, DMRS port 12 and DMRS port 14; or,
it receives at least one of the DMRS port 7 and the DMRS port 8 in the $\{0^{th}, 1^{st}, 5^{th}, 6^{th}, 10^{th}, 11^{th}\}$ subcarriers of the OFDM symbol $\{1\}$.

Preferably, in the abovementioned method, when the CP has a normal cyclic prefix length, the user equipment receives at least one of the following DMRS ports in the $\{0^{th}, 1^{st}, 5^{th}, 6^{th}, 10^{th}, 11^{th}\}$ subcarriers of the OFDM symbol group $\{1, 11\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12 and DMRS port 14.

Preferably, in the abovementioned method, when the CP has a normal cyclic prefix length, the user equipment receives at least one of the following DMRS ports in the $\{0^{th}, 1^{st}, 5^{th}, 6^{th}, 10^{th}, 11^{th}\}$ subcarriers of the OFDM symbol group $\{1, 10\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12 and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12 and DMRS port 14; or it receives at least one of the following DMRS ports in the {0th, 1st, 5th, 6th, 10th, 11th} subcarriers of the OFDM symbol group {1, 6}:
DMRS port 7, DMRS port 8, DMRS port 11 and DMRS port 13;
it receives at least one of the following DMRS ports in the {0th, 1st, 5th, 6th, 10th, 11th} subcarriers of the OFDM symbol group {3, 8}:
DMRS port 9, DMRS port 10, DMRS port 12 and DMRS port 14.

Preferably, in the abovementioned method, when the CP has a normal cyclic prefix length, the user equipment receives at least one of the following DMRS ports in the {0th, 1st, 5th, 6th, 10th, 11th} subcarriers of the OFDM symbol group {1, 11}:
DMRS port 7, DMRS port 8, DMRS port 11 and DMRS port 13;
it receives at least one of the following DMRS ports in the {0th, 1st, 5th, 6th, 10th, 11th} subcarriers of the OFDM symbol group {2, 12}:
DMRS port 9, DMRS port 10, DMRS port 12 and DMRS port 14;
or, it receives at least one of the following DMRS ports in the {0th, 1st, 5th, 6th, 10th, 11th} subcarriers of the OFDM symbol group {3, 11}:
DMRS port 7, DMRS port 8, DMRS port 11 and DMRS port 13;
it receives at least one of the following DMRS ports in the {0th, 1st, 5th, 6th, 10th, 11th} subcarriers of the OFDM symbol group {4, 12}:
DMRS port 9, DMRS port 10, DMRS port 12 and DMRS port 14;
or, it receives at least one of the following DMRS ports in the {0th, 1st, 5th, 6th, 10th, 11th} subcarriers of the OFDM symbol group {1, 9}:
DMRS port 7, DMRS port 8, DMRS port 11 and DMRS port 13;
it receives at least one of the following DMRS ports in the {0th, 1st, 5th, 6th, 10th, 11th} subcarriers of the OFDM symbol group {3, 12}:
DMRS port 9, DMRS port 10, DMRS port 12 and DMRS port 14;
or, it receives at least one of the following DMRS ports in the {0th, 1st, 5th, 6th, 10th, 11th} subcarriers of the OFDM symbol group {1, 9}:
DMRS port 9, DMRS port 10, DMRS port 12 and DMRS port 14;
it receives at least one of the following DMRS ports in the {0th, 1st, 5th, 6th, 10th, 11th} subcarriers of the OFDM symbol group {3, 12}:
DMRS port 7, DMRS port 8, DMRS port 11 and DMRS port 13;
or, it receives at least one of the following DMRS ports in the {0th, 1st, 5th, 6th, 10th, 11th} subcarriers of the OFDM symbol group {1, 8}:
DMRS port 7, DMRS port 8, DMRS port 11 and DMRS port 13;
it receives at least one of the following DMRS ports in the {0th, 1st, 5th, 6th, 10th, 11th} subcarriers of the OFDM symbol group {3, 12}:
DMRS port 9, DMRS port 10, DMRS port 12 and DMRS port 14;
or, it receives at least one of the following DMRS ports in the {0th, 1st, 5th, 6th, 10th, 11th} subcarriers of the OFDM symbol group {1, 8}:
DMRS port 9, DMRS port 10, DMRS port 12 and DMRS port 14;
it receives at least one of the following DMRS ports in the {0th, 1st, 5th, 6th, 10th, 11th} subcarriers of the OFDM symbol group {3, 12}:
DMRS port 7, DMRS port 8, DMRS port 11 and DMRS port 13.

Preferably, in the abovementioned method, when the user equipment uses one layer to receive data, the DMRS port 7 or port 8 is received in a corresponding subcarrier of a corresponding OFDM symbol;

when the user equipment uses two layers to receives data, the DMRS port 7 and port 8 are received in corresponding subcarriers of a corresponding OFDM symbol, and two consecutive subcarriers of the same OFDM symbol use the CDM method to multiplex two DMRS ports, wherein orthogonal masks are [1,1] and [1, −1];

when the user equipment uses three layers to receives data, the DMRS port 7 and port 8 are received in corresponding subcarriers of corresponding OFDM symbols, and two consecutive subcarriers of the same OFDM symbol use the CDM method to multiplex two DMRS ports, wherein the orthogonal masks can be [1,1] and [1, −1], and the port 9 is received in a corresponding subcarrier of a corresponding OFDM symbol;

when the user equipment uses four layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1]; the DMRS port 9 and port 10 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1];

when the user equipment uses five layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the ports 9 and 10 are received in corresponding subcarriers of a corresponding OFDM symbol, and two consecutive subcarriers of the same OFDM symbol use the CDM method to multiplex two DMRS ports, wherein the orthogonal masks can be [1, 1] and [1, −1];

when the user equipment uses six layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are [1, 1, 1, 1], [1, 1, −1, −1], [1, −1, −1, 1] and [1, −1, 1, −1], and the port 9, port 10 and port 12 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses seven layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the port 9, port 10 and port 12 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses eight layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the port 9, port 10, port 12 and port 14 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned method, when the CP has a normal cyclic prefix length, the user equipment receives at least one of the following DMRS ports in the $\{1^{st}, 6^{th}, 11^{th}\}$ subcarriers of the OFDM symbol group $\{1, 3, 11, 12\}$:

DMRS port 7, DMRS port 8, DMRS port 11 and DMRS port 13;

it receives at least one of the following DMRS ports in the $\{0^{th}, 5^{th}, 10^{th}\}$ subcarriers of OFDM symbol group $\{1, 3, 11, 12\}$:

DMRS port 9, DMRS port 10, DMRS port 12 and DMRS port 14; or it receives at least one of the following DMRS ports in the $\{1^{st}, 6^{th}, 11^{th}\}$ subcarriers of the OFDM symbol group $\{1, 3, 9, 10\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 9, 10\}$:

DMRS port 9, DMRS port 10, DMRS port 12 and DMRS port 14; or, it receives at least one of the following DMRS ports in the $\{1^{st}, 6^{th}, 11^{th}\}$ subcarriers of the OFDM symbol group $\{1, 3, 8, 9\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 8, 9\}$:

DMRS port 9, DMRS port 10, DMRS port 12 and DMRS port 14; or, it receives at least one of the following DMRS ports in the $\{1^{st}, 6^{th}, 11^{th}\}$ subcarriers of the OFDM symbol group $\{1, 3, 7, 8\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 7, 8\}$:

DMRS port 9, DMRS port 10, DMRS port 12 and DMRS port 14; or it receives at least one of the following DMRS ports in the $\{1^{st}, 6^{th}, 11^{th}\}$ subcarriers of the OFDM symbol group $\{1, 3, 5, 6\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 5, 6\}$:

DMRS port 9, DMRS port 10, DMRS port 12 and DMRS port 14; or it receives at least one of the following DMRS ports in the $\{1^{st}, 6^{th}, 11^{th}\}$ subcarriers of the OFDM symbol group $\{1, 3\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3\}$:

DMRS port 9, DMRS port 10, DMRS port 12 and DMRS port 14.

Preferably, in the abovementioned method, when the CP has a normal cyclic prefix length, the user equipment receives at least one of the following DMRS ports in the $\{1^{st}, 6^{th}, 11^{th}\}$ subcarriers of the OFDM symbol group $\{1, 3, 10, 12\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 10, 12\}$:

DMRS port 9, DMRS port 10, DMRS port 12 and DMRS port 14; or, it receives at least one of the following DMRS ports in the $\{1^{st}, 6^{th}, 11^{th}\}$ subcarriers of the OFDM symbol group $\{1, 3, 8, 10\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 8, 10\}$:

DMRS port 9, DMRS port 10, DMRS port 12 and DMRS port 14; or, it receives at least one of the following DMRS ports in the $\{1^{st}, 6^{th}, 11^{th}\}$ subcarriers of the OFDM symbol group $\{1, 3, 6, 8\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 6, 8\}$:

DMRS port 9, DMRS port 10, DMRS port 12 and DMRS port 14.

Preferably, in the abovementioned method, when the CP has a normal cyclic prefix length, the user equipment receives at least one of the following DMRS ports in the $\{1^{st}, 6^{th}, 11^{th}\}$ subcarriers of the OFDM symbol group $\{3, 4, 11, 12\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{3, 4, 11, 12\}$:
  DMRS port 9, DMRS port 10, DMRS port 12 and DMRS port 14; or,
  it receives at least one of the following DMRS ports in the $\{1^{st}, 6^{th}, 11^{th}\}$ subcarriers of the OFDM symbol group $\{3, 4, 10, 11\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{3, 4, 10, 11\}$:
  DMRS port 9, DMRS port 10, DMRS port 12 and DMRS port 14; or,
  it receives at least one of the following DMRS ports in the $\{1^{st}, 6^{th}, 11^{th}\}$ subcarriers of the OFDM symbol group $\{3, 4, 9, 10\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{3, 4, 9, 10\}$:
  DMRS port 9, DMRS port 10, DMRS port 12 and DMRS port 14; or,
  it receives at least one of the following DMRS ports in the $\{1^{st}, 6^{th}, 11^{th}\}$ subcarriers of the OFDM symbol group $\{3, 4, 8, 9\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{3, 4, 8, 9\}$:
  DMRS port 9, DMRS port 10, DMRS port 12 and DMRS port 14;
  it receives at least one of the following DMRS ports in the $\{1^{st}, 6^{th}, 11^{th}\}$ subcarriers of the OFDM symbol group $\{3, 4\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{3, 4\}$:
  DMRS port 9, DMRS port 10, DMRS port 12 and DMRS port 14.

Preferably, in the abovementioned method, when the CP has a normal cyclic prefix length, the user equipment receives at least one of the following DMRS ports in the $\{1^{st}, 6^{th}, 11^{th}\}$ subcarriers of the OFDM symbol group $\{2, 3, 11, 12\}$:
  it receives at least one of the following DMRS ports in the $\{0^{th}, 5^{th}, 10^{th}\}$ subcarriers of the OFDM symbol group $\{2, 3, 11, 12\}$:
  DMRS port 9, DMRS port 10, DMRS port 12 and DMRS port 14; or,
  it receives at least one of the following DMRS ports in the $\{1^{st}, 6^{th}, 11^{th}\}$ subcarriers of the OFDM symbol group $\{1, 2, 11, 12\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{1, 2, 11, 12\}$:
  DMRS port 9, DMRS port 10, DMRS port 12 and DMRS port 14; or,
  it receives at least one of the following DMRS ports in the $\{1^{st}, 6^{th}, 11^{th}\}$ subcarriers of the OFDM symbol group $\{1, 2, 12, 13\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{1, 2, 12, 13\}$:
  DMRS port 9, DMRS port 10, DMRS port 12 and DMRS port 14;
  or, it receives at least one of the following DMRS ports in the $\{1^{st}, 6^{th}, 11^{th}\}$ subcarriers of the OFDM symbol group $\{0, 1, 12, 13\}$:
  DMRS port 7, DMRS port 8, DMRS port 11 and DMRS port 13;
  it receives at least one of the following DMRS ports in the $\{0^{th}, 5^{th}, 10^{th}\}$ subcarriers of the OFDM symbol group $\{0, 1, 12, 13\}$:
  DMRS port 9, DMRS port 10, DMRS port 12 and DMRS port 14.

Preferably, in the abovementioned method, when the user equipment uses one layer to receive data, the DMRS port 7 or port 8 is received in a corresponding subcarrier resource element of a corresponding OFDM symbol;
  when the user equipment uses two layers to receive data, the DMRS port 7 and port 8 are received in corresponding subcarriers of a corresponding OFDM symbol, and two resource elements of the same subcarriers of two consecutive OFDM symbols or two closest adjacent OFDM symbols use the CDM method to multiplex two DMRS ports, wherein the orthogonal masks are [1, 1] and [1, −1];
  when the user equipment use three layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1]; the port 9 is received in a corresponding subcarrier resource element of a corresponding OFDM symbol;
  when the user equipment uses four layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1]; the DMRS port 9 and port 10 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1];
  when the user equipment uses five layers to receive data, the DMRS port 7, port 8 and port 11 are received in corresponding subcarriers of corresponding OFDM symbols, a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the ports 9 and 10 are received in corresponding subcarriers of corresponding OFDM symbols, and the same subcarriers of two consecutive OFDM symbols or two closest adjacent OFDM symbols use the CDM method to multiplex two DMRS ports, wherein the orthogonal masks are [1, 1] and [1, −1];

when the user equipment uses six layers to receive data, the DMRS port 7, port 8 and port 11 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses seven layers to receive data, the DMRS port 7, port 8, port 11 and port 13 are received in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are received in corresponding subcarriers of corresponding OFDM symbols, wherein a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses eight layers to receive data, the DMRS port 7, port 8, port 11 and port 13 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10, port 12 and port 14 are received in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned method, when the CP has an extended cyclic prefix length, the user equipment receives at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or it receives at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{8, 9\}$; or it receives at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or it receives at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or it receives at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or it receives at least one of the DMRS ports 7 and 8 in the $\{1^{st}, 4^{th}, 7^{th}, 10^{th}\}$ subcarriers of the OFDM symbol group $\{0, 1\}$; or it receives at least one of the DMRS ports 7 and 8 in the $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10, 11\}$.

Preferably, in the abovementioned method, when the user equipment uses one layer to receive data, the DMRS port 7 or port 8 is received in a corresponding subcarrier resource element of a corresponding OFDM symbol;

when the user equipment uses two layers to receive data, the DMRS port 7 and port 8 are received in corresponding subcarriers of corresponding OFDM symbols, two resource elements of the same subcarriers of two consecutive OFDM symbols or two closest adjacent OFDM symbols use the CDM method to multiplex two DMRS ports, wherein the orthogonal masks are [1, 1] and [1, −1].

Preferably, in the abovementioned method, when the CP has an extended cyclic prefix length, the user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 7\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 6\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 3\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or it receives at least one of the DMRS ports 7 and 8 in the $\{1^{st}, 4^{th}, 10^{th}\}$ subcarriers of $5^{th}, 8^{th}$, the OFDM symbol group $\{1, 4\}$ and the $\{2^{nd}, 5^{th}, 8^{th}, 11^{th}\}$ subcarriers of the OFDM symbol group $\{8, 10\}$;

it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

Preferably, in the abovementioned method, when the user equipment uses one layer to receive data, the DMRS port 7 or port 8 is received in a corresponding subcarrier of a corresponding OFDM symbol;

when the user equipment uses two layers to receives data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1].

The present document further discloses a base station, wherein the base station comprises:
- a first module, configured to: perform frequency division multiplexing (FDM) and/or code division multiplexing (CDM) and/or time division multiplexing (TDM) on a plurality of demodulation reference signal (DMRS) ports;
- a second module, configured to: transmit the multiplexed DMRS.

Preferably, in the abovementioned base station, the second module is configured to: transmit the DMRS in at least one of OFDM symbol groups, wherein OFDM symbols x1~xn constitute one OFDM symbol group {x1, x2, ... xn}, xn<14, 0<n<5, wherein xn and n are integers.

Preferably, in the abovementioned base station, the second module is configured to: when a cyclic prefix (CP) has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{0, 12\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{1, 13\}$:
DMRS port 9, DMRS port 10, DMRS port 12 and DMRS port 14; or
transmit at least one of the following DMRS ports in the $\{0^{th}, 1^{st}, 5^{th}, 6^{th}, 10^{th}, 11^{th}\}$ subcarriers of the OFDM symbol group $\{0, 9\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{1, 10\}$:
DMRS port 9, DMRS port 10, DMRS port 12 and DMRS port 14; or,
transmit at least one of the following DMRS ports in the $\{0^{th}, 1^{st}, 5^{th}, 6^{th}, 10^{th}, 11^{th}\}$ subcarriers of the OFDM symbol group $\{0, 8\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 9, DMRS port 10, DMRS port 12 and DMRS port 14; or
transmit at least one of the following DMRS ports in the $\{0^{th}, 1^{st}, 5^{th}, 6^{th}, 10^{th}, 11^{th}\}$ subcarriers of the OFDM symbol group $\{0, 7\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 9, DMRS port 10, DMRS port 12 and DMRS port 14; or
transmit at least one of the following DMRS ports in the $\{0^{th}, 1^{st}, 5^{th}, 6^{th}, 10^{th}, 11^{th}\}$ subcarriers of the OFDM symbol group $\{0, 5\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{1, 6\}$:
DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol $\{0\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarrier of the OFDM symbol $\{1\}$:
DMRS port 9, DMRS port 10, DMRS port 12 and DMRS port 14.

Preferably, in the abovementioned base station, the second module is configured to:
when the CP has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{2, 13\}$:
DMRS port 9, DMRS port 10, DMRS port 12 and DMRS port 14; or
transmit at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{2, 10\}$:
DMRS port 9, DMRS port 10, DMRS port 12 and DMRS port 14; or,
transmit at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{2, 9\}$:
DMRS port 9, DMRS port 10, DMRS port 12 and DMRS port 14; or,
transmit at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
transmit at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12 and DMRS port 14; or
transmit at least one of the following DMRS ports in the $\{0^{th}, 1^{st}, 5^{th}, 6^{th}, 10^{th}, 11^{th}\}$ subcarriers of the OFDM symbol $\{1\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol $\{2\}$:

DMRS port 9, DMRS port 10, DMRS port 12 and DMRS port 14; or, transmit at least one of the following DMRS ports in the $\{0^{th}, 1^{st}, 5^{th}, 6^{th}, 10^{th}, 11^{th}\}$ subcarriers of the OFDM symbol $\{1\}$:

DMRS port 7 and DMRS port 8.

Preferably, in the abovementioned base station, the second module is configured to: when the CP has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{1, 12\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 13\}$:

DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol group $\{1, 9\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 10\}$:

DMRS port 9, DMRS port 10, DMRS port 12 and DMRS port 14; or, transmit at least one of the following DMRS ports in the $\{0^{th}, 1^{st}, 5^{th}, 6^{th}, 10^{th}, 11^{th}\}$ subcarriers of the OFDM symbol group $\{1, 8\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 9\}$:

DMRS port 9, DMRS port 10, DMRS port 12 and DMRS port 14; or, transmit at least one of the following DMRS ports in the $\{0^{th}, 1^{st}, 5^{th}, 6^{th}, 10^{th}, 11^{th}\}$ subcarriers of the OFDM symbol group $\{1, 7\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 8\}$:

DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol group $\{1, 5\}$:

transmit at least one of the following DMRS ports in the $\{0^{th}, 1^{st}, 5^{th}, 6^{th}, 10^{th}, 11^{th}\}$ subcarriers of the OFDM symbol group $\{3, 6\}$:

DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol $\{1\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol $\{3\}$:

DMRS port 9, DMRS port 10, DMRS port 12 and DMRS port 14; or, transmit at least one of the following DMRS ports in the $\{0^{th}, 1^{st}, 5^{th}, 6^{th}, 10^{th}, 11^{th}\}$ subcarriers of the OFDM symbol $\{1\}$:

DMRS port 7 and DMRS port 8.

Preferably, in the abovementioned base station, the second module is configured to, when the CP has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{1, 11\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 12\}$:

DMRS port 9, DMRS port 10, DMRS port 12 and DMRS port 14.

Preferably, in the abovementioned base station, the second module is configured to, when the CP has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{1, 10\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 12\}$:

DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol group $\{1, 8\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 10\}$:

DMRS port 9, DMRS port 10, DMRS port 12 and DMRS port 14; or transmit at least one of the following DMRS ports in the $\{0^{th}, 1^{st}, 5^{th}, 6^{th}, 10^{th}, 11^{th}\}$ subcarriers of the OFDM symbol group $\{1, 6\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{3, 8\}$:

DMRS port 9, DMRS port 10, DMRS port 12 and DMRS port 14.

Preferably, in the abovementioned base station, the second module is configured to, when the CP has a normal cyclic prefix length, transmit at least one of the following DMRS ports in the $\{0^{th}, 1^{st}, 5^{th}, 6^{th}, 10^{th}, 11^{th}\}$ subcarriers of the OFDM symbol group $\{1, 11\}$:

DMRS port 7, DMRS port 8, DMRS port 11 and DMRS port 13;

transmit at least one of the following DMRS ports in the $\{0^{th}, 1^{st}, 5^{th}, 6^{th}, 10^{th}, 11^{th}\}$ subcarriers of the OFDM symbol group $\{2, 12\}$:

DMRS port 9, DMRS port 10, DMRS port 12 and DMRS port 14;

or, transmit at least one of the following DMRS ports in the {0$^{th}$, 1$^{st}$, 5$^{th}$, 6$^{th}$, 10$^{th}$, 11$^{th}$} subcarriers of the OFDM symbol group {3, 11}:
DMRS port 7, DMRS port 8, DMRS port 11 and DMRS port 13;
transmit at least one of the following DMRS ports in the {0$^{th}$, 1$^{st}$, 5$^{th}$, 6$^{th}$, 10$^{th}$, 11$^{th}$} subcarriers of the OFDM symbol group {4, 12}:
DMRS port 9, DMRS port 10, DMRS port 12 and DMRS port 14;
or, transmit at least one of the following DMRS ports in the {0$^{th}$, 1$^{st}$, 5$^{th}$, 6$^{th}$, 10$^{th}$, 11$^{th}$} subcarriers of the OFDM symbol group {1, 9}:
transmit at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 9, DMRS port 10, DMRS port 12 and DMRS port 14;
or, transmit at least one of the following DMRS ports in the {0$^{th}$, 1$^{st}$, 5$^{th}$, 6$^{th}$, 10$^{th}$, 11$^{th}$} subcarriers of the OFDM symbol group {1, 9}:
DMRS port 9, DMRS port 10, DMRS port 12 and DMRS port 14;
transmit at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 7, DMRS port 8, DMRS port 11 and DMRS port 13;
or, transmit at least one of the following DMRS ports in the {0$^{th}$, 1$^{st}$, 5$^{th}$, 6$^{th}$, 10$^{th}$, 11$^{th}$} subcarriers of the OFDM symbol group {1, 8}:
DMRS port 7, DMRS port 8, DMRS port 11 and DMRS port 13;
transmit at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 9, DMRS port 10, DMRS port 12 and DMRS port 14;
or, transmit at least one of the following DMRS ports in the {0$^{th}$, 1$^{st}$, 5$^{th}$, 6$^{th}$, 10$^{th}$, 11$^{th}$} subcarriers of the OFDM symbol group {1, 8}:
DMRS port 9, DMRS port 10, DMRS port 12 and DMRS port 14;
transmit at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 7, DMRS port 8, DMRS port 11 and DMRS port 13.

Preferably, in the abovementioned base station, the base station is configured to: when the base station uses one layer to transmit data, the DMRS port 7 or port 8 is transmitted in a corresponding subcarrier of a corresponding OFDM symbol;
when the base station uses two layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein orthogonal masks can be [1, 1] and [1, −1];
when the base station uses three layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein the orthogonal masks can be [1,1] and [1, −1], and the port 9 is transmitted in a corresponding subcarrier of a corresponding OFDM symbol;
when the base station uses four layers to transmit data, the DMRS port 7, port 8, port 9 and port 10 are transmitted in corresponding subcarriers of corresponding OFDM symbols, and two consecutive subcarriers of the same OFDM symbol use the CDM method to multiplex two DMRS ports, wherein the orthogonal masks can be [1, 1] and [1, −1];
when the base station uses five layers to transmit data, the DMRS port 7, port 8 and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are transmitted in corresponding subcarriers of a corresponding OFDM symbol, and the two consecutive subcarriers of the same OFDM symbol use the CDM method to multiplex two DMRS ports, wherein the orthogonal masks can be [1, 1] and [1, −1];
When the base station uses six layers to transmit data, the DMRS port 7, port 8 and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];
when the base station uses seven layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];
when the base station uses eight layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10, port 12 and port 14 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1];

Preferably, in the abovementioned base station, the second module is configured to, when the CP has a normal cyclic prefix length, transmit at least one of the following DMRS ports in the $\{1^{st}, 6^{th}, 11^{th}\}$ subcarriers of the OFDM symbol group $\{1, 3, 11, 12\}$:

DMRS ports 7, 8, 11 and 13;

transmit at least one of the following DMRS ports in the $\{0^{th}, 5^{th}, 10^{th}\}$ subcarriers of the OFDM symbol group $\{1, 3, 11, 12\}$:

DMRS port 9, DMRS port 10, DMRS port 12 and DMRS port 14; or transmit at least one of the following DMRS ports in the $\{1^{st}, 6^{th}, 11^{th}\}$ subcarriers of the OFDM symbol group $\{1, 3, 9, 10\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 9, 10\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{1, 3, 8, 9\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 8, 9\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{1, 3, 7, 8\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 7, 8\}$:

DMRS port 9, DMRS port 10, DMRS port 12 and DMRS port 14; or transmit at least one of the following DMRS ports in the $\{1^{st}, 6^{th}, 11^{th}\}$ subcarriers of the OFDM symbol group $\{1, 3, 5, 6\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 5, 6\}$:

DMRS port 9, DMRS port 10, DMRS port 12 and DMRS port 14; or transmit at least one of the following DMRS ports in the $\{1^{st}, 6^{th}, 11^{th}\}$ subcarriers of the OFDM symbol group $\{1, 3\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3\}$:

DMRS port 9, DMRS port 10, DMRS port 12 and DMRS port 14.

Preferably, in the abovementioned base station, the second module is configured to, when the CP has a normal cyclic prefix length, transmit at least one of the following DMRS ports in the $\{1^{st}, 6^{th}, 11^{th}\}$ subcarriers of the OFDM symbol group $\{1, 3, 10, 12\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 10, 12\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{1, 3, 8, 10\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 8, 10\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{1, 3, 6, 8\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 3, 6, 8\}$:

DMRS port 9, DMRS port 10, DMRS port 12 and DMRS port 14.

Preferably, in the abovementioned base station, the second module is configured to: when the CP has a normal cyclic prefix length, transmit at least one of the following DMRS ports in the $\{1^{st}, 6^{th}, 11^{th}\}$ subcarriers of the OFDM symbol group $\{3, 4, 11, 12\}$:

transmit at least one of the following DMRS ports in the $\{0^{th}, 5^{th}, 10^{th}\}$ subcarriers of the OFDM symbol group $\{3, 4, 11, 12\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{3, 4, 10, 11\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{3, 4, 10, 11\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{3, 4, 9, 10\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{3, 4, 9, 10\}$:

DMRS port 9, DMRS port 10, DMRS port 12 and DMRS port 14; or transmit at least one of the following DMRS ports in the $\{1^{st}, 6^{th}, 11^{th}\}$ subcarriers of the OFDM symbol group $\{3, 4, 8, 9\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{3, 4, 8, 9\}$:

DMRS port 9, DMRS port 10, DMRS port 12 and DMRS port 14; or transmit at least one of the following DMRS ports in the $\{1^{st}, 6^{th}, 11^{th}\}$ subcarriers of the OFDM symbol group $\{3, 4\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{3, 4\}$:

DMRS port 9, DMRS port 10, DMRS port 12 and DMRS port 14.

Preferably, in the abovementioned base station, the second module is configured to, when the CP has a normal cyclic prefix length, transmit at least one of the following DMRS ports in the $\{1^{st}, 6^{th}, 11^{th}\}$ subcarriers of the OFDM symbol group $\{2, 3, 11, 12\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{2, 3, 11, 12\}$:

DMRS port 9, DMRS port 10, DMRS port 12 and DMRS port 14;

or, transmit at least one of the following DMRS ports in the $\{1^{st}, 6^{th}, 11^{th}\}$ subcarriers of the OFDM symbol group $\{1, 2, 11, 12\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 2, 11, 12\}$:

DMRS port 9, DMRS port 10, DMRS port 12 and DMRS port 14; or, transmit at least one of the following DMRS ports in the $\{1^{st}, 6^{th}, 11^{th}\}$ subcarriers of the OFDM symbol group $\{1, 2, 12, 13\}$:

DMRS port 7, DMRS port 8, DMRS port 11 and DMRS port 13;

transmit at least one of the following DMRS ports in the $\{0^{th}, 5^{th}, 10^{th}\}$ subcarriers of the OFDM symbol group $\{1, 2, 12, 13\}$:

DMRS port 9, DMRS port 10, DMRS port 12 and DMRS port 14;

or, transmit at least one of the following DMRS ports in the $\{1^{st}, 6^{th}, 11^{th}\}$ subcarriers of the OFDM symbol group $\{0, 1, 12, 13\}$:

DMRS port 7, DMRS port 8, DMRS port 11 and DMRS port 13; or, transmit at least one of the following DMRS ports in the $\{0^{th}, 5^{th}, 10^{th}\}$ subcarriers of the OFDM symbol group $\{0, 1, 12, 13\}$:

DMRS port 9, DMRS port 10, DMRS port 12 and DMRS port 14.

Preferably, in the abovementioned base station, the base station is configured to: when the base station uses one layer to transmit data, transmit the DMRS port 7 or port 8 in a corresponding subcarrier resource element of a corresponding OFDM symbol;

when the base station uses two layers to transmit data, transmit the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1];

when the base station uses three layers to transmit data, transmit the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks can be [1, 1] and [1, −1], and transmit the port 9 in a corresponding subcarrier of a corresponding OFDM symbol;

when the base station uses four layers to transmit data, transmit the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks can be [1, 1] and [1, −1], and transmit the port 9 and port 10 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks can be [1, 1] and [1, −1];

when the base station uses five layers to transmit data, transmit the DMRS port 7, port 8 and port 11 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1], and transmit the ports 9 and 10 in corresponding subcarriers of corresponding OFDM symbols, the same subcarriers of two consecutive OFDM symbols or two closest adjacent OFDM symbols using the CDM method to multiplex two DMRS ports, wherein the orthogonal masks are [1, 1] and [1, −1];

when the base station uses six layers to transmit data, transmit the DMRS port 7, port 8 and port 11 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1], and transmit the DMRS port 9, port 10 and port 12 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1];

when the base station uses seven layers to transmit data, transmit the DMRS port 7, port 8, port 11 and port 13 in corresponding subcarriers of corresponding OFDM symbols, a total of four resource elements: the same subcarriers of four OFDM symbols using the CDM method to multiplex four DMRS ports, wherein the orthogonal masks are [1, 1, 1, 1], [1, 1, −1, −1], [1, −1, −1, 1] and [1, −1, 1, −1], and transmit the DMRS port 9, port 10 and port 12 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1];

when the base station uses eight layers to transmit data, transmit the DMRS port 7, port 8, port 11 and port 13 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1], and transmit the DMRS port 9, port 10, port 12 and port 14 in corresponding subcarriers of corresponding OFDM symbols, a total of four resource elements: the same subcarriers of four OFDM symbols using the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned base station, the second module is configured to, when the CP has an extended cyclic prefix length, transmit at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or transmit at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{8, 9\}$; or transmit at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or transmit at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or transmit at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or transmit at least one of the DMRS ports 7 and 8 in the $\{1^{st}, 4^{th}, 7^{th}, 10^{th}\}$ subcarriers of the OFDM symbol group $\{0, 1\}$; or transmit at least one of the DMRS ports 7 and 8 in $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10^{th}, 11\}$.

Preferably, in the abovementioned base station, the base station is configured to:

when the base station uses one layer to transmit data, transmit the DMRS port 7 or port 8 in a corresponding subcarrier resource element of a corresponding OFDM symbol;

when the base station uses two layers to transmit data, transmit the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1].

Preferably, in the abovementioned base station, the second module is configured to, when the CP has an extended cyclic prefix length, transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 7\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 6\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 3\}$; or transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or transmit at least one of the DMRS ports 7 and 8 in the $\{1^{st}, 4^{th}, 7^{th}, 10^{th}\}$ subcarriers of the OFDM symbol group $\{1, 4\}$ and the $\{2^{nd}, 5^{th}, 8^{th}, 11^{th}\}$ subcarriers of the OFDM symbol group $\{8, 10\}$;

transmit at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

Preferably, in the abovementioned base station, the base station is configured to, when the base station uses one layer to transmit data, transmit the DMRS port 7 or port 8 in a corresponding subcarrier of a corresponding OFDM symbol;

when the base station uses two layers to transmit data, transmit the DMRS port 7 and port 8 in corresponding subcarriers of a corresponding OFDM symbol, two consecutive subcarriers of the same OFDM symbol use the CDM method to multiplex two DMRS ports, wherein the orthogonal masks are [1, 1] and [1, −1].

The present document further discloses a user equipment, wherein the user equipment comprises:

a first module, configured to: store multiplexing information of demodulation reference signal (DMRS) ports, wherein the multiplexing information refers to: the DMRS going through frequency division multiplexing (FDM), and/or code division multiplexing (CDM) and/or time division multiplexing (TDM);

a second module, configured to: receive a plurality of demodulation reference signal (DMRS) ports.

Preferably, in the abovementioned user equipment, the second module is configured to: receive the DMRS in at least one OFDM symbol group, wherein OFDM symbols x1~xn constitute one OFDM symbol group, wherein xn<14, 0<n<5, and xn and n are integers.

Preferably, in the abovementioned user equipment, the second module is configured to: when the CP has a normal cyclic prefix length, receive at least one of the following DMRS ports in the $\{0^{th}, 1^{st}, 5^{th}, 6^{th}, 10^{th}, 11^{th}\}$ subcarriers of the OFDM symbol group $\{0, 12\}$:

DMRS port 7, DMRS port 8, DMRS port 11 and DMRS port 13;

receive at least one of the following DMRS ports in the $\{0^{th}, 1^{st}, 5^{th}, 6^{th}, 10^{th}, 11^{th}\}$ subcarriers of the OFDM symbol group $\{1, 13\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol group $\{0, 9\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{1, 10\}$:
DMRS port 9, DMRS port 10, DMRS port 12 and DMRS port 14; or,
receive at least one of the following DMRS ports in the $\{0^{th}, 1^{st}, 5^{th}, 6^{th}, 10^{th}, 11^{th}\}$ subcarriers of the OFDM symbol group $\{0, 8\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol group $\{0, 7\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol group $\{0, 5\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{1, 6\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol group $\{0\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{1\}$:
DMRS port 9, DMRS port 10, DMRS port 12 and DMRS port 14.

Preferably, in the abovementioned user equipment, the second module is configured to, when the CP has a normal cyclic prefix length, receive at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{2, 13\}$:
DMRS port 9, DMRS port 10, DMRS port 12 and DMRS port 14; or receive at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{2, 10\}$:
DMRS port 9, DMRS port 10, DMRS port 12 and DMRS port 14; or,
receive at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{2, 9\}$:
DMRS port 9, DMRS port 10, DMRS port 12 and DMRS port 14; or,
receive at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12 and DMRS port 14; or
receive at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol $\{2\}$:
DMRS port 9, DMRS port 10, DMRS port 12 and DMRS port 14; or,
receive at least one of the DMRS port 7 and the DMRS port 8 in the $\{0^{th}, 1^{st}, 5^{th}, 6^{th}, 10^{th}, 11^{th}\}$ subcarriers of the OFDM symbol $\{1\}$.

Preferably, in the abovementioned user equipment, the second module is configured to, when the CP has a normal cyclic prefix length, receive at least one of the following DMRS ports in the $\{0^{th}, 1^{st}, 5^{th}, 6^{th}, 10^{th}, 11^{th}\}$ subcarrier of OFDM symbol group $\{1, 12\}$:
DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{3, 13\}$:
DMRS port 9, DMRS port 10, DMRS port 12 and DMRS port 14; or receive at least one of the following DMRS ports in the {0$^{th}$, 1$^{st}$, 5$^{th}$, 6$^{th}$, 10$^{th}$, 11$^{th}$} subcarriers of the OFDM symbol group {1, 9}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 10}:
DMRS port 9, DMRS port 10, DMRS port 12 and DMRS port 14; or,
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 8}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 9}:
DMRS port 9, DMRS port 10, DMRS port 12 and DMRS port 14; or,
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 7}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 8}:
DMRS port 9, DMRS port 10, DMRS port 12 and DMRS port 14; or
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 5}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 6}:
DMRS port 9, DMRS port 10, DMRS port 12 and DMRS port 14; or
receive at least one of the following DMRS ports in the {0$^{th}$, 1$^{st}$, 5$^{th}$, 6$^{th}$, 10$^{th}$, 11$^{th}$} subcarriers of the OFDM symbol {1}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol {3}:
DMRS port 9, DMRS port 10, DMRS port 12 and DMRS port 14; or,
receive at least one of the DMRS port 7 and the DMRS port 8 in the {0$^{th}$, 1$^{st}$, 5$^{th}$, 6$^{th}$, 10$^{th}$, 11$^{th}$} subcarriers of the OFDM symbol {1}.
Preferably, in the abovementioned user equipment, the second module is configured to, when the CP has a normal cyclic prefix length, receive at least one of the following DMRS ports in the {0$^{th}$, 1$^{st}$, 5$^{th}$, 6$^{th}$, 10$^{th}$, 11$^{th}$} subcarriers of the OFDM symbol group {1, 1, 1}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 9, DMRS port 10, DMRS port 12 and DMRS port 14.
Preferably, in the abovementioned user equipment, the second module is configured to, when the CP has a normal cyclic prefix length, receive at least one of the following DMRS ports in the {0$^{th}$, 1$^{st}$, 5$^{th}$, 6$^{th}$, 10$^{th}$, 11$^{th}$} subcarriers of the OFDM symbol group {1, 10}:
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 9, DMRS port 10, DMRS port 12 and DMRS port 14; or
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 8}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 10}:
DMRS port 9, DMRS port 10, DMRS port 12 and DMRS port 14; or
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 6}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 8}:
DMRS port 9, DMRS port 10, DMRS port 12 and DMRS port 14.
Preferably, in the abovementioned user equipment, the second module is configured to, when the CP has a normal cyclic prefix length, receive at least one of the following DMRS ports in the {0$^{th}$, 1$^{st}$, 5$^{th}$, 6$^{th}$, 10$^{th}$, 11$^{th}$} subcarriers of the OFDM symbol group {1, 11}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {2, 12}:
DMRS port 9, DMRS port 10, DMRS port 12 and DMRS port 14;
or, receive at least one of the following DMRS ports in the {0$^{th}$, 1$^{st}$, 5$^{th}$, 6$^{th}$, 10$^{th}$, 11$^{th}$} subcarriers of the OFDM symbol group {3, 11}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {4, 12}:
DMRS port 9, DMRS port 10, DMRS port 12 and DMRS port 14; or,
receive at least one of the following DMRS ports in the {0$^{th}$, 1$^{st}$, 5$^{th}$, 6$^{th}$, 10$^{th}$, 11$^{th}$} subcarriers of the OFDM symbol group {1, 9}:
DMRS port 7, DMRS port 8, DMRS port 11 and DMRS port 13;
receive at least one of the following DMRS ports in the {0$^{th}$, 1$^{st}$, 5$^{th}$, 6$^{th}$, 10$^{th}$, 11$^{th}$} subcarriers of the OFDM symbol group {3, 12}:
DMRS port 9, DMRS port 10, DMRS port 12 and DMRS port 14;
or, receive at least one of the following DMRS ports in {0$^{th}$, 1$^{st}$, 5$^{th}$, 6$^{th}$, 10$^{th}$, 11$^{th}$} subcarriers of the OFDM symbol group {1, 9}:
DMRS port 9, DMRS port 10, DMRS port 12 and DMRS port 14;

receive at least one of the following DMRS ports in the $\{0^{th}, 1^{st}, 5^{th}, 6^{th}, 10^{th}, 11^{th}\}$ subcarriers of the OFDM symbol group $\{3, 12\}$:
  DMRS port 7, DMRS port 8, DMRS port 11 and DMRS port 13;
or, receive at least one of the following DMRS ports in the $\{0^{th}, 1^{st}, 5^{th}, 6^{th}, 10^{th}, 11^{th}\}$ subcarriers of the OFDM symbol group $\{1, 8\}$:
  DMRS port 7, DMRS port 8, DMRS port 11 and DMRS port 13;
receive at least one of the following DMRS ports in the $\{0^{th}, 1^{st}, 5^{th}, 6^{th}, 10^{th}, 11^{th}\}$ subcarriers of the OFDM symbol group $\{3, 12\}$:
  DMRS port 9, DMRS port 10, DMRS port 12 and DMRS port 14;
or, receive at least one of the following DMRS ports in the $\{0^{th}, 1^{st}, 5^{th}, 6^{th}, 10^{th}, 11^{th}\}$ subcarriers of the OFDM symbol group $\{1, 8\}$:
  DMRS port 9, DMRS port 10, DMRS port 12 and DMRS port 14;
receive at least one of the following DMRS ports in the $\{0^{th}, 1^{st}, 5^{th}, 6^{th}, 10^{th}, 11^{th}\}$ subcarriers of the OFDM symbol group $\{3, 12\}$:
  DMRS port 7, DMRS port 8, DMRS port 11 and DMRS port 13.

Preferably, in the abovementioned user equipment, the DMRS port 7 or port 8 is received in a corresponding subcarrier of a corresponding OFDM symbol;
  when the user equipment uses two layers to receive data, the DMRS port 7 and port 8 are received in corresponding subcarriers of a corresponding OFDM symbol, two consecutive subcarriers of the same OFDM symbol use the CDM method to multiplex two DMRS ports, wherein orthogonal masks can be [1, 1] and [1, −1];
  when the user equipment uses three layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1], and the port 9 is received in a corresponding subcarrier of a corresponding OFDM symbol;
  when the user equipment uses four layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1], and the DMRS port 9 and port 10 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1];
  when the user equipment uses five layers to receive data, the DMRS port 7, port 8 and port 11 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are received in corresponding subcarriers of a corresponding OFDM symbol, and two consecutive subcarriers of the same OFDM symbol use the CDM method to multiplex two DMRS ports, wherein the orthogonal masks can be [1, 1] and [1, −1];
  when the user equipment uses six layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are [1, 1, 1, 1], [1, 1, −1, −1], [1, −1, −1, 1] and [1, −1, 1, −1], and the port 9, port 10 and port 12 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];
  when the user equipment uses seven layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the port 9, port 10 and port 12 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];
  when the user equipment uses eight layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the port 9, port 10, port 12 and port 14 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned user equipment, the second module is configured to, when the CP has a normal cyclic prefix length, receive at least one of the following DMRS ports in the $\{1^{st}, 6^{th}, 11^{th}\}$ subcarriers of the OFDM symbol group $\{1, 3, 11, 12\}$:
  DMRS port 7, DMRS port 8, DMRS port 11 and DMRS port 13; or
receive at least one of the following DMRS ports in the $\{0^{th}, 5^{th}, 10^{th}\}$ subcarriers of the OFDM symbol group $\{1, 3, 11, 12\}$:

DMRS port 9, DMRS port 10, DMRS port 12 and DMRS port 14; or
receive at least one of the following DMRS ports in the $\{1^{st}, 6^{th}, 11^{th}\}$ subcarriers of the OFDM symbol group $\{1, 3, 9, 10\}$:
DMRS port 7, DMRS port 8, DMRS port 11 and DMRS port 13; or
receive at least one of the following DMRS ports in the $\{0^{th}, 5^{th}, 10^{th}\}$ subcarriers of the OFDM symbol group $\{1, 3, 9, 10\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 3, 8, 9\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 3, 8, 9\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 3, 7, 8\}$:
DMRS port 7, DMRS port 8, DMRS port 11 and DMRS port 13; or
receive at least one of the following DMRS ports in the $\{0^{th}, 5^{th}, 10^{th}\}$ subcarriers of the OFDM symbol group $\{1, 3, 7, 8\}$:
DMRS port 9, DMRS port 10, DMRS port 12 and DMRS port 14; or
receive at least one of the following DMRS ports in the $\{1^{st}, 6^{th}, 11^{th}\}$ subcarriers of the OFDM symbol group $\{1, 3, 5, 6\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 3, 5, 6\}$:
DMRS port 9, DMRS port 10, DMRS port 12 and DMRS port 14; or
receive at least one of the following DMRS ports in the $\{1^{st}, 6^{th}, 11^{th}\}$ subcarriers of the OFDM symbol group $\{1, 3\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 3\}$:
DMRS port 9, DMRS port 10, DMRS port 12 and DMRS port 14.

Preferably, in the abovementioned user equipment, the second module is configured to, when the CP has a normal cyclic prefix length, receive at least one of the following DMRS ports in the $\{1^{st}, 6^{th}, 11^{th}\}$ subcarriers of the OFDM symbol group $\{1, 3, 10, 12\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 3, 10, 12\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 3, 8, 10\}$:
DMRS port 7, DMRS port 8, DMRS port 11 and DMRS port 13; or
receive at least one of the following DMRS ports in the $\{0^{th}, 5^{th}, 10^{th}\}$ subcarriers of the OFDM symbol group $\{1, 3, 8, 10\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 3, 6, 8\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 3, 6, 8\}$:
DMRS port 9, DMRS port 10, DMRS port 12 and DMRS port 14.

Preferably, in the abovementioned user equipment, the second module is configured to, when the CP has a normal cyclic prefix length, receive at least one of the following DMRS ports in the $\{1^{st}, 6^{th}, 11^{th}\}$ subcarriers of the OFDM symbol group $\{3, 4, 11, 12\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{3, 4, 11, 12\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{3, 4, 10, 11\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{3, 4, 10, 11\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{3, 4, 9, 10\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{3, 4, 9, 10\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{3, 4, 8, 9\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{3, 4, 8, 9\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{3, 4\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{3, 4\}$:

DMRS port 9, DMRS port 10, DMRS port 12 and DMRS port 14.

Preferably, in the abovementioned user equipment, the second module is configured to, when the CP has a normal cyclic prefix length, receive at least one of the following DMRS ports in the $\{1^{st}, 6^{th}, 11^{th}\}$ subcarriers of the OFDM symbol group $\{2, 3, 11, 12\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{2, 3, 11, 12\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 2, 11, 12\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 2, 11, 12\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{1, 2, 12, 13\}$:
DMRS port 7, DMRS port 8, DMRS port 11 and DMRS port 13; or,
receive at least one of the following DMRS ports in the $\{0^{th}, 5^{th}, 10^{th}\}$ subcarriers of the OFDM symbol group $\{1, 2, 12, 13\}$:
DMRS port 9, DMRS port 10, DMRS port 12 and DMRS port 14; or,
receive at least one of the following DMRS ports in the $\{1^{st}, 6^{th}, 11^{th}\}$ subcarriers of the OFDM symbol group $\{0, 1, 12, 13\}$:
DMRS port 7, DMRS port 8, DMRS port 11 and DMRS port 13;
receive at least one of the following DMRS ports in the $\{0^{th}, 5^{th}, 10^{th}\}$ subcarriers of the OFDM symbol group $\{0, 1, 12, 13\}$:
DMRS port 9, DMRS port 10, DMRS port 12 and DMRS port 14.

Preferably, in the abovementioned user equipment, the user equipment is configured to, when the user equipment uses one layer to receive data, receive the DMRS port 7 or port 8 in a corresponding subcarrier resource element of a corresponding OFDM symbol;
when the user equipment uses two layers to receive data, receive the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1];
when the user equipment uses three layers to receive data, receive the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1], and receive the port 9 in a corresponding subcarrier resource element of a corresponding OFDM symbol;
when the user equipment uses four layers to receive data, receive the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks can be [1, 1] and [1, −1], and receive the port 9 and port 10 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1];
when the user equipment uses five layers to receive data, receive the DMRS port 7, port 8 and port 11 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1], and receive the DMRS ports 9 and 10 in corresponding subcarriers of corresponding OFDM symbols, the same subcarriers of two consecutive OFDM symbols or two closest adjacent OFDM symbols using the CDM method to multiplex two DMRS ports, wherein the orthogonal masks are [1, 1] and [1, −1];
when the user equipment uses six layers to receive data, receive the DMRS port 7, port 8 and port 11 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1], and receive the DMRS port 9, port 10 and port 12 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1];
when the user equipment uses seven layers to receive data, receive the DMRS port 7, port 8, port 11 and port 13 in corresponding subcarriers of corresponding OFDM symbols, a total of four resource elements: the same subcarriers of four OFDM symbols using the CDM method to multiplex four DMRS ports, wherein the orthogonal masks are [1, 1, 1, 1], [1, 1, −1, −1], [1, −1, −1, 1] and [1, −1, 1, −1], and receive the DMRS port 9, port 10 and port 12 in corresponding subcarriers of corresponding OFDM symbols, a total of four resource elements: the same subcarriers of four OFDM symbols using the CDM method to multiplex three DMRS ports, wherein the orthogonal masks are any three of [1, 1, 1, 1], [1, 1, −1, −1], [1, −1, −1, 1] and [1, −1, 1, −1];
when the user equipment uses eight layers to receive data, receive the DMRS port 7, port 8, port 11 and port 13 in corresponding subcarriers of corresponding OFDM symbols, a total of four resource elements: the same subcarriers of four OFDM symbols using the CDM method to multiplex three DMRS ports, wherein the orthogonal masks are [1, 1, 1, 1], [1, 1, −1, −1], [1, −1, −1, 1] and [1, −1, 1, −1], and receive the DMRS port 9, port 10, port 12 and port 14 in corresponding subcarriers of corresponding OFDM symbols, a total of four resource elements: the same subcarriers of four OFDM symbols using the CDM method to multiplex four DMRS ports, wherein the orthogonal masks are [1, 1, 1, 1], [1, 1, −1, −1], [1, −1, −1, 1] and [1, −1, 1, −1].

Preferably, in the abovementioned user equipment, the second module is configured to, when the CP has an extended cyclic prefix length, receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{8, 9\}$; or receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or receive at least one of the DMRS ports 7 and 8 in the $\{1^{st}, 4^{th}, 7^{th}, 10^{th}\}$ subcarriers of the OFDM symbol group $\{0, 1\}$; or, receive at least one of the DMRS ports 7 and 8 in the $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10^{th}, 11\}$.

Preferably, in the abovementioned user equipment, the user equipment is configured to, when the user equipment uses one layer to receive data, receive the DMRS port 7 or port 8 in a corresponding subcarrier resource element of a corresponding OFDM symbol;

when the user equipment uses two layers to receive data, receive the DMRS port 7 and port 8 in corresponding subcarriers of corresponding OFDM symbols, two resource elements of the same subcarriers of two consecutive OFDM symbols or two closest adjacent OFDM symbols using the CDM method to multiplex two DMRS ports, wherein the orthogonal masks are [1, 1] and [1, −1].

Preferably, in the abovementioned user equipment, the second module is configured to, when the CP has an extended cyclic prefix length, receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or, receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 7\}$; or receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 6\}$; or receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 3\}$; or receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or receive at least one of the DMRS ports 7 and 8 in the $\{1^{st}, 4^{th}, 7^{th}, 10^{th}\}$ subcarriers of the OFDM symbol group $\{1, 4\}$ and the $\{2^{nd}, 5^{th}, 8^{th}, 11^{th}\}$ subcarriers of the OFDM symbol group $\{8, 10\}$;

receive at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

Preferably, in the abovementioned user equipment, the user equipment is configured to, when the user equipment uses one layer to receive data, receive the DMRS port 7 or port 8 in a corresponding subcarrier of a corresponding OFDM symbol;

when the user equipment uses two layers to receive data, receive the DMRS port 7 and port 8 in corresponding subcarriers of a corresponding OFDM symbol, two consecutive subcarriers of one OFDM symbol using the CDM method to multiplex two DMRS ports, wherein the orthogonal masks are [1, 1] and [1, −1].

The technical scheme of the present application makes the DMRS demodulation performance boost greatly, especially after taking into account its use in the 256QAM modulation method in the future, and balances interpolation performance of various PRB Pairs in one sub-frame, and it also avoids collisions between the DMRS and the RCRS, the PSS/SSS as well as the CSI-RS.

PREFERRED EMBODIMENTS OF THE INVENTION

Figure 1:
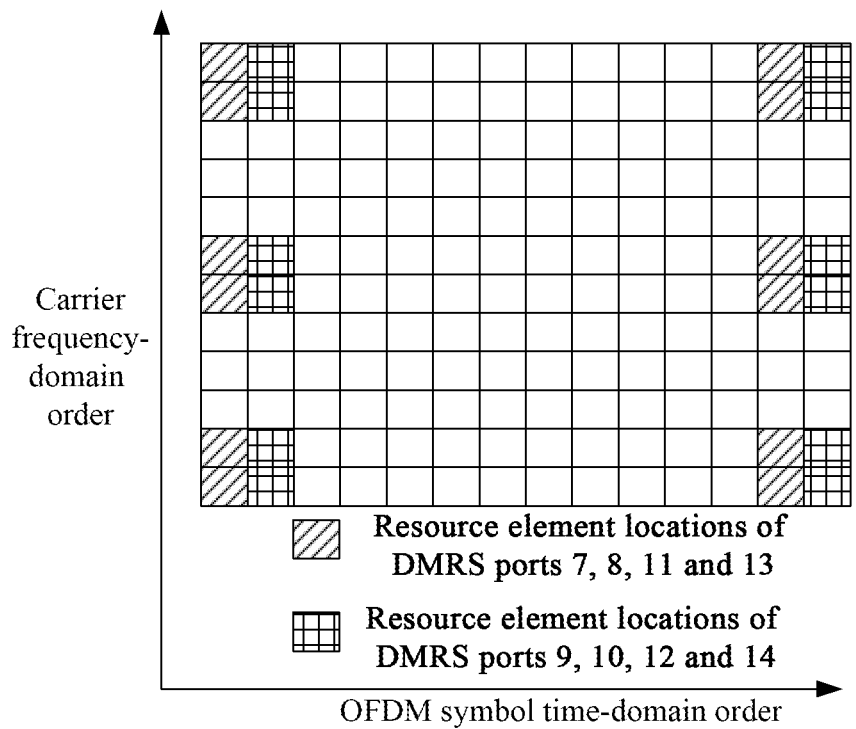
FIGS. 1~40, 54, 55, 56, 57 and 61 are schematic diagrams of normal CP DMRS mapping patterns in present examples.

Hereinafter, in conjunction with the accompanying drawings, the technical scheme of the present document will be further described in detail, and it should be noted that, in the case of no conflict, embodiments and features in the embodiments of the present applications can be combined randomly with each other.

The First Embodiment

The present embodiment provides a method for transmitting a demodulation reference signal, mainly comprising:

a base station transmitting a plurality of DMRS (demodulation reference signal) ports through FDM (frequency division multiplexing), and/or CDM (code division multiplexing), and/or TDM (time division multiplexing).

Specifically, the base station may transmit the DMRS in at least one of the following OFDM symbol groups:

wherein the OFDM symbol groups comprise: OFDM symbol group $\{0, 12\}$, OFDM symbol group $\{1, 13\}$, OFDM symbol group $\{0, 9\}$, OFDM symbol group $\{1, 10\}$, OFDM symbol group $\{0, 5\}$, OFDM symbol group $\{1, 6\}$, OFDM symbol group $\{0\}$, OFDM symbol group $\{1\}$, OFDM symbol group $\{2\}$, OFDM symbol group $\{3\}$, OFDM symbol group $\{1, 12\}$, OFDM symbol group $\{2, 13\}$, OFDM symbol group $\{1, 9\}$, OFDM symbol group $\{2, 10\}$, OFDM symbol group $\{1, 5\}$, OFDM symbol group $\{2, 6\}$, OFDM symbol group {3, 13}, OFDM symbol group {3, 10}, OFDM symbol group {3, 6}, OFDM symbol group {1, 11}, OFDM symbol group {3, 12}, OFDM symbol group {1, 10}, OFDM symbol group {3, 12}, OFDM symbol group {1, 8}, OFDM symbol group {3, 10}, OFDM symbol group {1, 6}, OFDM symbol group {3, 8}, OFDM symbol group {2, 12}, OFDM symbol group {3, 4, 11, 12}, OFDM symbol group {2, 3, 11, 12}, OFDM symbol group {1, 2, 11, 12}, OFDM symbol group {3, 4, 9, 10}, OFDM symbol group {3, 4}, OFDM symbol group {0, 8}, OFDM symbol group {0, 7}, OFDM symbol group {0, 6}, OFDM symbol group {1, 7}, OFDM symbol group {0, 3}, OFDM symbol group {1, 4}, OFDM symbol group {1, 9}, OFDM symbol group {3, 11}, OFDM symbol group {4, 13}, OFDM symbol group {0, 1, 12, 13}, OFDM symbol group {1, 2}, OFDM symbol group {10, 11}, OFDM symbol group {8, 10}, OFDM symbol group {3, 11}, OFDM symbol group {4, 12}, OFDM symbol group {1, 9}, OFDM symbol group {0, 1, 12, 13}, and it should be noted that the abovementioned OFDM symbols x1~xn constitute one OFDM symbol group {x1, ... xn}, wherein xn<14, 0<n<5, and xn and n are integers.

Hereinafter, the patent document will be further described in conjunction with the accompanying drawings and specific examples. The patent document is described based on one PRB Pair, and the following OFDM indexes are numbered 0~13 according to the subframes, and the subcarriers are numbered as 0~11 in one PRB Pair. In practical applications, a plurality of PRB Pairs uses the same DMRS pattern. The DMRS port numbers 7, 8, 9, 10, 11, 12, 13 and 14 involved in the patent are only used for illustrating that different layers correspond to different DMRS port orders when transmitting from low rank to high rank, and in practical applications, other port numbers may be used for identification, which does not affect the inventive spirit of the present patent. In all the following examples, resource locations of the DMRS port numbers 7, 8, 9 and 10 and those of the DMRS port numbers 11 12, 13 and 14 can be interchanged.

The First Example

FIG. 1 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length, and the corresponding subframe is a non-special subframe of subframe type 1 (FDD) or subframe type 2 (TDD), the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 12}, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol {1, 13}.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 12}, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol {1, 13}.

The Second Example

Figure 2:
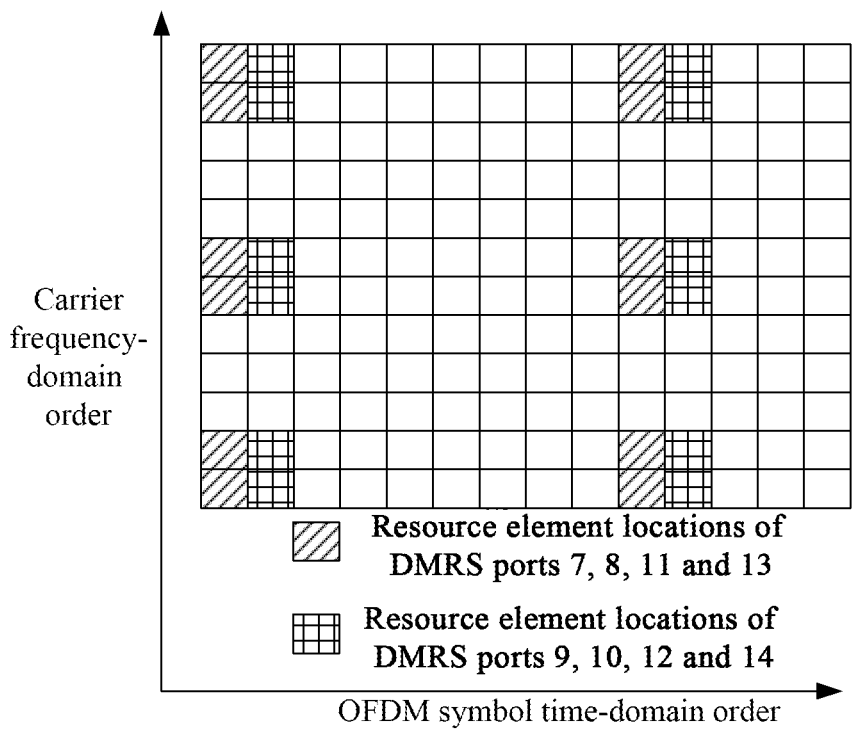

FIG. 2 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is subframe type 1 (FDD) or a subframe type 2 (TDD) and which is configured as 3, 4 or 8, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 9}, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol {1, 10}.

Based on the claim 52, when the CP (cyclic prefix) has a normal cyclic prefix length, the user equipment receives at least one of the DMRS ports 7, 8, 11 and 13 in the $\{0^{th}, 1^{st}, 5^{th}, 6^{th}, 10^{th}, 11^{a}\}$ subcarriers of the OFDM symbol {0, 9}, and receives at least one of the DMRS ports 9, 10, 12 and 14 on the $\{0^{th}, 1^{st}, 5^{th}, 6^{th}, 10^{th}, 11^{th}\}$ subcarriers of the OFDM symbol {1, 10}.

The Third Example

Figure 3:
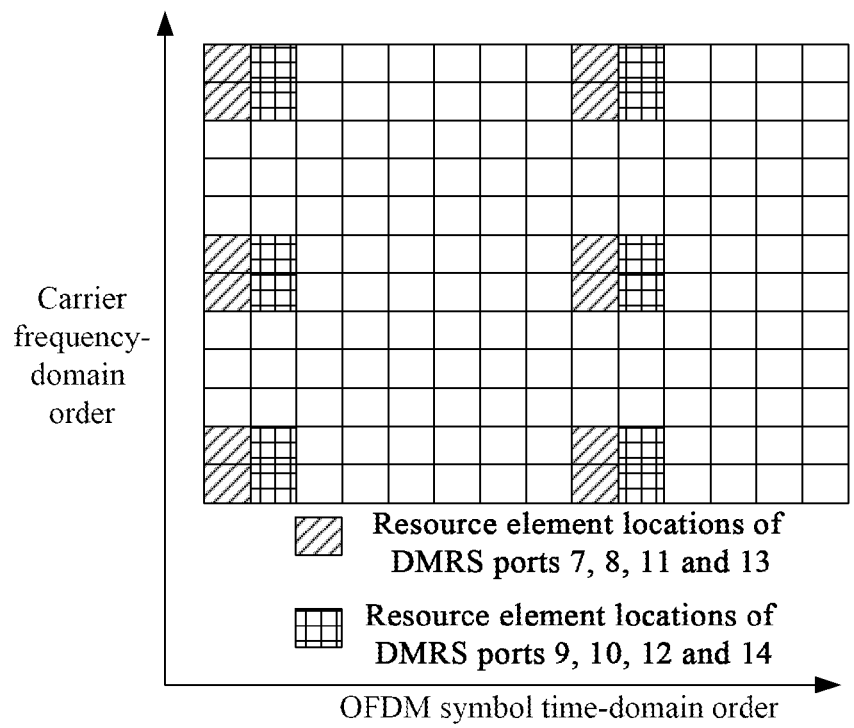

FIG. 3 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 8}, and transmits at least one of the DMRS ports 9, 10, 12 and 14 on the $\{0^{th}, 1^{st}, 5^{th}, 6^{th}, 10^{th}, 11^{th}\}$ subcarriers of the OFDM symbol {1, 9}.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 8}, and receives at least one of the DMRS ports 9, 10, 12 and 14 in the $\{0^{th}, 1^{st}, 5^{th}, 10^{th}, 11^{th}\}$ subcarriers of the OFDM symbol {1, 9}.

The Fourth Example

Figure 4:
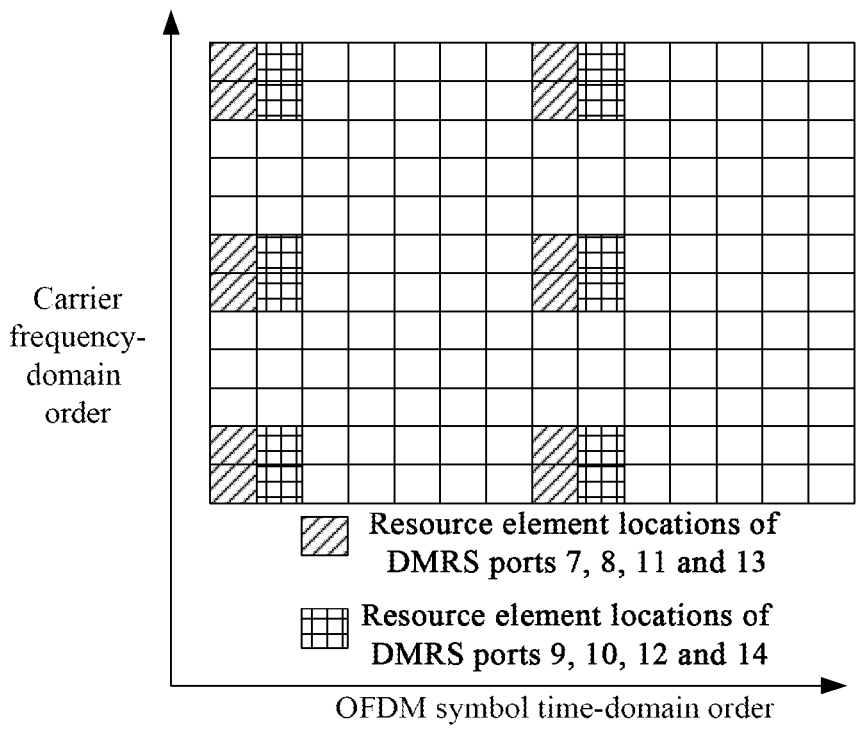

FIG. 4 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol {0, 7}, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol {1, 8}.

The user equipment receives at least one of the DMRS ports 7, 8, 11 and 13 in the $\{0^{st}, 1^{st}, 5^{th}, 6^{th}, 10^{th}, 11^{th}\}$ subcarriers of the OFDM symbol {0, 7}, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol {1, 8}.

The Fifth Example

Figure 5:
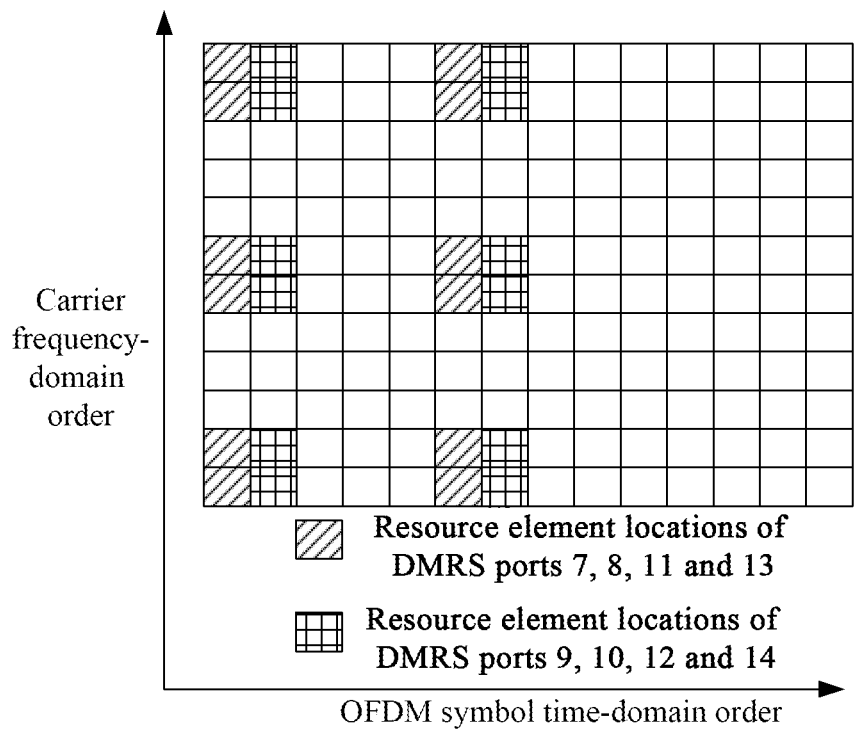

FIG. 5 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{0, 5\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{1, 6\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{0, 5\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{1, 6\}$.

The Sixth Example

Figure 6:
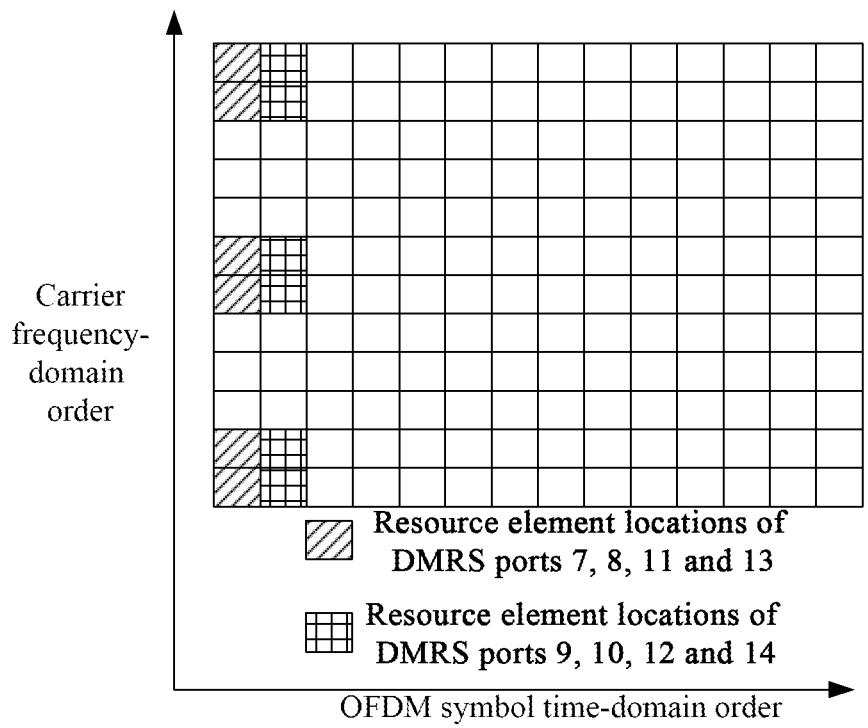

FIG. 6 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 0 or 9, the base station transmits at least one of the DMRS ports 7 and 8 in the $\{0^{th}, 1^{st}, 5^{th}, 6^{th}, 10^{th}, 11^{th}\}$ subcarriers of the OFDM symbol $\{0\}$, and transmits at least one of the DMRS ports 9 and 10 in the $\{0^{st}, 1^{st}, 5^{th}, 6^{th}, 10^{th}, 11^{th}\}$ subcarriers of the OFDM symbol $\{1\}$.

The user equipment receives at least one of the DMRS ports 7 and 8 in the $\{0^{th}, 1^{st}, 5^{th}, 6^{th}, 10^{th}, 11^{th}\}$ subcarriers of the OFDM symbol $\{0\}$, and receives at least one of the DMRS ports 9 and 10 in the $\{0^{th}, 1^{st}, 5^{th}, 6^{th}, 10^{th}, 11^{th}\}$ subcarriers of the OFDM symbol $\{1\}$.

The Seventh Example

Figure 7:
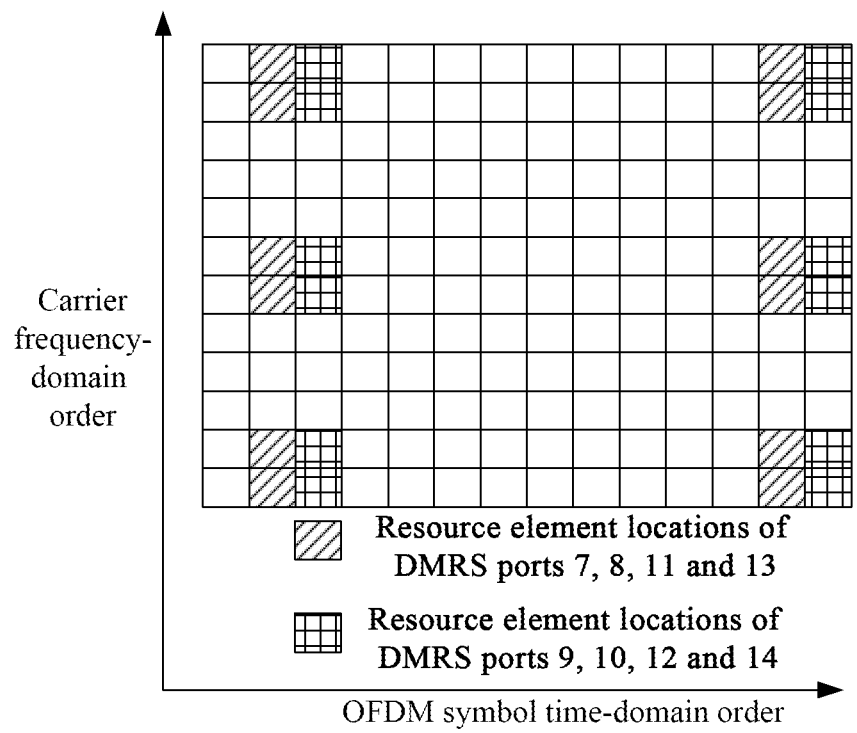

FIG. 7 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 12\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 13\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 12\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 13\}$.

The Eighth Example

Figure 8:
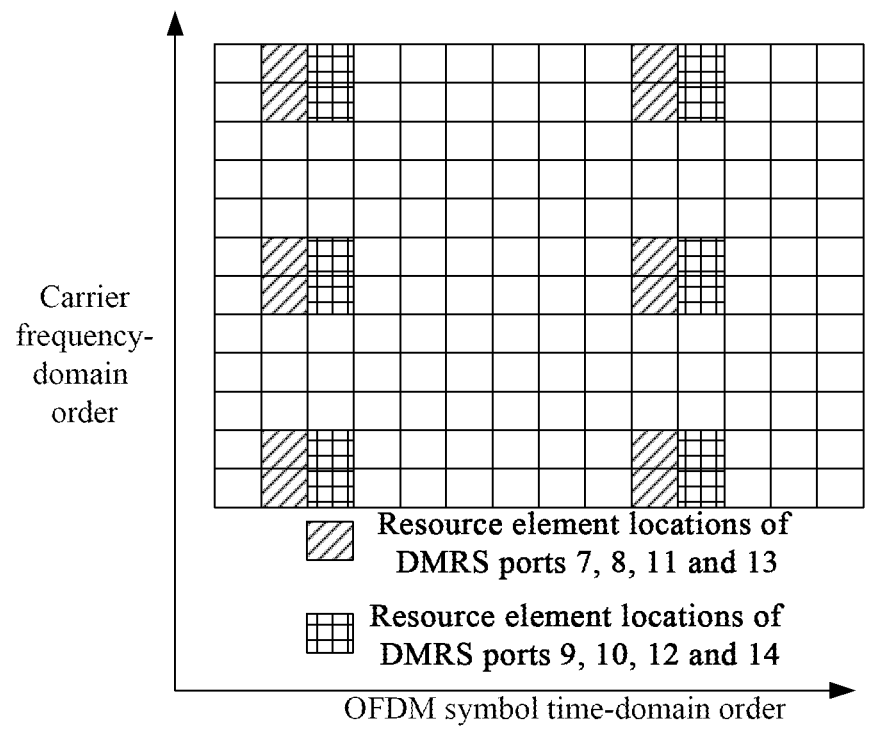

FIG. 8 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 1 (FDD) or the subframe type 2 (TDD) and which is configured as 3 or 4 or 8, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 9\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 10\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 9\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 10\}$.

The Ninth Example

Figure 9:
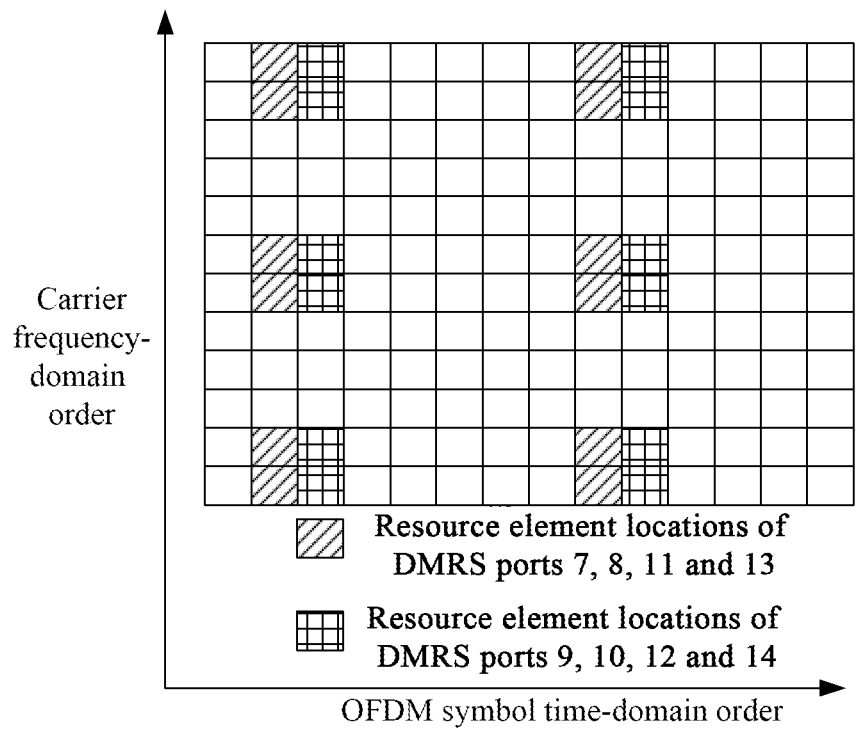

FIG. 9 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 8\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 9\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 8\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 9\}$.

The Tenth Example

Figure 10:
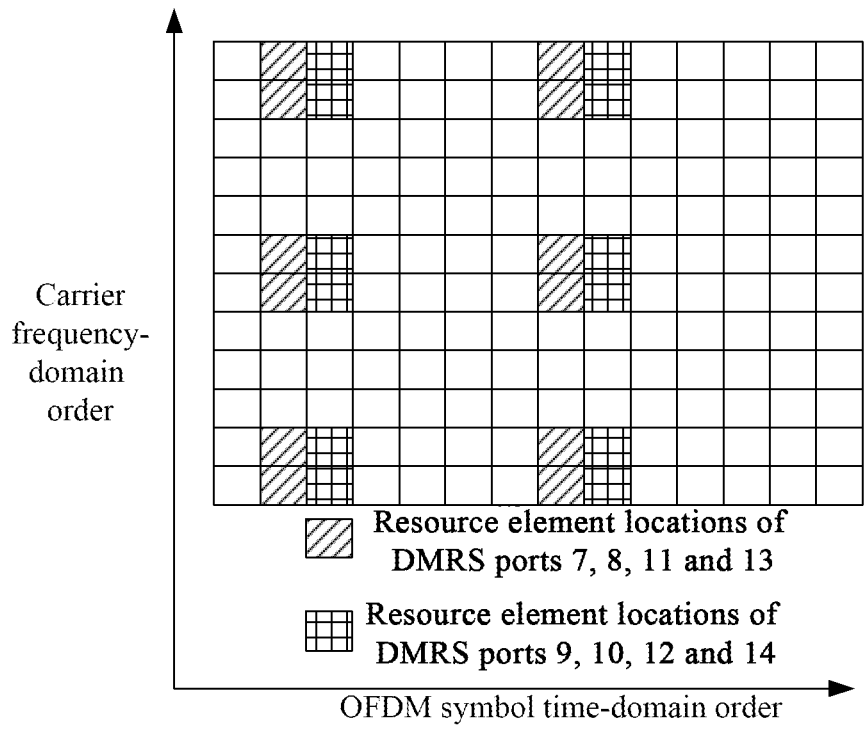

FIG. 10 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 7\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 8\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 7\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 8\}$.

The Eleventh Example

Figure 11:
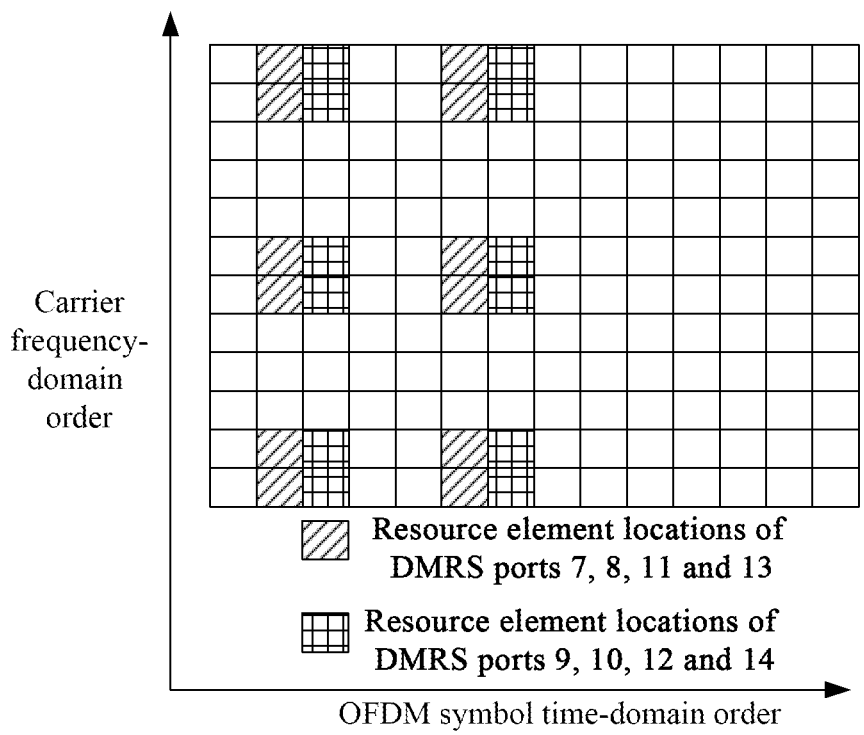

FIG. 11 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 5\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 6\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 5\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 6\}$.

The Twelfth Example

Figure 12:
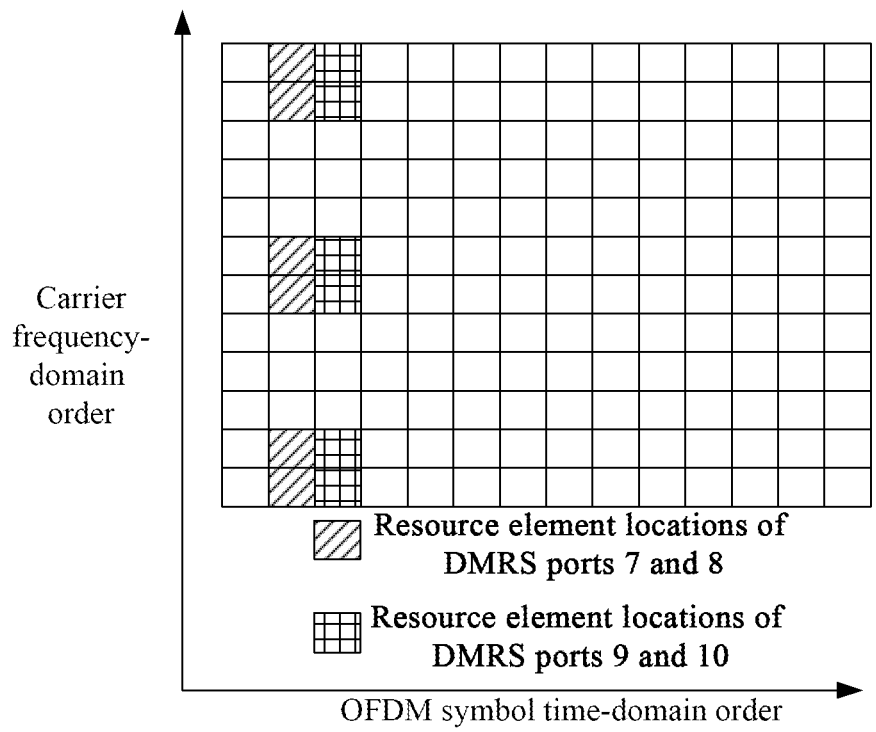

FIG. 12 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 0 or 9, the base station transmits at least one of the DMRS ports 7 and 8 in the $\{0^{th}, 1^{st}, 5^{th}, 6^{th}, 10^{th}, 11^{th}\}$ subcarriers of the OFDM symbol $\{1\}$, and transmits at least one of the DMRS ports 9 and 10 in the $\{0^{th}, 1^{st}, 5^{th}, 6^{th}, 10^{th}, 11^{th}\}$ subcarriers of the OFDM symbol $\{2\}$.

The user equipment receives at least one of the DMRS ports 7 and 8 in the $\{0^{th}, 1^{st}, 5^{th}, 6^{th}, 10^{th}, 11^{th}\}$ subcarriers of the OFDM symbol $\{1\}$, and receives at least one of the DMRS ports 9 and 10 in the $\{0^{th}, 1^{st}, 5^{th}, 6^{th}, 10^{th}, 11^{th}\}$ subcarriers of the OFDM symbol $\{2\}$.

The Thirteenth Example

Figure 13:
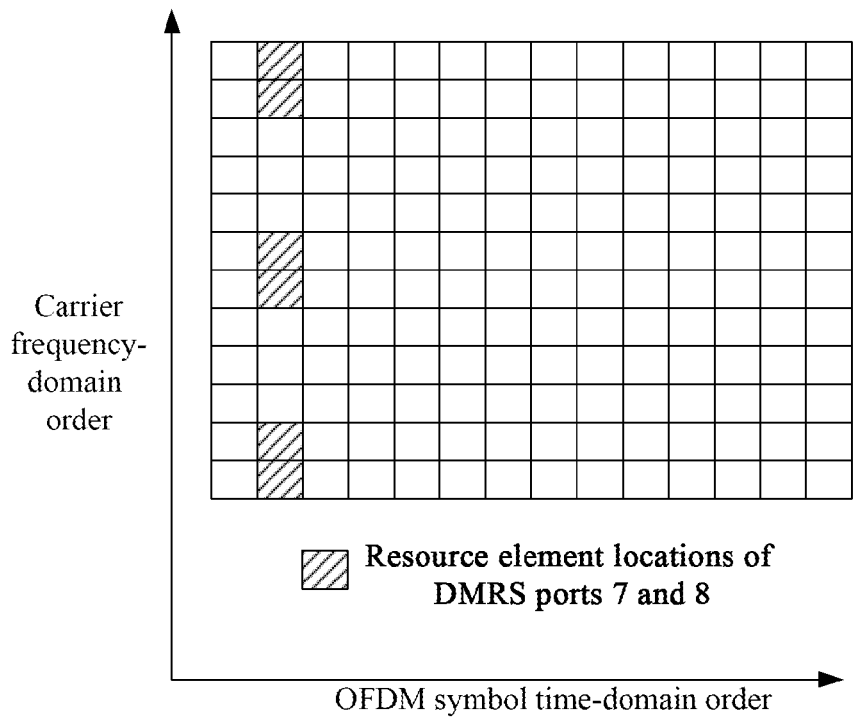

FIG. 13 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 0 or 9, the base station transmits at least one of the DMRS ports 7 and 8 in the $\{1^{st}, 1^{st}, 5^{th}, 6^{th}, 10^{th}, 11^{th}\}$ subcarriers of the OFDM symbol $\{1\}$.

The user equipment receives at least one of the DMRS ports 7 and 8 in the $\{0^{th}, 1^{st}, 5^{th}, 6^{th}, 10^{th}, 11^{th}\}$ subcarriers of the OFDM symbol $\{1\}$.

The Fourteenth Example

Figure 14:
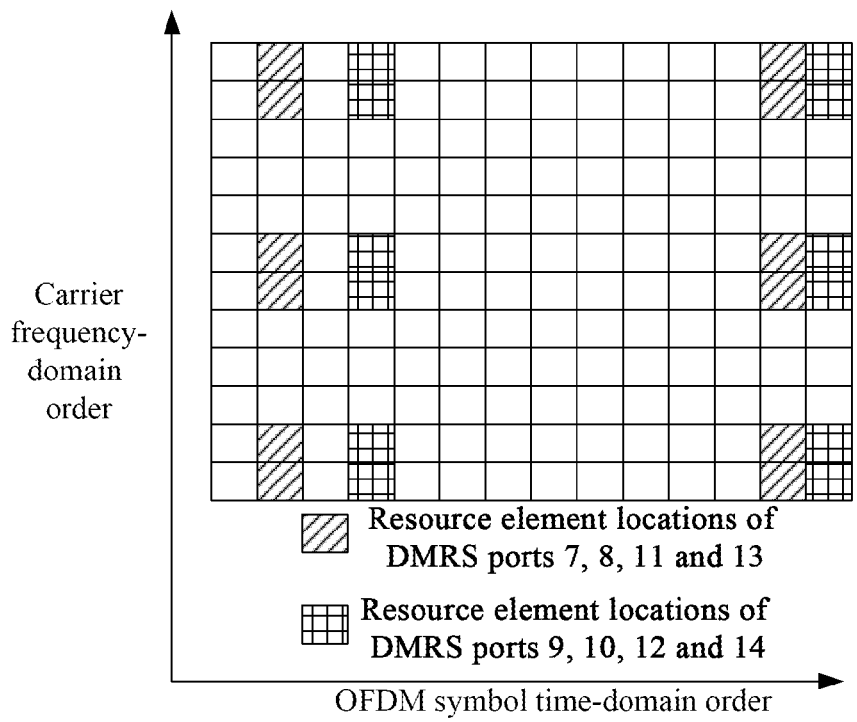

FIG. 14 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length, and the corresponding subframe is a non-special subframe whose subframe type is the subframe type 1 (FDD) or the subframe type 2 (TDD), the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 12\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 13\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 12\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 13\}$.

The Fifteenth Example

Figure 15:
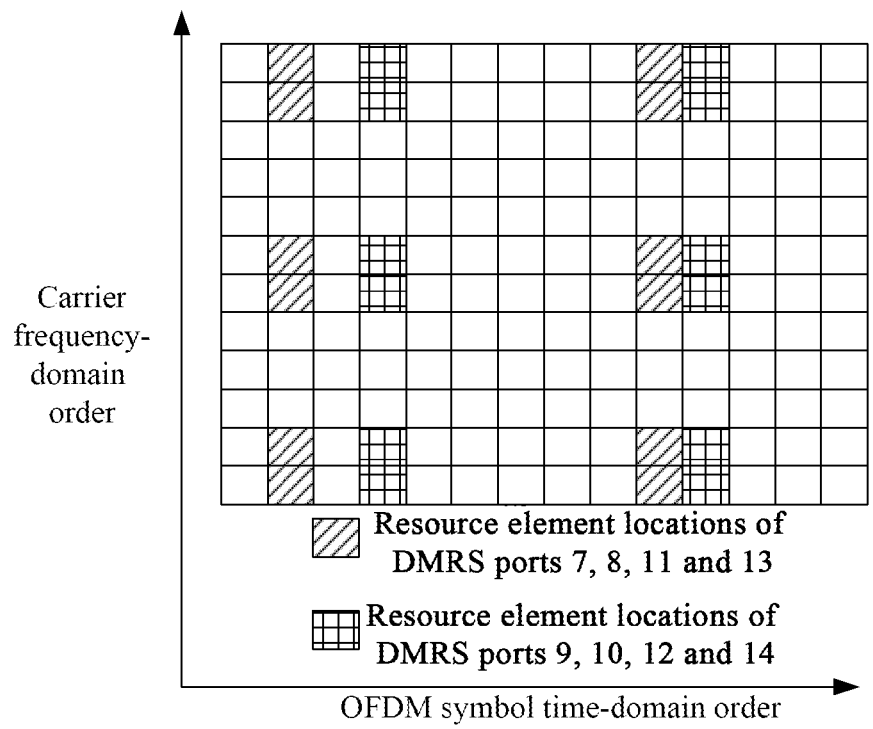

FIG. 15 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 1 (FDD) or the subframe type 2 (TDD) and which is configured as 3 or 4 or 8, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 9\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 10\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 9\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 10\}$.

The Sixteenth Example

Figure 16:
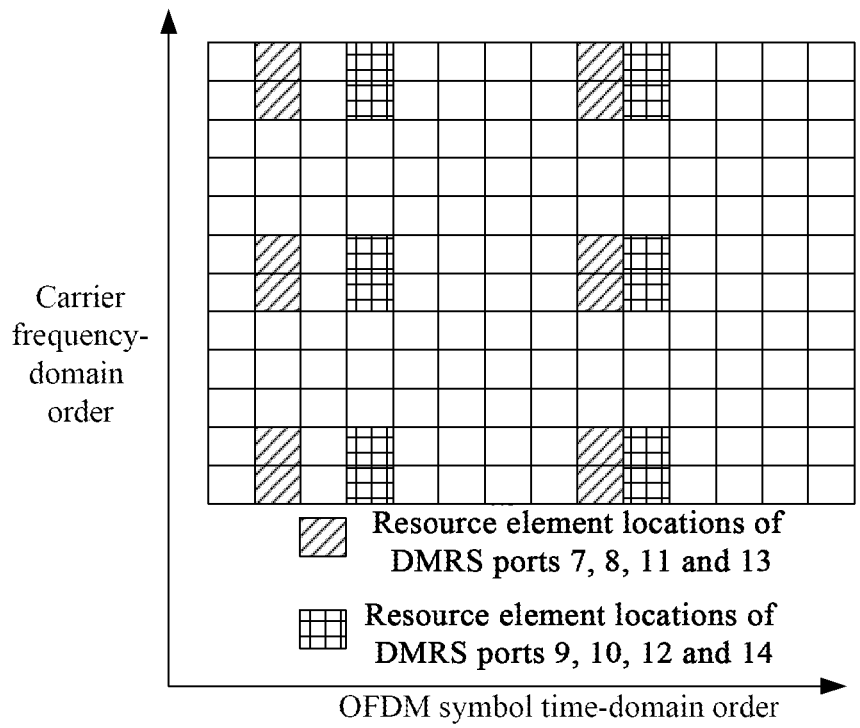

FIG. 16 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 8\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 9\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 8\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 9\}$.

The Seventeenth Example

Figure 17:
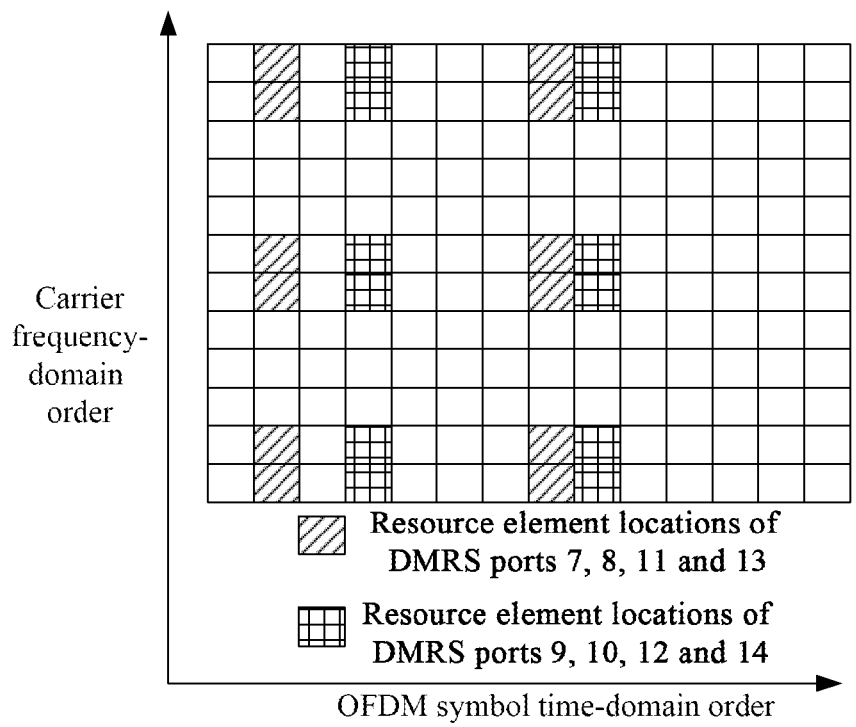

FIG. 17 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 7\}$, and transmits at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 8}.

The user equipment receives at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 7}, and receives at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 8}.

The Eighteenth Example

Figure 18:
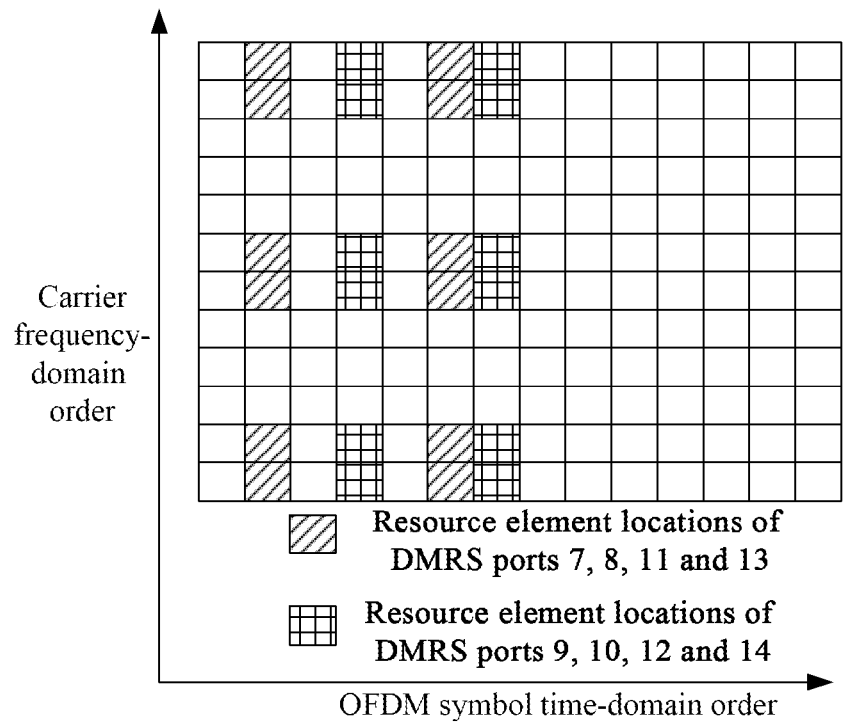

FIG. 18 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length, and the corresponding subframe is a special subframe whose subframe type is the subframe type 2 (TDD) and which is configured as 1 or 2, the base station transmits at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 5}, and transmits at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 6}.

The user equipment receives at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 5}, and receives at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 6}.

The Nineteenth Example

Figure 19:
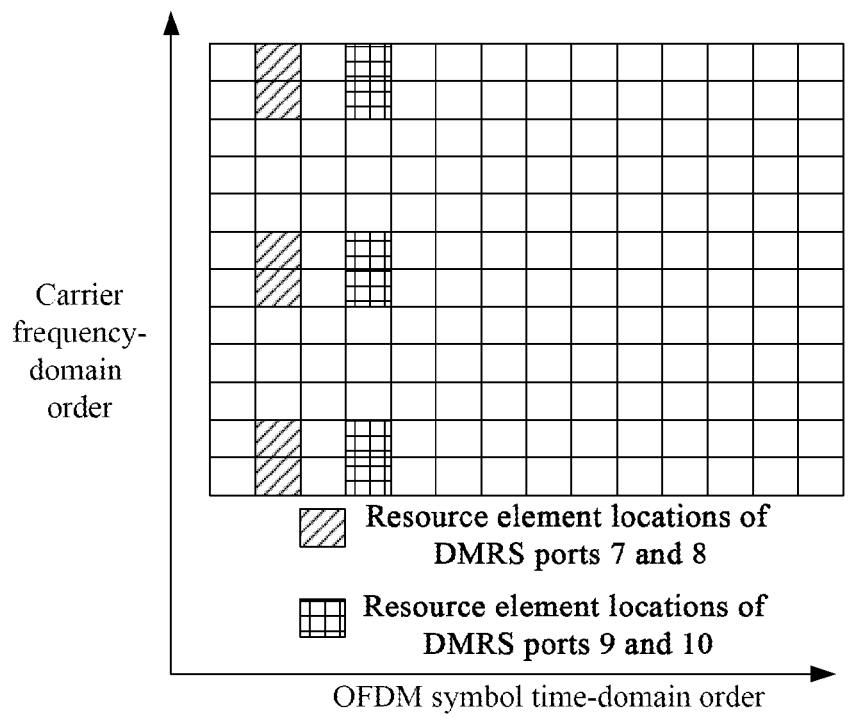

FIG. 19 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 9, the base station transmits at least one of the DMRS ports 7 and 8 in the {$0^{th}$, $1^{st}$, $5^{th}$, $6^{th}$, $10^{th}$, $11^{th}$} subcarriers of the OFDM symbol {1}, and transmits at least one of the DMRS ports 9 and 10 in the {$0^{th}$, $1^{st}$, $5^{th}$, $6^{th}$, $10^{th}$, $11^{th}$} subcarriers of the OFDM symbol {3}.

The user equipment receives at least one of the DMRS ports 7 and 8 in the {$0^{th}$, $1^{st}$, $5^{th}$, $6^{th}$, $10^{th}$, $11^{th}$} subcarriers of the OFDM symbol {1}, and receives at least one of the DMRS ports 9 and 10 in the {$0^{th}$, $1^{st}$, $5^{th}$, $6^{th}$, $10^{th}$, $11^{th}$} subcarriers of the OFDM symbol {3}.

The Twentieth Example

Figure 20:
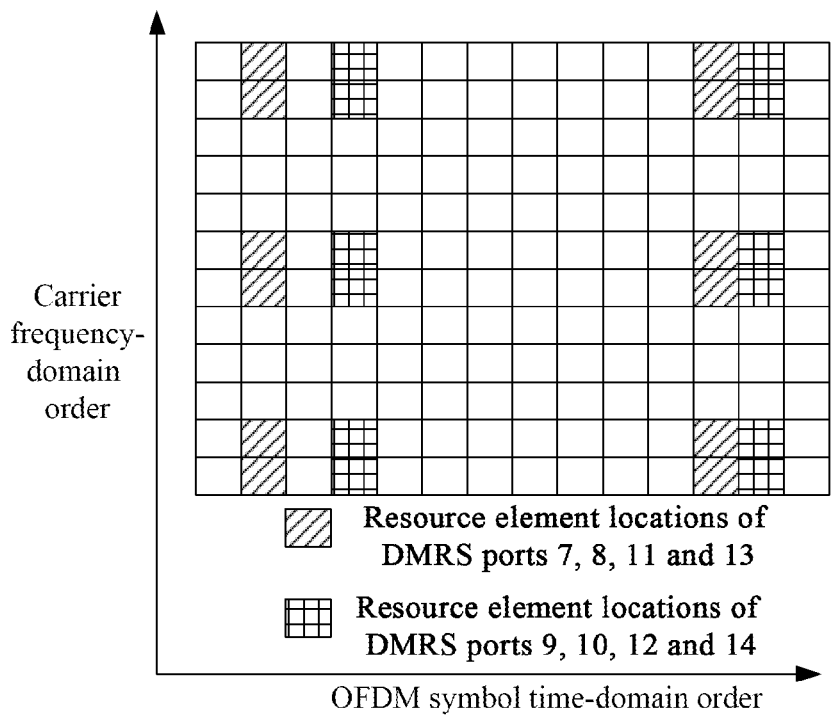

FIG. 20 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 11}, and transmits at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 12}.

The user equipment receives at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 11}, and receives at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 12}.

The Twenty-First Example

Figure 21:
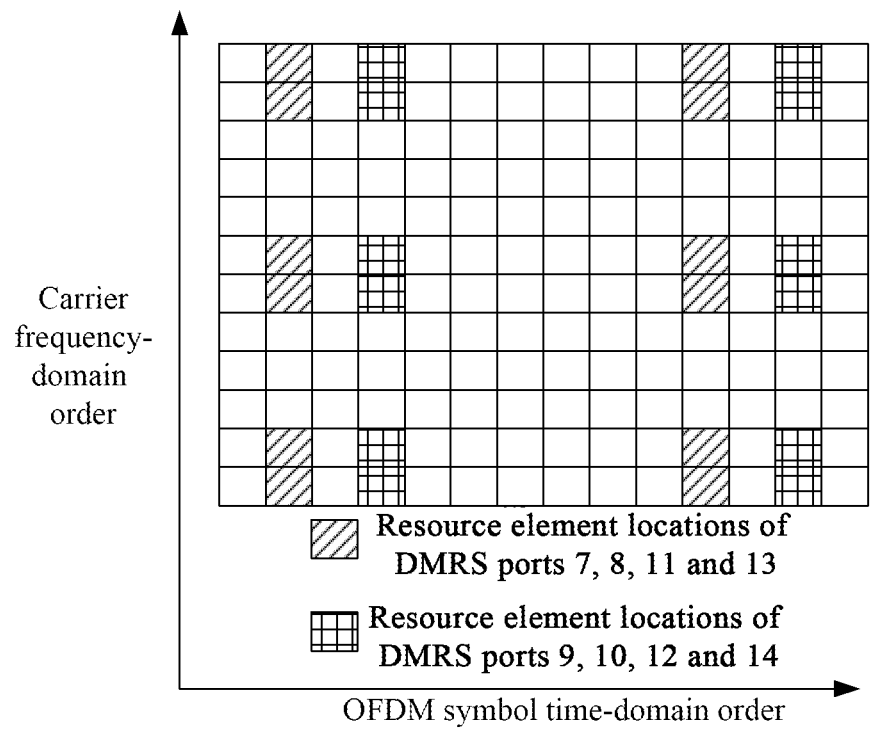

FIG. 21 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 10}, and transmits at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 12}.

The user equipment receives at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 10}, and receives at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 12}.

The Twenty-Second Example

Figure 22:
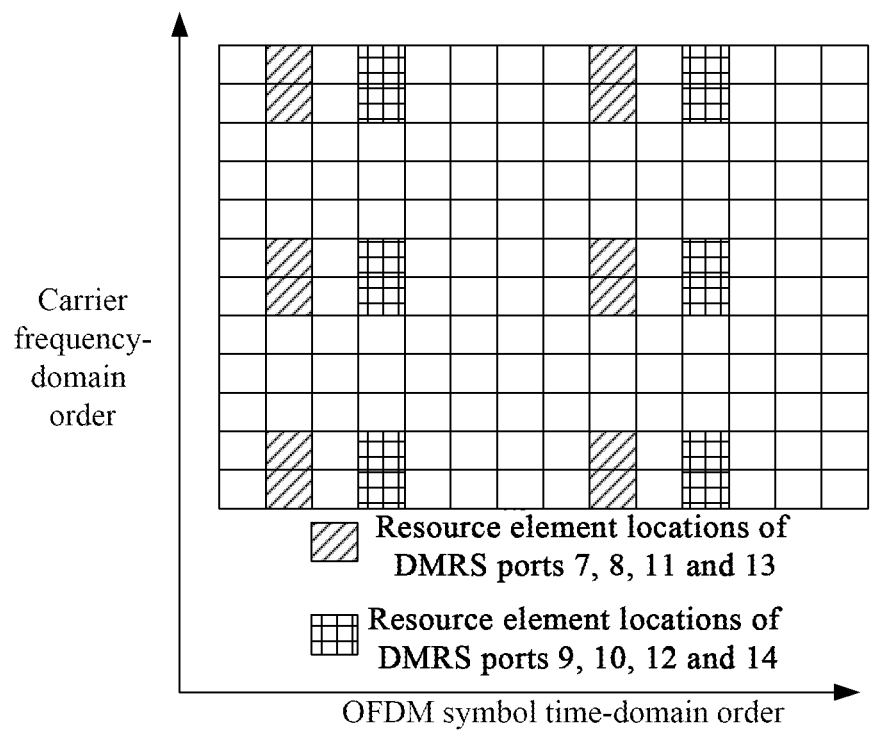

FIG. 22 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic Prefix) has a normal cyclic prefix length and the corresponding subframe is a special subframe whose subframe type is the subframe type 1 (FDD) or the subframe type 2 (TDD) and which is configured as 3 or 4 or 8, the base station transmits at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 8}, and transmits at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 10}.

The user equipment receives at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 8}, and receives at least one of the DMRS ports 9, 10, 12 and 14 in the {$0^{th}$, $1^{st}$, $5^{th}$, $6^{th}$, $10^{th}$, $11^{th}$} subcarriers of the OFDM symbol {3, 10}.

The Twenty-Third Example

Figure 23:
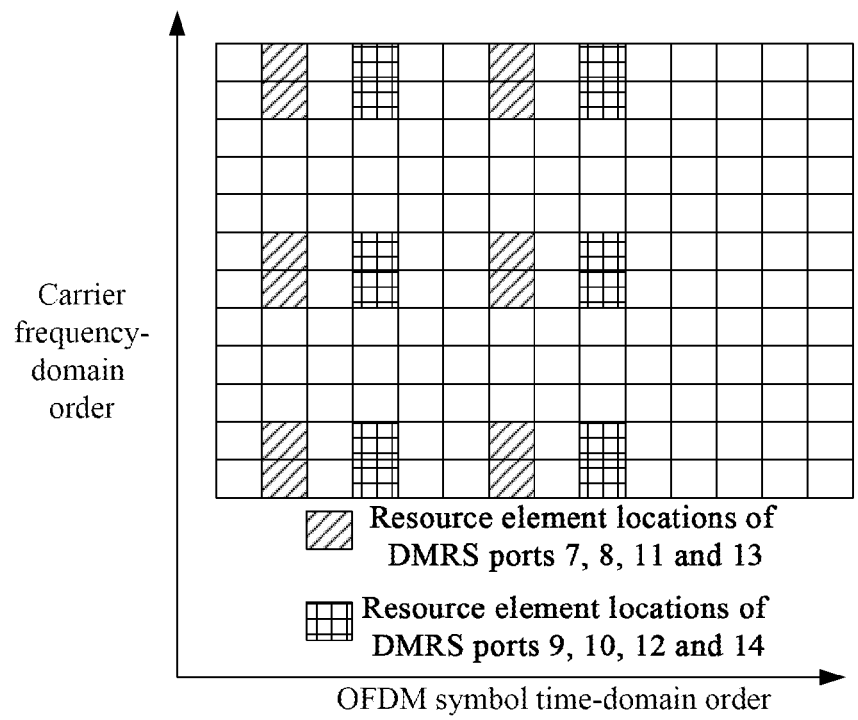

FIG. 23 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length, and the corresponding subframe is a special subframe whose subframe type is the subframe type 2 (TDD) and which is configured as 1 or 2, the base station transmits at least one of the DMRS ports 7, 8, 11 and 13 in the {$0^{th}$, $1^{st}$, $5^{th}$, $6^{th}$, $10^{th}$, $11^{th}$} subcarriers of the OFDM symbol {1, 6}, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 8\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 6\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{3, 8\}$.

The Twenty-Fourth Example

Figure 24:
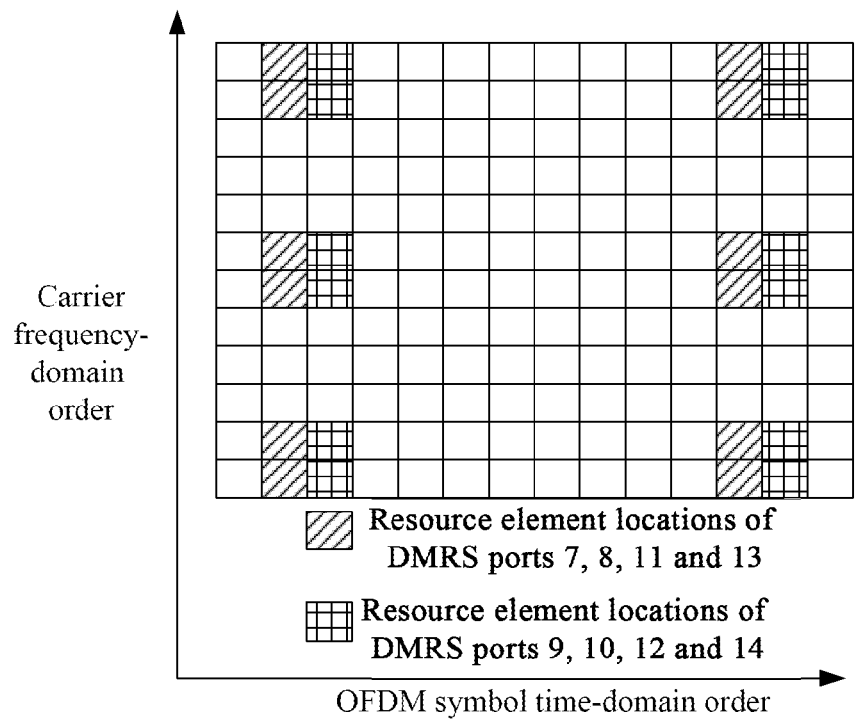

FIG. 24 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 11\}$, and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 12\}$.

The user equipment receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{1, 11\}$, and receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{2, 12\}$.

The Twenty-Fifth Example

As shown in the first example to the twenty-fifth example, the fifty-eighth example, the fifty-ninth example and the sixty-first example, when the base station uses one layer to transmit data, the DMRS port 7 or port 8 is transmitted in corresponding subcarriers of a corresponding OFDM symbol;

when the base station uses two layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein orthogonal masks can be [1,1] and [1, −1].

When the base station uses three layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein orthogonal masks can be [1,1] and [1, −1]; and the port 9 is transmitted in a corresponding subcarrier of a corresponding OFDM symbol.

When the base station uses four layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein orthogonal masks can be [1, 1] and [1, −1]; the port 9 and port 10 are transmitted in corresponding subcarriers of a corresponding OFDM symbol, and two consecutive subcarriers of the same OFDM symbol use the CDM method to multiplex two DMRS ports, wherein orthogonal masks can be [1, 1] and [1, −1].

When the base station uses five layers to transmit data, the DMRS port 7, port 8, and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein orthogonal masks are any three of [1, 1, 1, 1], [1, 1, −1, −1], [1, −1, −1, 1] and [1, −1, 1, −1]. The ports 9 and 10 are transmitted in corresponding subcarriers of a corresponding OFDM symbol, and two consecutive subcarriers of the same OFDM symbol use the CDM method to multiplex two DMRS ports, wherein the orthogonal masks can be [1, 1] and [1, −1].

When the base station uses six layers to transmit data, the DMRS port 7, port 8, and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1]. The port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1].

When the base station uses seven layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1]. The port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1].

When the base station uses eight layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1]. The port 9, port 10, port 12 and port 14 are transmitted in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

When the user equipment uses one layer to receive data, the DMRS port 7 or port 8 is received in a corresponding subcarrier of a corresponding OFDM symbol;

when the user equipment uses two layers to receives data, the DMRS port 7 and port 8 are received in corresponding subcarriers of a corresponding OFDM symbol, and two consecutive subcarriers of the same OFDM symbol use the CDM method to multiplex two DMRS ports, wherein orthogonal masks are [1,1] and [1, −1].

When the user equipment uses three layers to receives data, the DMRS port 7 and port 8 are received in corresponding subcarriers of corresponding OFDM symbols, and two consecutive subcarriers of the same OFDM symbol use the CDM method to multiplex two DMRS ports, wherein the orthogonal masks can be [1,1] and [1, −1], and the port 9 is received in a corresponding subcarrier of a corresponding OFDM symbol.

When the user equipment uses four layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1]. The port 9 and port 10 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1].

When the user equipment uses five layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1]. The ports 9 and 10 are received in corresponding subcarriers of a corresponding OFDM symbol, and two consecutive subcarriers of the same OFDM symbol use the CDM method to multiplex two DMRS ports, wherein the orthogonal masks can be [1, 1] and [1, −1].

When the user equipment uses six layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are [1, 1, 1, 1], [1, 1, −1, −1], [1, −1, −1, 1] and [1, −1, 1, −1]. The port 9, port 10 and port 12 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1].

When the user equipment uses seven layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1]. The port 9, port 10 and port 12 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1].

When the user equipment uses eight layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1]. The port 9, port 10, port 12 and port 14 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

The Twenty-Sixth Example

Figure 25:
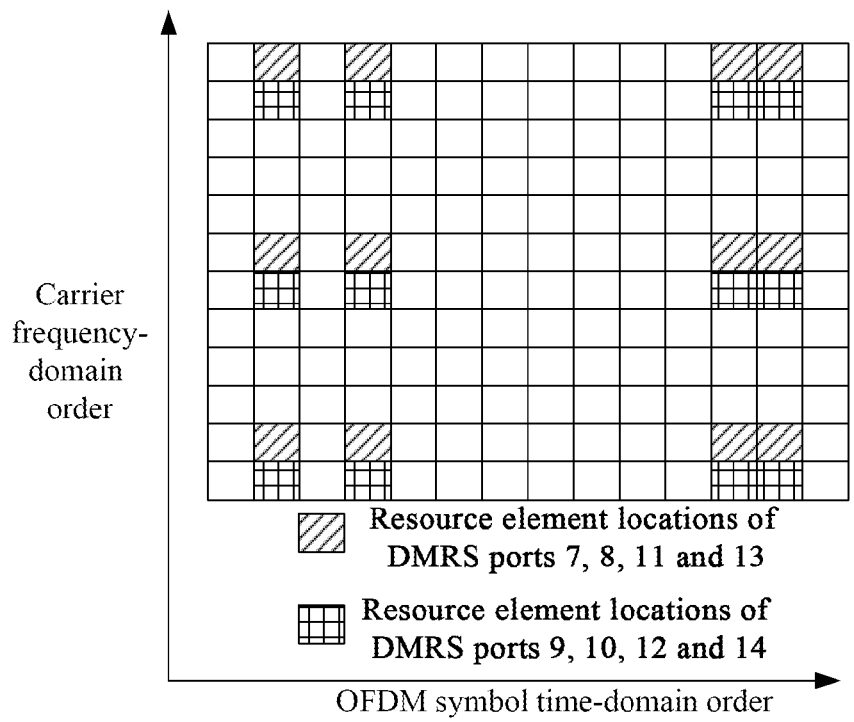

FIG. 25 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the $\{1^{st}, 6^{th}, 11^{th}\}$ subcarriers of the OFDM symbol $\{1, 3, 11, 12\}$, and transmits at least one of the DMRS ports 9, 10, 12 and 14 in the $\{0^{th}, 5^{th}, 10^{th}\}$ subcarriers of the OFDM symbol $\{1, 3, 11, 12\}$.

The user equipment receives at least one of the DMRS ports 7, 8, 11 and 13 in the $\{1^{st}, 6^{th}, 11^{th}\}$ subcarriers of the OFDM symbol $\{1, 3, 11, 12\}$, and receives at least one of the DMRS ports 9, 10, 12 and 14 in the $\{0^{th}, 5^{th}, 10^{th}\}$ subcarriers of the OFDM symbol $\{1, 3, 11, 12\}$.

The Twenty-Seventh Example

Figure 26:
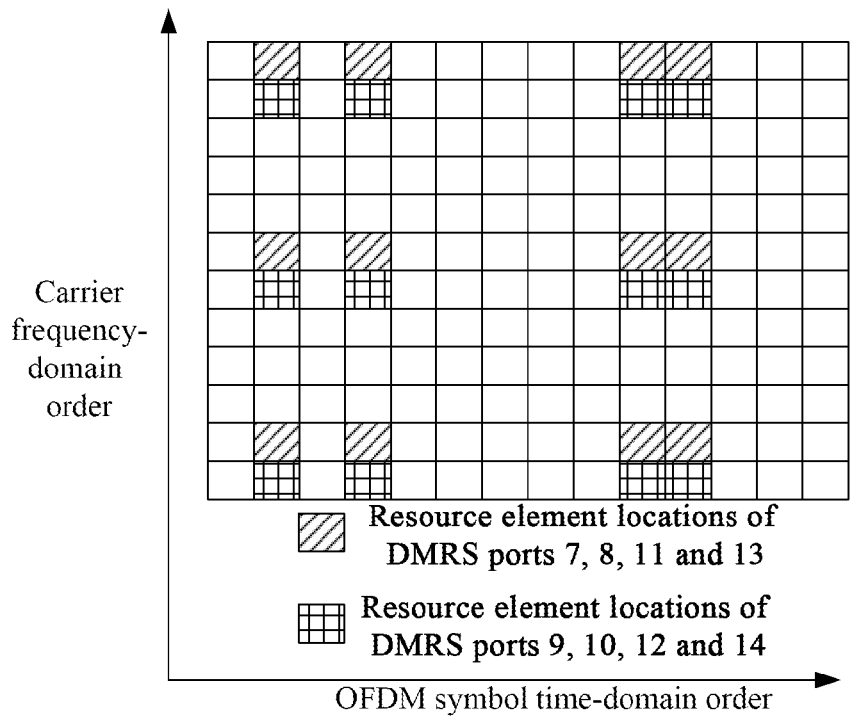

FIG. 26 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD) or a special subframe whose subframe type is the subframe type 2 (TDD) and which is configured as 3 or 4 or 8, the base station transmits at least one of the DMRS ports 7, 8, 11 and 13 in the $\{1^{st}, 6^{th}, 11^{th}\}$ subcarriers of the OFDM symbol $\{1, 3, 9, 10\}$, and transmits at least one of the DMRS ports 9, 10, 12 and 14 in the $\{0^{th}, 5^{th}, 10^{th}\}$ subcarriers of the OFDM symbol $\{1, 3, 9, 10\}$.

The user equipment receives at least one of the DMRS ports 7, 8, 11 and 13 in the $\{1^{st}, 6^{th}, 11^{th}\}$ subcarriers of the OFDM symbol $\{1, 3, 9, 10\}$, and receives at least one of the DMRS ports 9, 10, 12 and 14 in the $\{0^{th}, 5^{th}, 10^{th}\}$ subcarriers of the OFDM symbol $\{1, 3, 9, 10\}$.

The Twenty-Eighth Example

Figure 27:
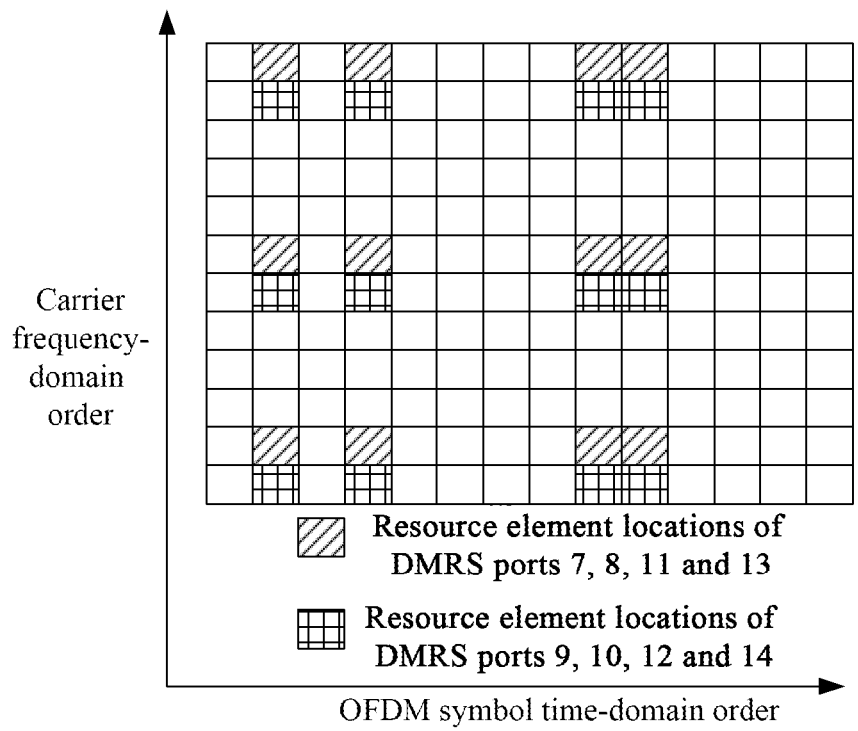

FIG. 27 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2, the base station transmits at least one of the DMRS ports 7, 8, 11 and 13 in the $\{1^{st}, 6^{th}, 11^{th}\}$ subcarriers of the OFDM symbol $\{1, 3, 8, 9\}$, and transmits at least one of the DMRS ports 9, 10, 12 and 14 in the $\{0^{st}, 5^{th}, 10^{th}\}$ subcarriers of the OFDM symbol $\{1, 3, 8, 9\}$.

The user equipment receives at least one of the DMRS ports 7, 8, 11 and 13 in the $\{1^{st}, 6^{th}, 11^{th}\}$ subcarriers of the OFDM symbol $\{1, 3, 8, 9\}$, and receives at least one of the DMRS ports 9, 10, 12 and 14 in the $\{0^{th}, 5^{th}, 10^{th}\}$ subcarriers of the OFDM symbol $\{1, 3, 8, 9\}$.

The Twenty-Ninth Example

Figure 28:
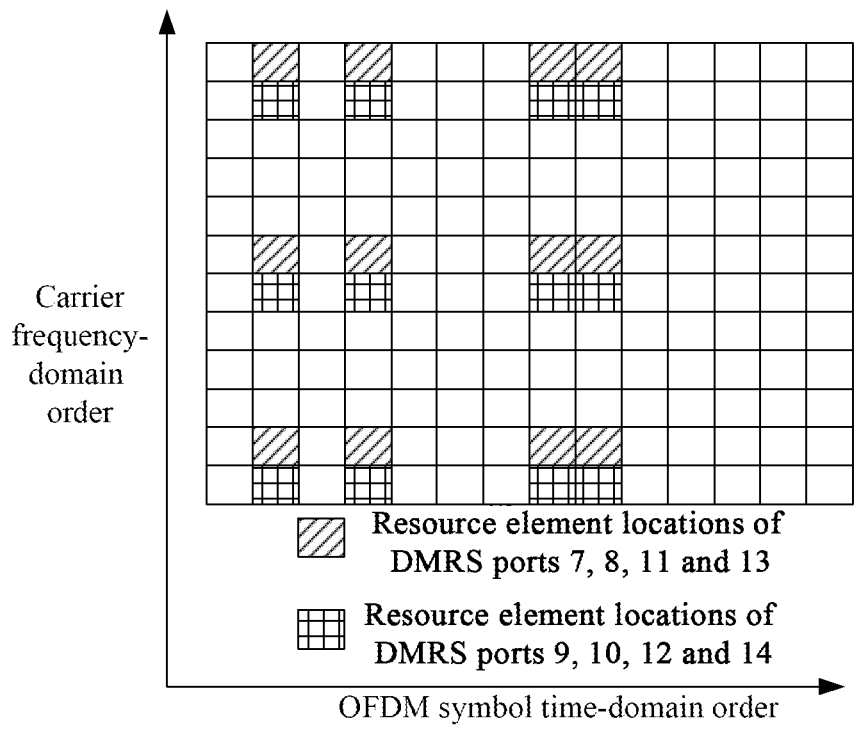

FIG. 28 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{1^{st}, 6^{th}, 11^{th}\}$ subcarriers of the OFDM symbol $\{1, 3, 7, 8\}$, and transmits at least one of the DMRS ports 9, 10, 12 and 14 in the $\{0^{th}, 5^{th}, 10^{th}\}$ subcarriers of the OFDM symbol $\{1, 3, 7, 8\}$.

The user equipment receives at least one of the DMRS ports 7, 8, 11 and 13 in the $\{1^{st}, 6^{th}, 11^{th}\}$ subcarriers of the OFDM symbol $\{1, 3, 7, 8\}$, and receives at least one of the DMRS ports 9, 10, 12 and 14 in the $\{0^{th}, 5^{th}, 10^{th}\}$ subcarriers of the OFDM symbol $\{1, 3, 7, 8\}$.

The Thirtieth Example

Figure 29:
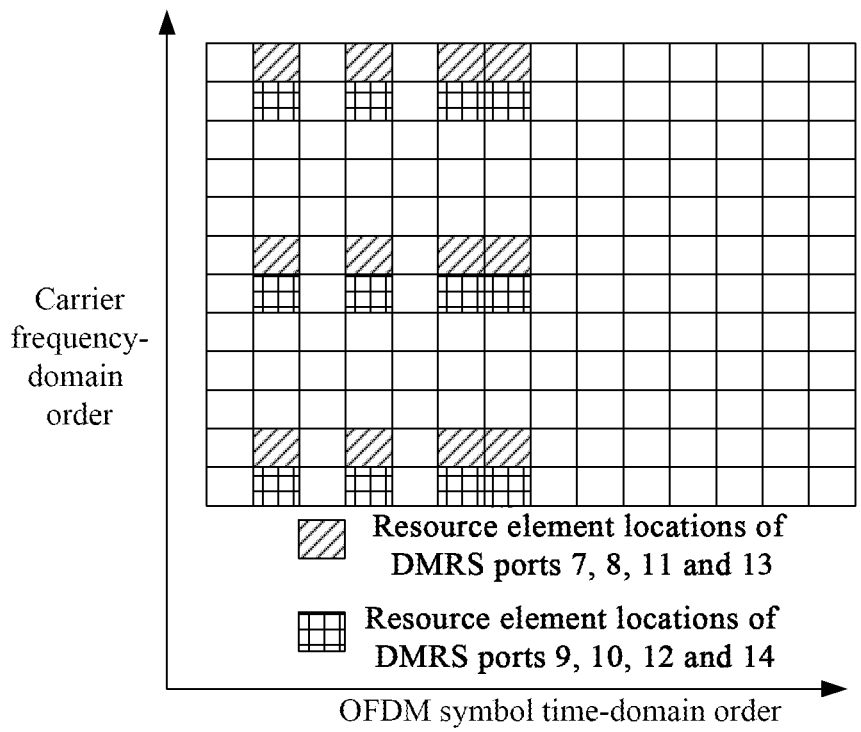

FIG. 29 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic Prefix) has a normal cyclic prefix length and the corresponding subframe is a special subframe whose subframe type is the subframe type 2 (TDD) and which is configured as 1 or 2, the base station transmits at least one of the DMRS ports 7, 8, 11 and 13 in the $\{1^{st}, 6^{th}, 11^{th}\}$ subcarriers of the OFDM symbol $\{1, 3, 5, 6\}$, and transmits at least one of the DMRS ports 9, 10, 12 and 14 in the $\{0^{th}, 5^{th}, 10^{th}\}$ subcarriers of the OFDM symbol $\{1, 3, 5, 6\}$.

The user equipment receives at least one of the DMRS ports 7, 8, 11 and 13 in the $\{1^{st}, 6^{th}, 11^{th}\}$ subcarriers of the OFDM symbol $\{1, 3, 5, 6\}$, and receives at least one of the DMRS ports 9, 10, 12 and 14 in the $\{0^{th}, 5^{th}, 10^{th}\}$ subcarriers of the OFDM symbol $\{1, 3, 5, 6\}$.

The Thirty-First Example

Figure 30:
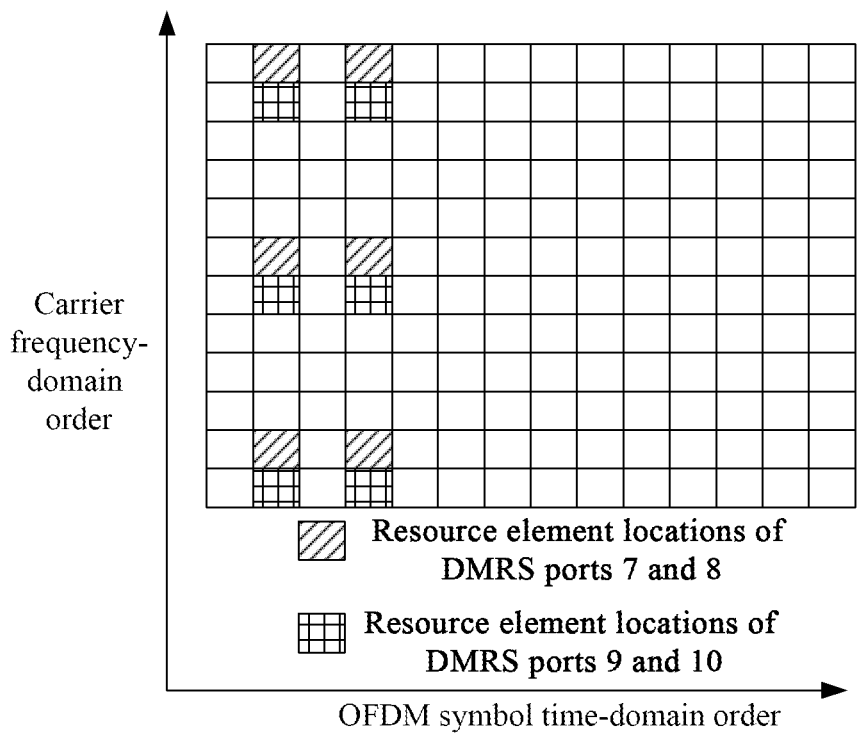

FIG. 30 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 9, the base station transmits at least one of the DMRS ports 7 and 8 in the $\{1^{st}, 6^{th}, 11^{th}\}$ subcarriers of the OFDM symbol $\{1, 3\}$, and transmits at least one of the DMRS ports 9 and 10 in the $\{0^{th}, 5^{th}, 10^{th}\}$ subcarriers of the OFDM symbol $\{1, 3\}$.

The user equipment receives at least one of the DMRS ports 7 and 8 in the $\{1^{st}, 6^{th}, 11^{th}\}$ subcarriers of the OFDM symbol $\{1, 3\}$, and receives at least one of the DMRS ports 9 and 10 in the $\{0^{th}, 5^{th}, 10^{th}\}$ subcarriers of the OFDM symbol $\{1, 3\}$.

The Thirty-Second Example

Figure 31:
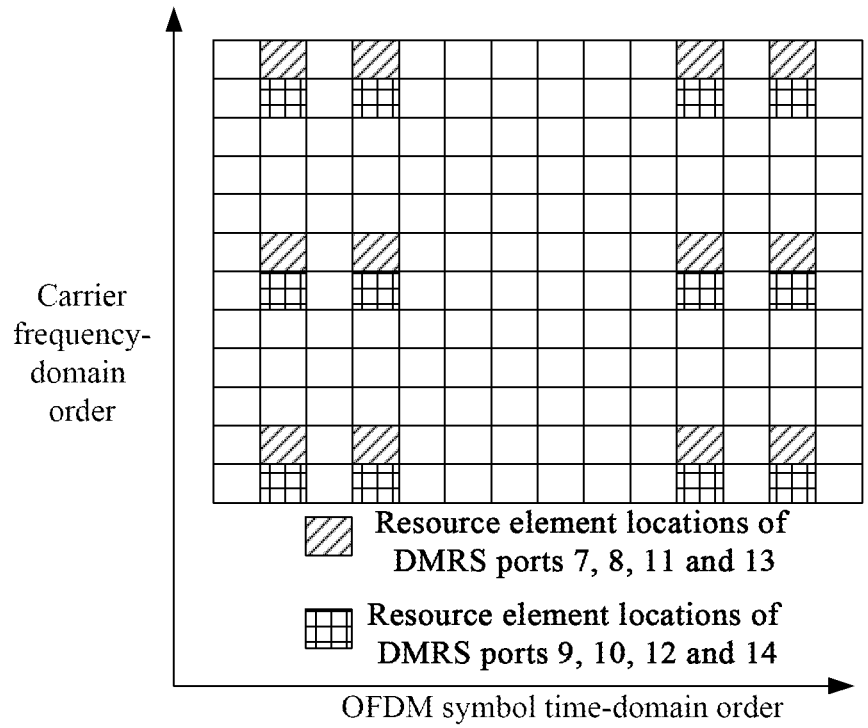

FIG. 31 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 or the subframe type 2 (TDD), the base station transmits at least one of the DMRS ports 7, 8, 11 and 13 in the $\{1^{st}, 6^{th}, 11^{th}\}$ subcarriers of the OFDM symbol $\{1, 3, 10, 12\}$, and transmits at least one of the DMRS ports 9, 10, 12 and 14 in the $\{0^{th}, 5^{th}, 10^{th}\}$ subcarriers of the OFDM symbol $\{1, 3, 10, 12\}$.

The user equipment receives at least one of the DMRS ports 7, 8, 11 and 13 in the $\{1^{st}, 6^{th}, 11^{th}\}$ subcarriers of the OFDM symbol $\{1, 3, 10, 12\}$, and receives at least one of the DMRS ports 9, 10, 12 and 14 in the $\{0^{th}, 5^{th}, 10^{th}\}$ subcarriers of the OFDM symbol $\{1, 3, 10, 12\}$.

The Thirty-Third Example

Figure 32:
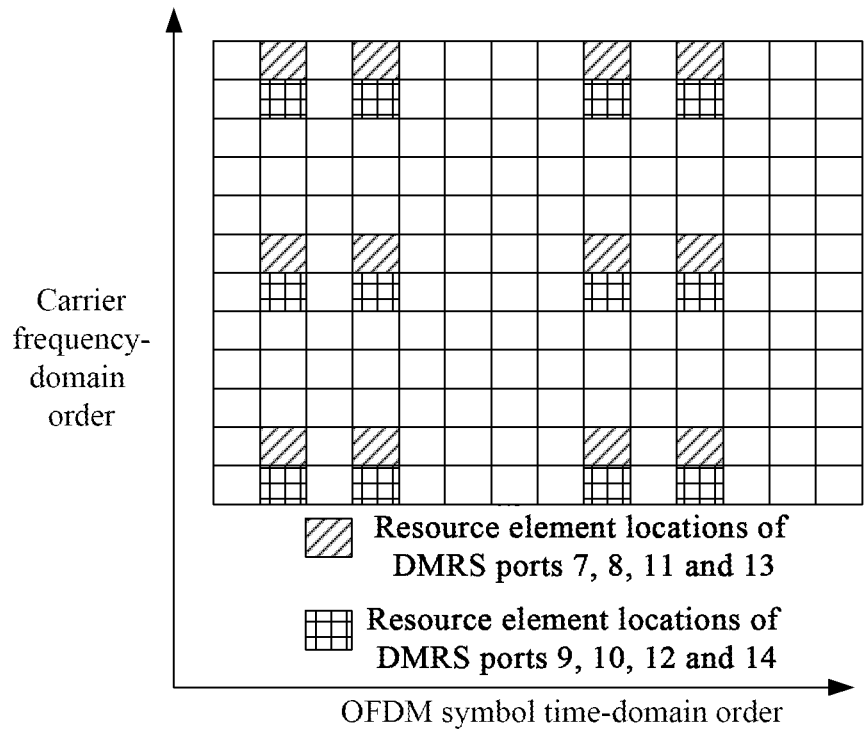

FIG. 32 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 3 or 4 or 8, the base station transmits at least one of the DMRS ports 7, 8, 11 and 13 in the $\{1^{st}, 6^{th}, 11^{th}\}$ subcarriers of the OFDM symbol $\{1, 3, 8, 10\}$, and transmits at least one of the DMRS ports 9, 10, 12 and 14 in the $\{0^{th}, 5^{th}, 10^{th}\}$ subcarriers of the OFDM symbol $\{1, 3, 8, 10\}$.

The user equipment receives at least one of the DMRS ports 7, 8, 11 and 13 in the $\{1^{st}, 6^{th}, 11^{th}\}$ subcarriers of the OFDM symbol $\{1, 3, 8, 10\}$, and receives at least one of the DMRS ports 9, 10, 12 and 14 in the $\{0^{th}, 5^{th}, 10^{th}\}$ subcarriers of the OFDM symbol $\{1, 3, 8, 10\}$.

The Thirty-Fourth Example

Figure 33:
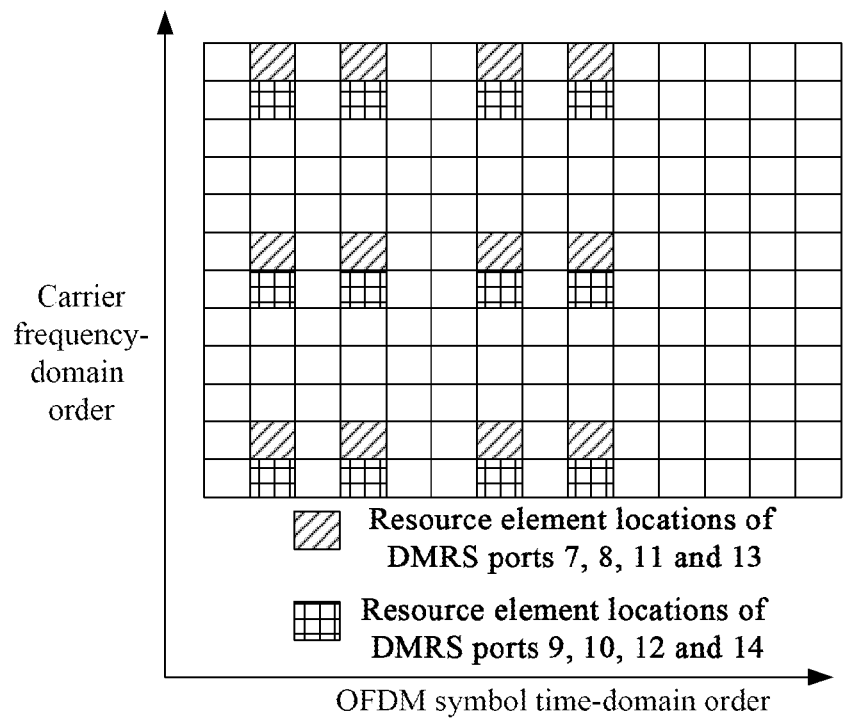

FIG. 33 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 3 or 4 or 8, the base station transmits at least one of the DMRS ports 7, 8, 11 and 13 in the $\{1^{st}, 6^{th}, 11^{th}\}$ subcarriers of the OFDM symbol $\{1, 3, 6^{th}, 8\}$, and transmits at least one of the DMRS ports 9, 10, 12 and 14 in the $\{0^{th}, 5^{th}, 10^{th}\}$ subcarriers of the OFDM symbol $\{1, 3, 6, 8\}$.

The user equipment receives at least one of the DMRS ports 7, 8, 11 and 13 in the $\{1^{st}, 6^{th}, 11^{th}\}$ subcarriers of the OFDM symbol $\{1, 3, 6^{th}, 8\}$, and receives at least one of the DMRS ports 9, 10, 12 and 14 in the $\{0^{th}, 5^{th}, 10^{th}\}$ subcarriers of the OFDM symbol $\{1, 3, 6^{th}, 8\}$.

The Thirty-Fifth Example

Figure 34:
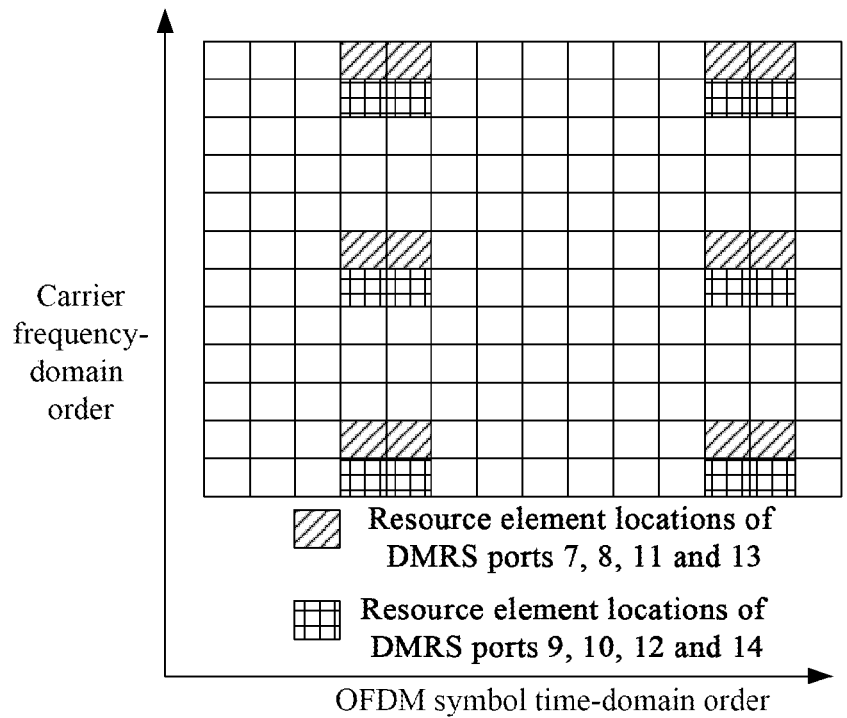

FIG. 34 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the $\{1^{st}, 6^{th}, 11^{th}\}$ subcarriers of the OFDM symbol $\{3, 4, 11, 12\}$, and transmits at least one of the DMRS ports 9, 10, 12 and 14 in the $\{0^{th}, 5^{th}, 10^{th}\}$ subcarriers of the OFDM symbol $\{3, 4, 11, 12\}$.

The user equipment receives at least one of the DMRS ports 7, 8, 11 and 13 in the $\{1^{st}, 6^{th}, 11^{th}\}$ subcarriers of the OFDM symbol $\{3, 4, 11, 12\}$, and receives at least one of the DMRS ports 9, 10, 12 and 14 in the $\{0^{th}, 5^{th}, 10^{th}\}$ subcarriers of the OFDM symbol $\{3, 4, 11, 12\}$.

The Thirty-Sixth Example

Figure 35:
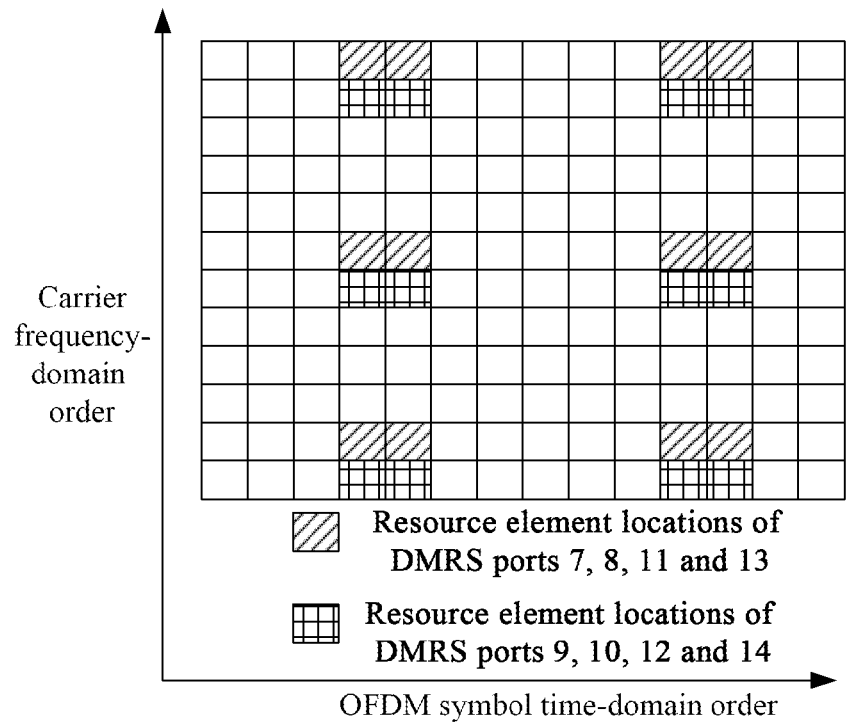

FIG. 35 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD) or a special subframe whose subframe type is the subframe type 2 (TDD) and which is configured as 3 or 4 or 8, the base station transmits at least one of the DMRS ports 7, 8, 11 and 13 in the $\{1^{st}, 6^{th}, 11^{th}\}$ subcarriers of the OFDM symbol $\{3, 4, 10, 11\}$, and transmits at least one of the DMRS ports 9, 10, 12 and 14 in the $\{0^{th}, 5^{th}, 10^{th}\}$ subcarriers of the OFDM symbol $\{3, 4, 10^{th}, 11\}$.

The user equipment receives at least one of the DMRS ports 7, 8, 11 and 13 in the $\{1^{st}, 6^{th}, 11^{th}\}$ subcarriers of the OFDM symbol $\{3, 4, 10^{th}, 11\}$, and receives at least one of the DMRS ports 9, 10, 12 and 14 in the $\{0^{th}, 5^{th}, 10^{th}\}$ subcarriers of the OFDM symbol $\{3, 4, 10^{th}, 11\}$.

The Thirty-Seventh Example

Figure 36:
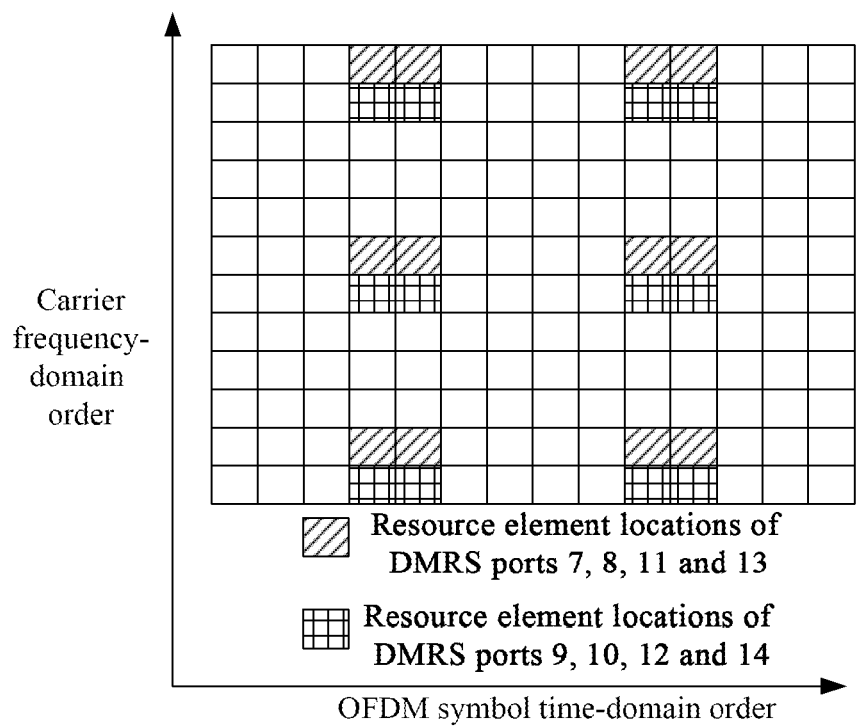

FIG. 36 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2 or 3 or 4 or 8, the base station transmits at least one of the DMRS ports 7, 8, 11 and 13 in the $\{1^{st}, 6^{th}, 11^{th}\}$ subcarriers of the OFDM symbol $\{3, 4, 9, 10\}$ and transmits at least one of the DMRS ports 9, 10, 12 and 14 in the $\{0^{th}, 5^{th}, 10^{th}\}$ subcarriers of the OFDM symbol $\{3, 4, 9, 10\}$.

The user equipment receives at least one of the DMRS ports 7, 8, 11 and 13 in the $\{1^{st}, 6^{th}, 11^{th}\}$ subcarriers of the OFDM symbol $\{3, 4, 9, 10\}$, and receives at least one of the DMRS ports 9, 10, 12 and 14 in the $\{0^{th}, 5^{th}, 10^{th}\}$ subcarriers of the OFDM symbol $\{3, 4, 9, 10\}$.

The Thirty-Eighth Example

Figure 37:
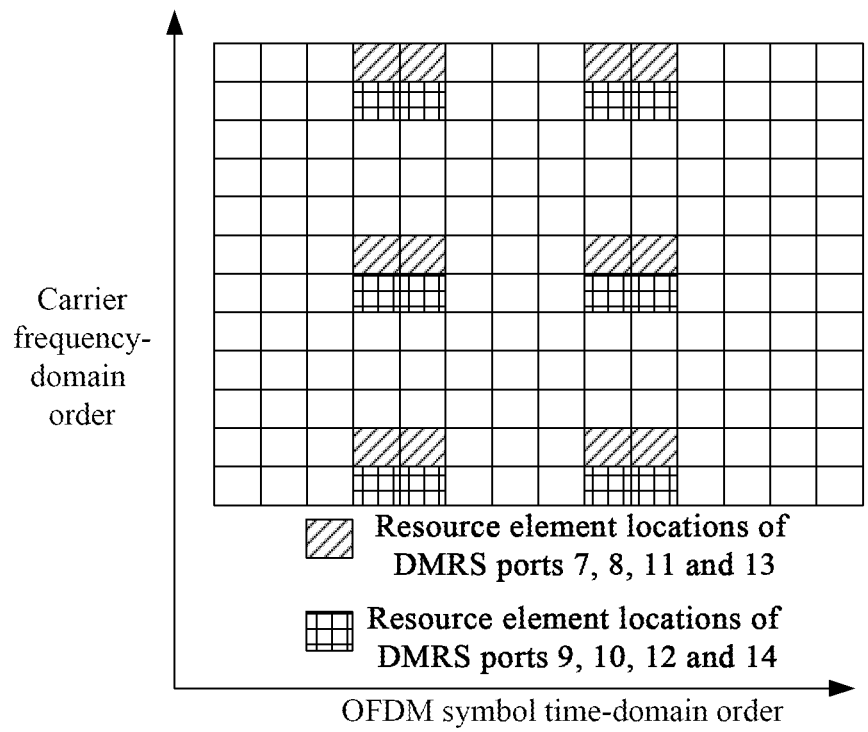

FIG. 37 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2 or 3 or 4 or 8, the base station transmits at least one of the DMRS ports 7, 8, 11 and 13 in the $\{1^{st}, 6^{th}, 11^{th}\}$ subcarriers of the OFDM symbol $\{3, 4, 8, 9\}$ and transmits at least one of the DMRS ports 9, 10, 12 and 14 in the $\{0^{th}, 5^{th}, 10^{th}\}$ subcarriers of the OFDM symbol $\{3, 4, 8, 9\}$.

The user equipment receives at least one of the DMRS ports 7, 8, 11 and 13 in the $\{1^{st}, 6^{th}, 11^{th}\}$ subcarriers of the OFDM symbol $\{3, 4, 8, 9\}$, and receives at least one of the DMRS ports 9, 10, 12 and 14 in the $\{0^{th}, 5^{th}, 10^{th}\}$ subcarriers of the OFDM symbol $\{3, 4, 8, 9\}$.

The Thirty-Ninth Example

Figure 38:
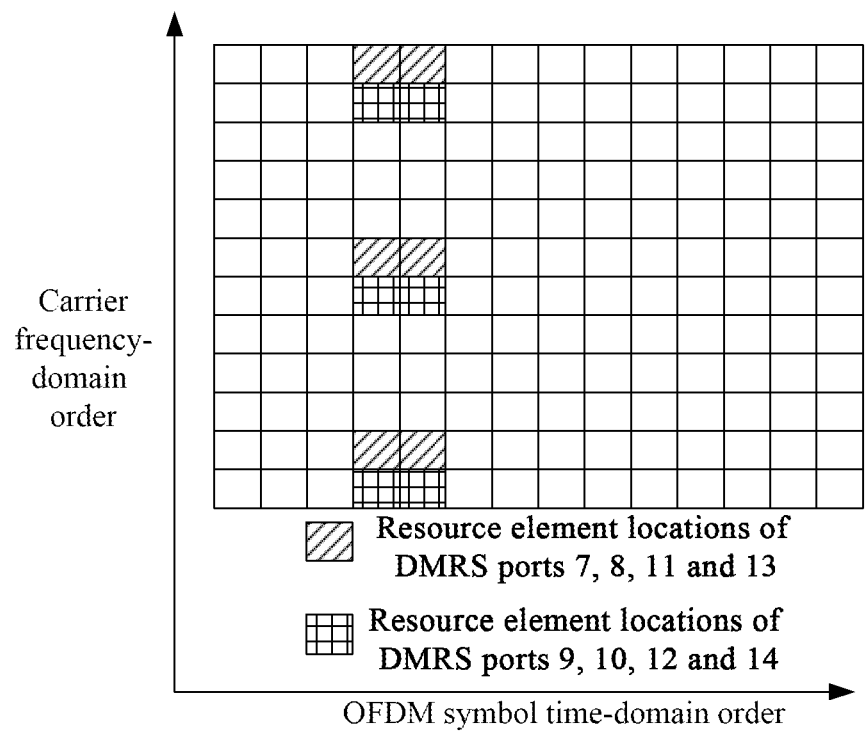

FIG. 38 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a special subframe whose subframe type is the subframe type 2 (TDD) and which is configured as 2 or 3 or 4 or 8, the base station transmits at least one of the DMRS ports 7 and 8 in the $\{1^{st}, 6^{th}, 11^{th}\}$ subcarriers of the OFDM symbol $\{3, 4\}$ and transmits at least one of the DMRS ports 9 and 10 in the $\{0^{th}, 5^{th}, 10^{th}\}$ subcarriers of the OFDM symbol $\{3, 4\}$.

The user equipment receives at least one of the DMRS ports 7 and 8 in the $\{1^{st}, 6^{th}, 11^{th}\}$ subcarriers of the OFDM symbol {3, 4}, and receives at least one of the DMRS ports 9 and 10 in the {0$^{th}$, 5$^{th}$, 10$^{th}$} subcarriers of the OFDM symbol {3, 4}.

The Fortieth Example

Figure 39:
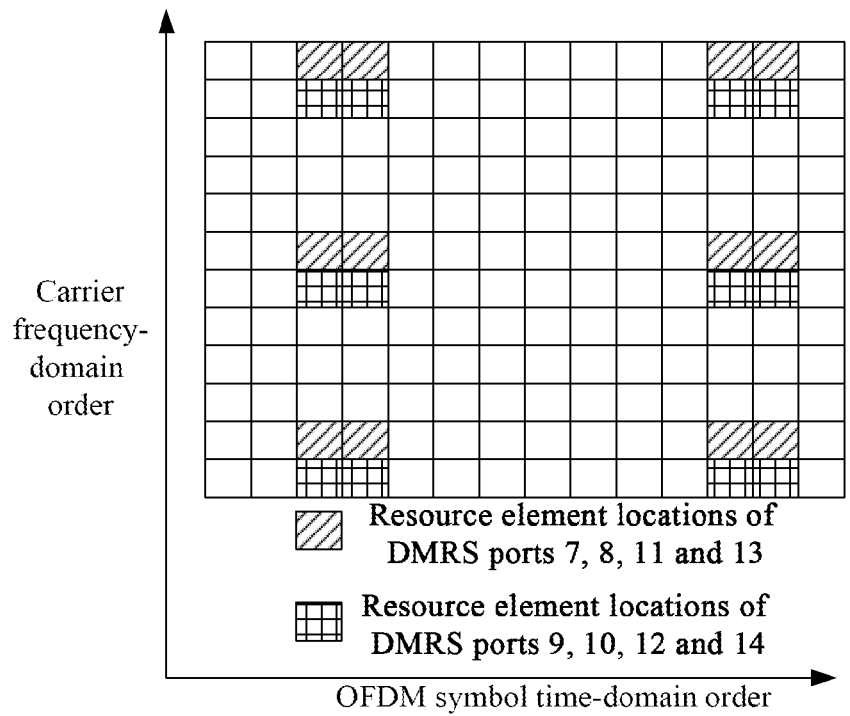

FIG. 39 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {1$^{st}$, 6$^{th}$, 11$^{th}$} subcarriers of the OFDM symbol {2, 3, 11, 12} and transmits at least one of the DMRS ports 9, 10, 12 and 14 in the {0$^{th}$, 5$^{th}$, 10$^{th}$} subcarriers of the OFDM symbol {2, 3, 11, 12}.

The user equipment receives at least one of the DMRS ports 7, 8, 11 and 13 in the {1$^{st}$, 6$^{th}$, 11$^{th}$} subcarriers of the OFDM symbol {2, 3, 11, 12}, and receives at least one of the DMRS ports 9, 10, 12 and 14 in the {0$^{th}$, 5$^{th}$, 10$^{th}$} subcarriers of the OFDM symbol {2, 3, 11, 12}.

The Forty-First Example

Figure 40:
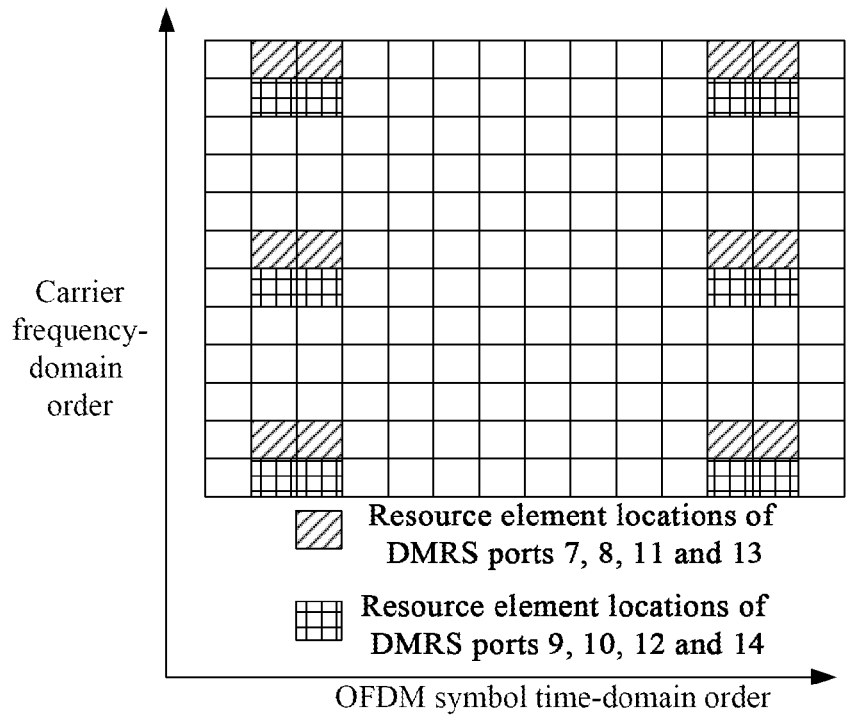

FIG. 40 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {1$^{st}$, 6$^{th}$, 11$^{th}$} subcarriers of the OFDM symbol {1, 2, 11, 12} and transmits at least one of the DMRS ports 9, 10, 12 and 14 in the {0$^{th}$, 5$^{th}$, 10$^{th}$} subcarriers of the OFDM symbol {1, 2, 11, 12}.

The user equipment receives at least one of the DMRS ports 7, 8, 11 and 13 in the {1$^{st}$, 6$^{th}$, 11$^{th}$} subcarriers of the OFDM symbol {1, 2, 11, 12}, and receives at least one of the DMRS ports 9, 10, 12 and 14 in the {0$^{th}$, 5$^{th}$, 10$^{th}$} subcarriers of the OFDM symbol {1, 2, 11, 12}.

The Forty-Second Example

Based on the twenty-sixth example to the forty-first example, and the sixtieth example, when the base station uses one layer to transmit data, the DMRS port 7 or port 8 is transmitted in corresponding subcarrier resource elements of a corresponding OFDM symbol.

When the base station uses two layers to transmit data, the DMRS port 7 and port 8 are transmitted in corresponding subcarriers of a corresponding OFDM symbol, and two resource elements of the same subcarriers of two consecutive OFDM symbols or two closest adjacent OFDM symbols use the CDM method to multiplex two DMRS ports, wherein orthogonal masks can be [1,1] and [1, −1].

When the base station uses three layers to transmit data, the DMRS port 7 and port 8 are transmitted in corresponding subcarriers of a corresponding OFDM symbol, and two resource elements of the same subcarriers of two consecutive OFDM symbols or two closest adjacent OFDM symbols use the CDM method to multiplex two DMRS ports, wherein orthogonal masks can be [1, 1] and [1, −1]. The port 9 is transmitted in a corresponding subcarrier resource element of a corresponding OFDM symbol.

When the base station uses four layers to transmit data, the DMRS port 7 and port 8 are transmitted in corresponding subcarriers of corresponding OFDM symbols, two resource elements of the same subcarriers of two consecutive OFDM symbols or two closest adjacent OFDM symbols use the CDM method to multiplex two DMRS ports, wherein orthogonal masks can be [1, 1] and [1, −1]. The DMRS port 9 and port 10 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein orthogonal masks can be [1, 1] and [1, −1].

When the base station uses five layers to transmit data, the DMRS port 7, port 8, and port 11 are transmitted in corresponding subcarriers of corresponding OFDM symbols, and a total of four resource elements: the same subcarriers of four OFDM symbols use the CDM method to multiplex three DMRS ports, wherein orthogonal masks are any three of [1, 1, 1, 1], [1, 1, −1, −1], [1, −1, −1, 1] and [1, −1, 1, −1]. The DMRS ports 9 and 10 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1].

When the base station uses six layers to transmit data, the DMRS port 7, port 8 and port 11 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1]. The DMRS port 9, port 10 and port 12 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1].

When the base station uses seven layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1]. The DMRS port 9, port 10 and port 12 are transmitted in corresponding subcarriers of corresponding OFDM symbols, a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1].

When the base station uses eight layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1]. The DMRS port 9, port 10, port 12 and port 14 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

When the user equipment uses one layer to receive data, the DMRS port 7 or port 8 is received in a corresponding subcarrier resource element of a corresponding OFDM symbol;

and/or, when the user equipment uses two layers to receives data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1,1] and [1, −1].

And/or, when the user equipment uses three layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1,1] and [1, −1]. The port 9 is received in a corresponding subcarrier resource element of a corresponding OFDM symbol.

And/or, when the user equipment uses four layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1]. The DMRS port 9 and port 10 are received in corresponding subcarriers of a corresponding OFDM symbol, and two resource elements of the same subcarriers of two consecutive OFDM symbols or two closest adjacent OFDM symbols use the CDM method to multiplex two DMRS ports, wherein the orthogonal masks are [1, 1] and [1, −1].

And/or, when the user equipment uses five layers to receive data, the DMRS port 7, port 8 and port 11 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1]. The ports 9 and 10 are received in corresponding subcarriers of corresponding OFDM symbols, wherein the same subcarriers of two consecutive OFDM symbols or two closest adjacent OFDM symbols use the CDM method to multiplex two DMRS ports, wherein the orthogonal masks can be [1, 1] and [1, −1].

And/or, when the user equipment uses six layers to receive data, the DMRS port 7, port 8 and port 11 are received in corresponding subcarriers of corresponding OFDM symbols, and a total of four resource elements: the same subcarriers of four OFDM symbol use the CDM method to multiplex three DMRS ports, wherein the orthogonal masks are any three of [1, 1, 1, 1], [1, 1, −1, −1], [1, −1, −1, 1] and [1, −1, 1, −1]. The port 9, port 10 and port 12 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1].

And/or, when the user equipment uses seven layers to receive data, the DMRS port 7, port 8, port 11 and port 13 are received in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1]. The port 9, port 10 and port 12 are received in corresponding subcarriers of corresponding OFDM symbols, a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1].

And/or, when the user equipment uses eight layers to receive data, the DMRS port 7, port 8, port 11 and port 13 are received in corresponding subcarriers of corresponding OFDM symbols, a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1]. The port 9, port 10, port 12 and port 14 are received in corresponding subcarriers of corresponding OFDM symbols, a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

The Forty-Third Example

Figure 41:
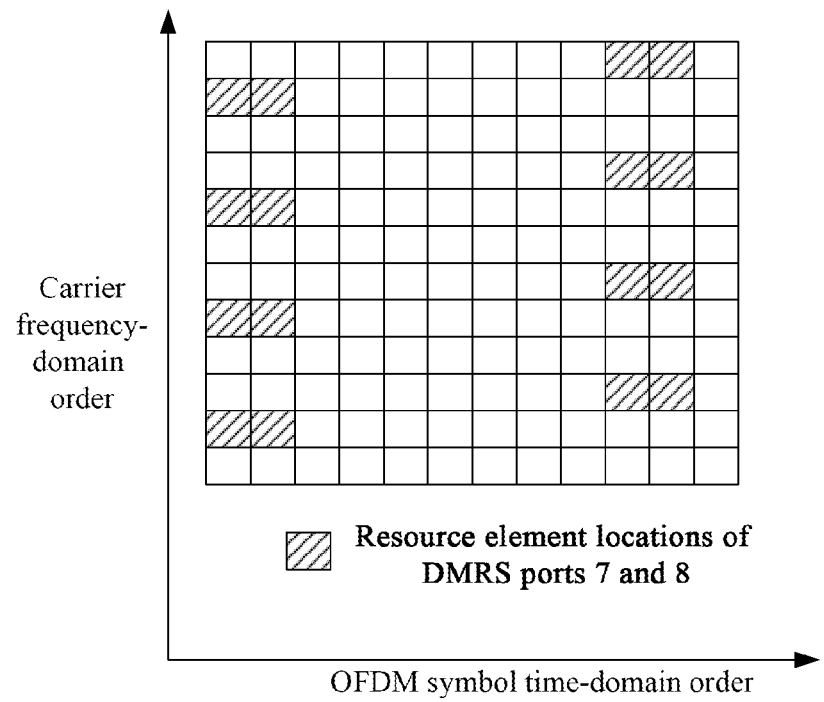
FIGS. 41~53, 58, 59 and 60 are schematic diagrams of extended CP DMRS mapping drawings in present examples.

FIG. 41 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a non-special subframe whose subframe type is the subframe type 1 (FDD) or the subframe type 2 (TDD), the base station transmits at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{9, 10\}$.

The user equipment receives at least one of the DMRS ports 7 and 8 on the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{9, 10\}$.

The Forty-Fourth Example

Figure 42:
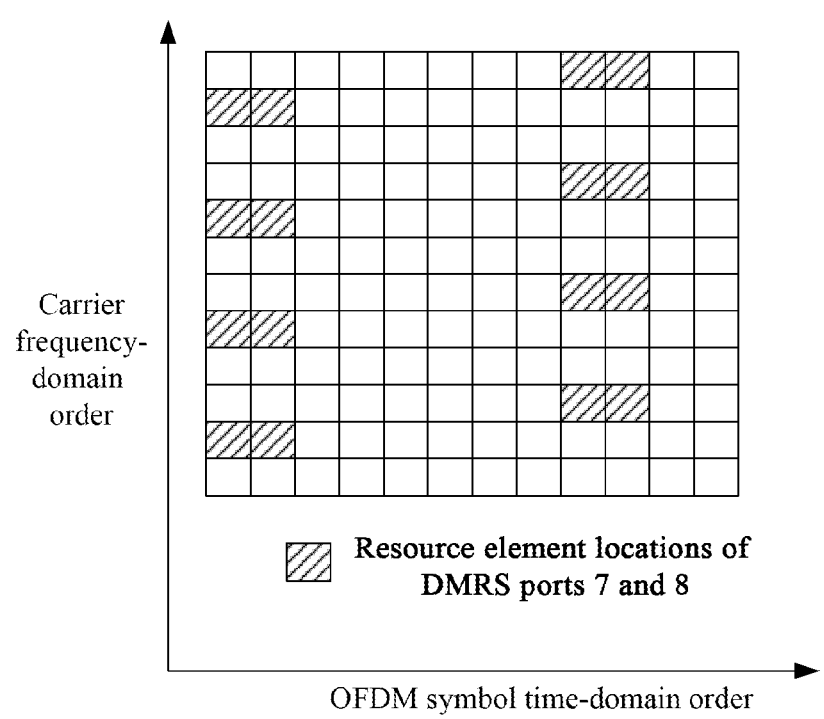

FIG. 42 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length, and the corresponding subframe is a special subframe whose subframe type is the subframe type 2 (TDD) and which is configured as 3, the base station transmits at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{8, 9\}$.

The user equipment receives at least one of the DMRS ports 7 and 8 on the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{8, 9\}$.

The Forty-Fifth Example

Figure 43:
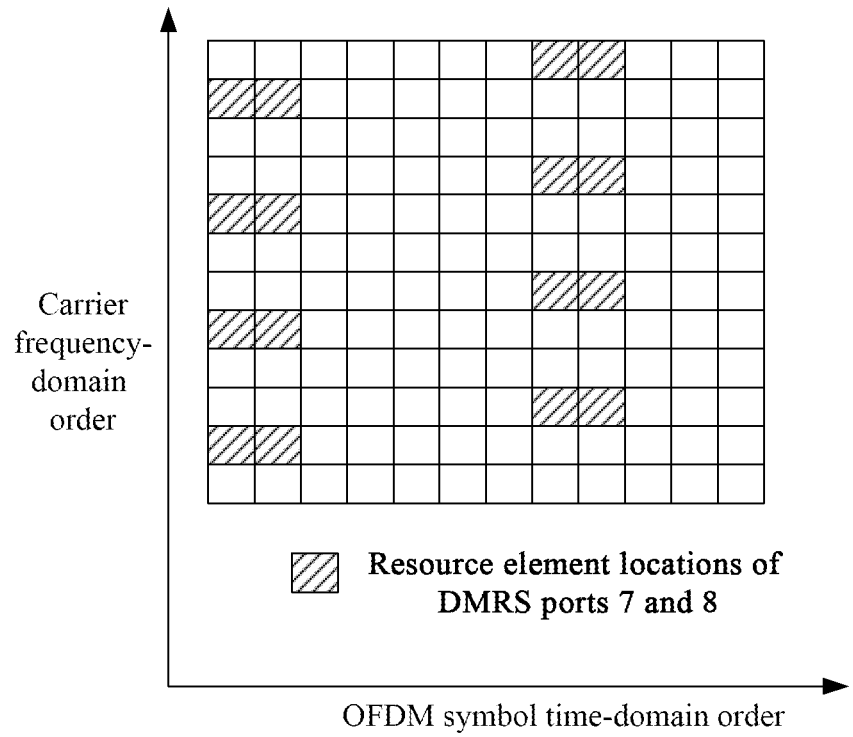

FIG. 43 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length, and the corresponding subframe is a special subframe whose subframe type is the subframe type 2 (TDD) and which is configured as 2 or 3, the base station transmits at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{7, 8\}$.

The user equipment receives at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 11^{th}\}$ subcarriers of the OFDM symbol $\{7, 8\}$.

The Forty-Sixth Example

Figure 44:
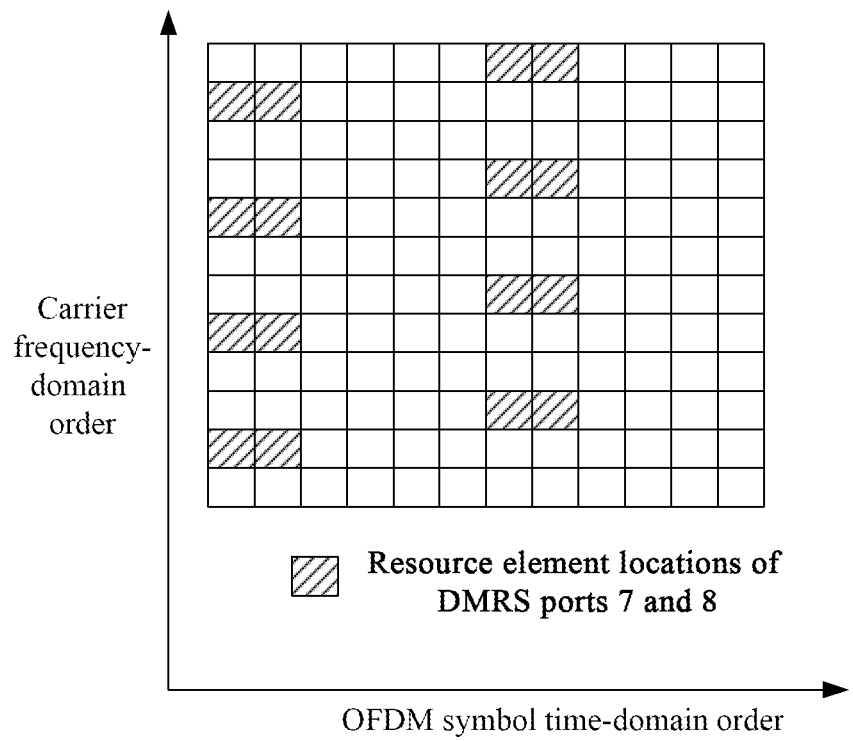

FIG. 44 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length, and the corresponding subframe is a special subframe whose subframe type is the subframe type 2 (TDD) and which is configured as 1 or 2 or 3, the base station transmits at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{6, 7\}$.

The user equipment receives at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{6, 7\}$.

The Forty-Seventh Example

Figure 45:
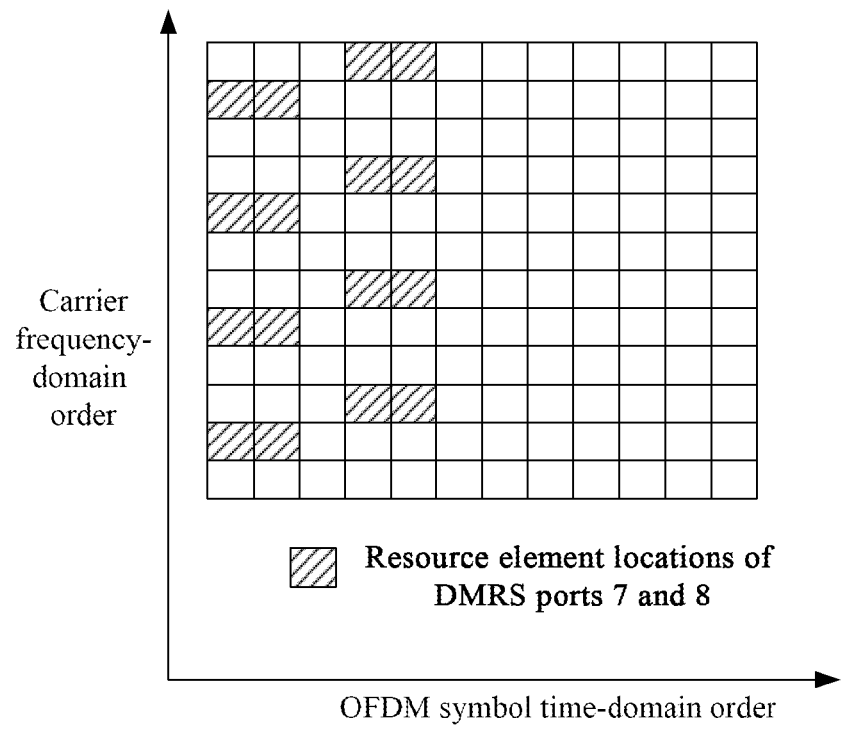

FIG. 45 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

when the CP (cyclic prefix) has an extended cyclic prefix length, and the corresponding subframe is a special subframe whose subframe type is the subframe type 2 (TDD) and which is configured as 9, the base station transmits at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{3, 4\}$.

The user equipment receives at least one of the DMRS ports 7 and 8 in the $\{1^{st}, 4^{th}, 7^{th}, 10^{th}\}$ subcarriers of the OFDM symbol $\{0, 1\}$ and the $\{2^{nd}, 5^{th}, 8^{th}, 11^{th}\}$ subcarriers of the OFDM symbol $\{3, 4\}$.

The Forty-Eighth Example

Figure 46:
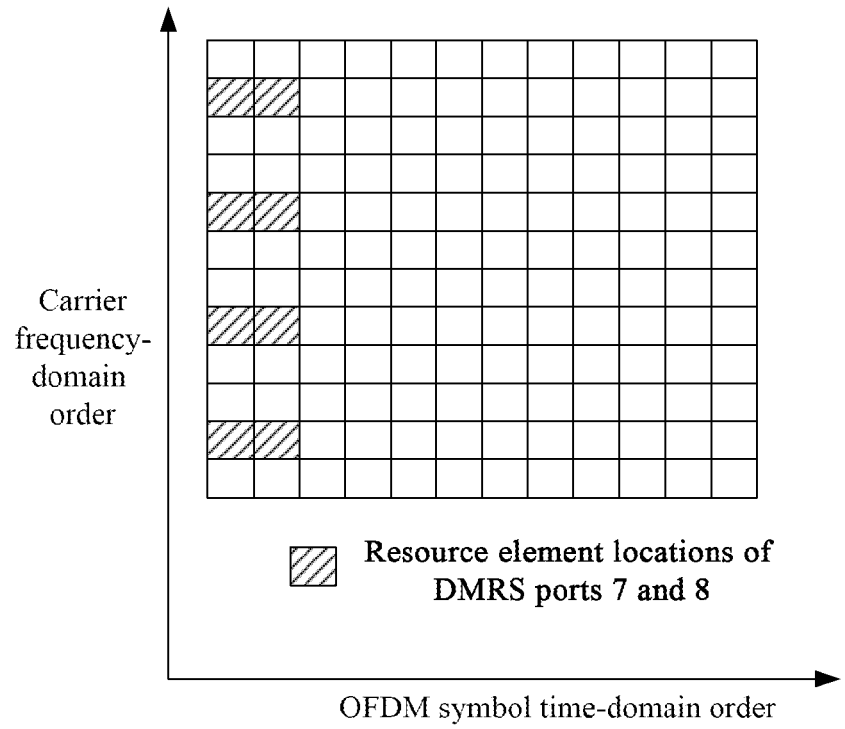

FIG. 46 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length, and the corresponding subframe is a special subframe whose subframe type is the subframe type 2 (TDD) and which is configured as 0 or 9, the base station transmits at least one of the DMRS ports 7 and 8 in the $\{1^{st}, 4^{th}, 7^{th}, 10^{th}\}$, subcarriers of the OFDM symbol $\{0, 1\}$.

The user equipment receives at least one of the DMRS ports 7 and 8 in the $\{1^{st}, 4^{th}, 7^{th}, 10^{th}\}$ subcarriers of the OFDM symbol $\{0, 1\}$.

The Forty-Ninth Example

Based on the forty-third example to the forty-eighth example and the sixty-fourth example, when the base station uses one layer to transmit data, the DMRS port 7 or port 8 is transmitted in a corresponding subcarrier resource element of a corresponding OFDM symbol.

And/or, when the base station uses two layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein orthogonal masks can be [1,1] and [1, −1].

The Fiftieth Example

Figure 47:
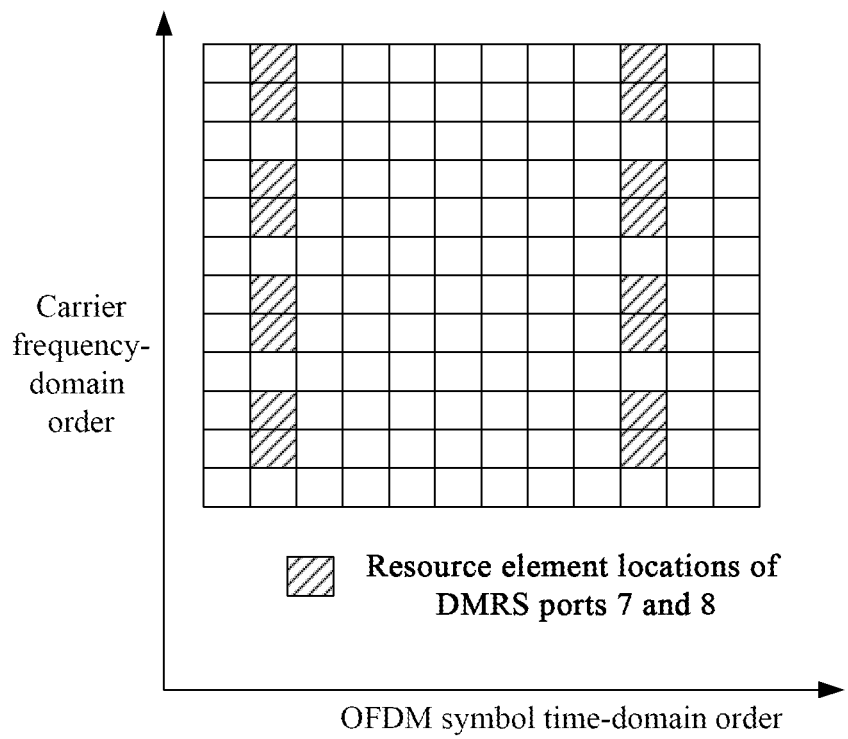

FIG. 47 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length, and the corresponding subframe is a non-special subframe whose subframe type is the subframe type 1 (FDD) or the subframe type 2 (TDD) or a special subframe which is configured as 3, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 10\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 10\}$.

The Fifty-First Example

Figure 48:
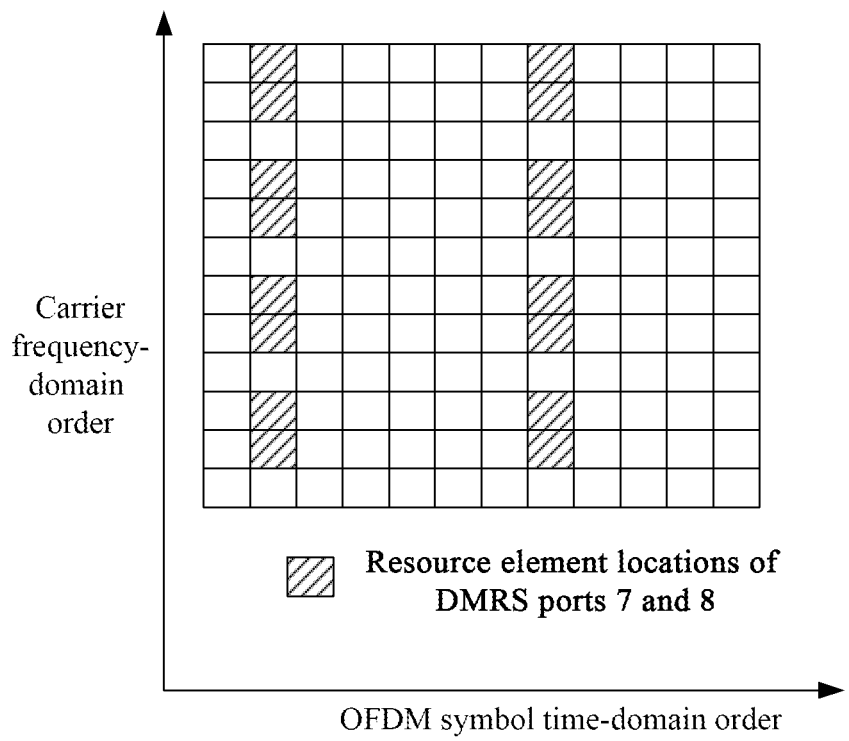

FIG. 48 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a special subframe whose subframe type is the subframe type 2 (TDD) and which is configured as 1 or 2, the base station transmits at least one of the DMRS ports 7 and 8 in the $\{1^{st}, 2^{nd}, 4^{th}, 5^{th}, 7^{th}, 8th, 10^{th}, 11^{th}\}$ subcarriers of the OFDM symbol $\{1, 7\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 7\}$.

The Fifty-Second Example

Figure 49:
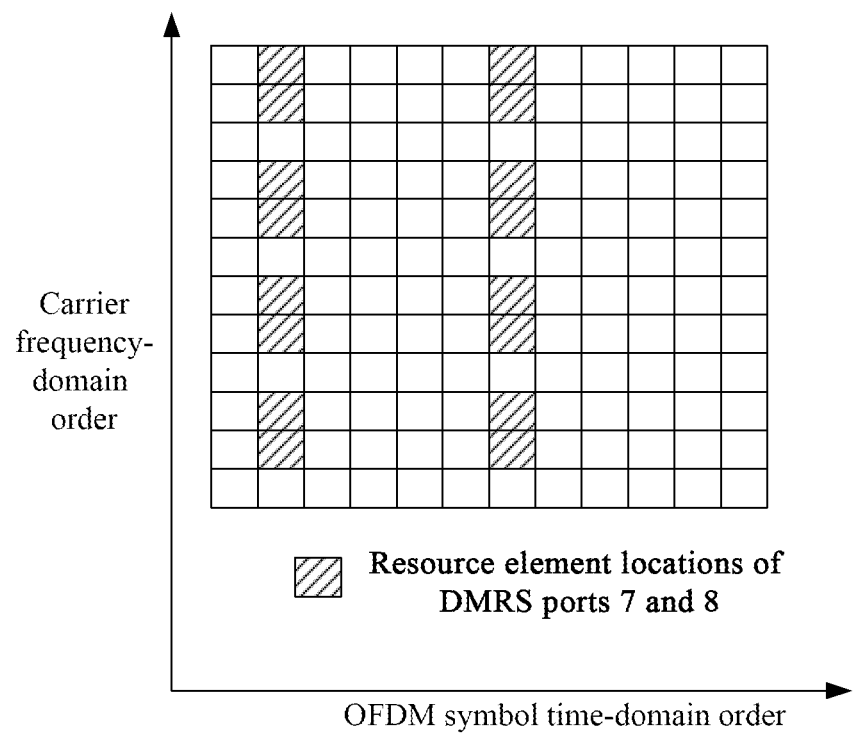

FIG. 49 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a special subframe whose subframe type is the subframe type 2 (TDD) and which is configured as 1 or 2, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 6\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 6\}$.

The Fifty-Third Example

Figure 50:
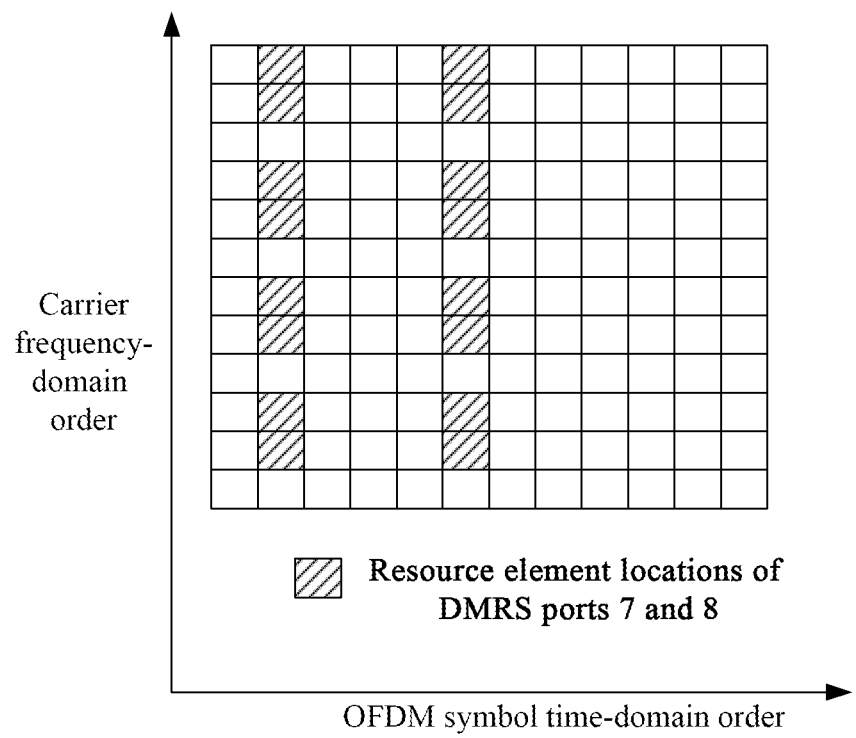

FIG. 50 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a special subframe whose subframe type is the subframe type 2 (TDD) and which is configured as 1 or 2, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 5\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 5\}$.

The Fifty-Fourth Example

Figure 51:
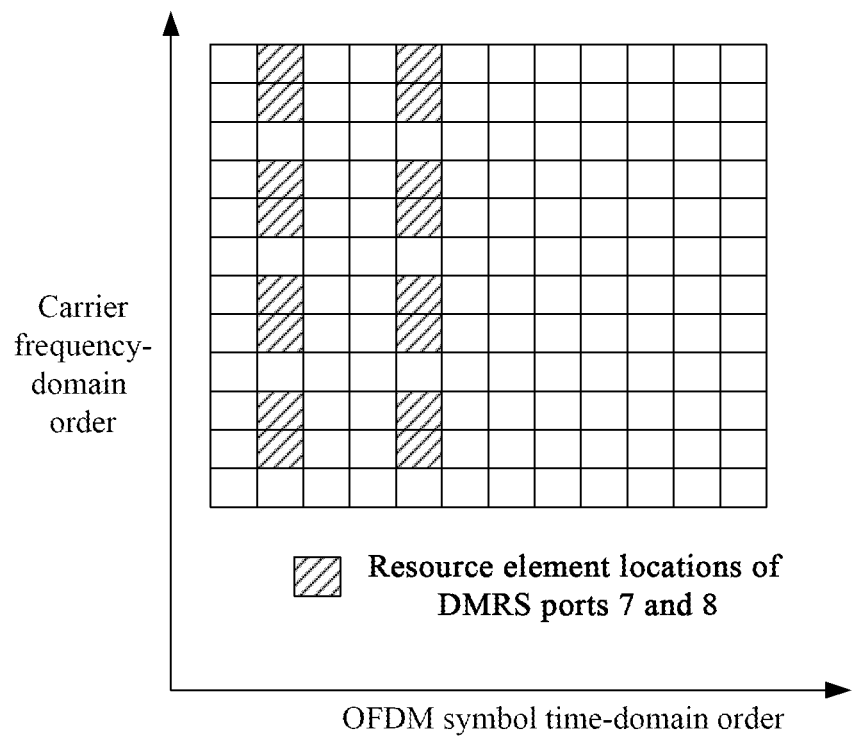

FIG. 51 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic Prefix) has an extended cyclic prefix length and the corresponding subframe is a special subframe whose subframe type is the subframe type 2 (TDD) and which is configured as 9, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 4\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 4\}$.

The Fifty-Fifth Example

Figure 52:
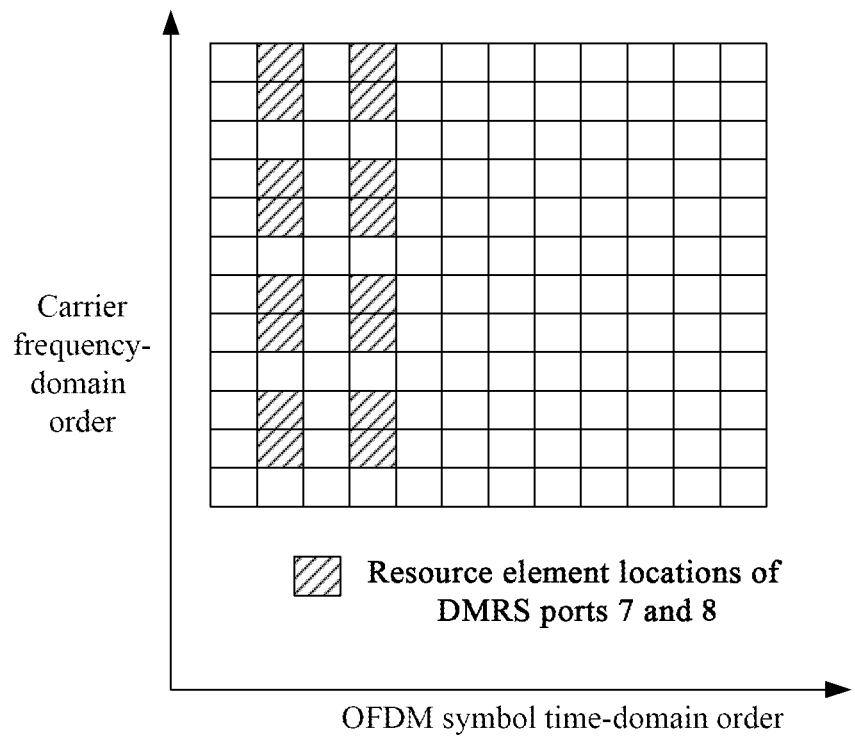

FIG. 52 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a special subframe whose subframe type is the subframe type 2 (TDD) and which is configured as 9, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 3\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1, 3\}$.

The Fifty-Sixth Example

Figure 53:
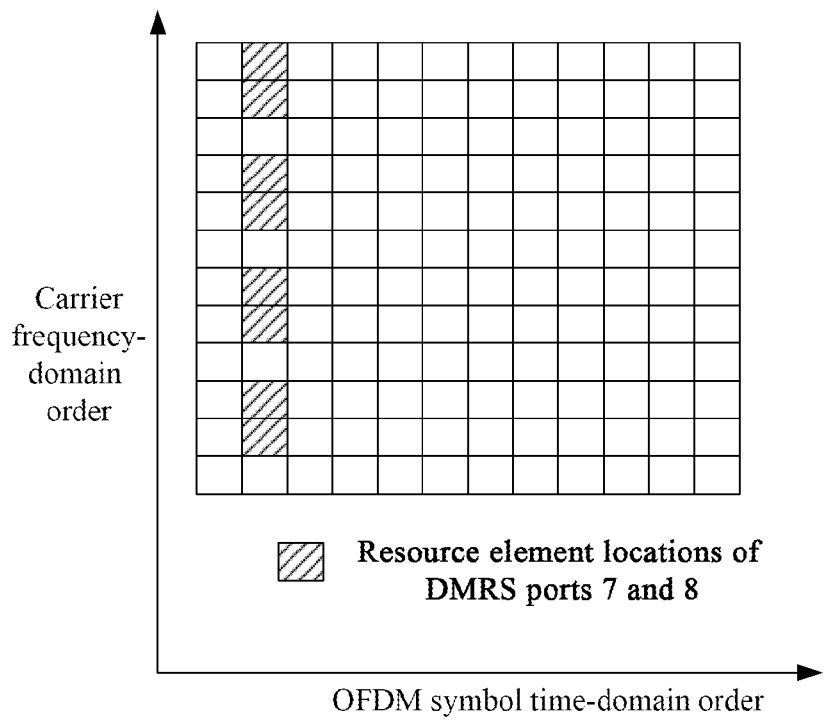

FIG. 53 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a special subframe whose subframe type is the subframe type 2 (TDD) and which is configured as 0, the base station transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

The user equipment receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

The Fifty-Seventh Example

Based on the fiftieth example to the fifty-sixth example, and the sixty-second example, when the base station uses one layer to transmit data, the DMRS port 7 or port 8 is transmitted in a corresponding subcarrier of a corresponding OFDM symbol;
and/or,
when the base station uses two layers to transmit data, the DMRS port 7 and port 8 are transmitted in corresponding subcarriers of a corresponding OFDM symbol, and two consecutive subcarriers of the same OFDM symbol uses the CDM method to multiplex two DMRS ports, wherein orthogonal masks can be [1,1] and [1, −1].

When the user equipment uses one layer to receive data, the DMRS port 7 or port 8 is received in a corresponding subcarrier of a corresponding OFDM symbol;
and/or,
when the user equipment uses two layers to receive data, the DMRS port 7 and port 8 are received in corresponding subcarriers of a corresponding OFDM symbol, and two consecutive subcarriers of the same OFDM symbol uses the CDM method to multiplex two DMRS ports, wherein the orthogonal masks can be [1,1] and [1, −1].

The Fifty-Eighth Example

Figure 54:
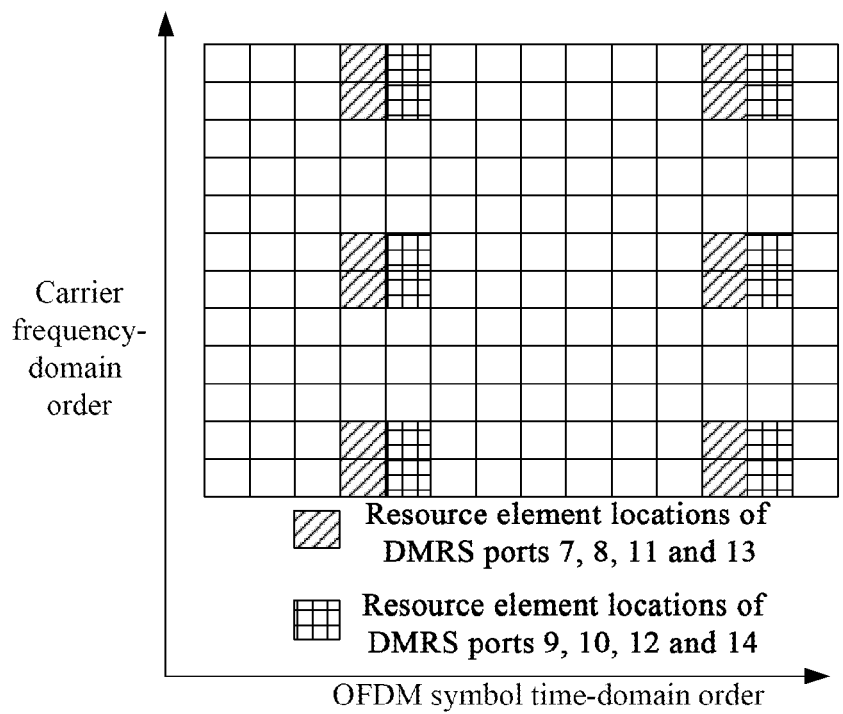

FIG. 54 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{3, 11\}_5$ and transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{4, 12\}$.

The user equipment receives at least one of the DMRS ports 7, 8, 11 and 13 in the {0$^{th}$, 1$^{st}$, 5$^{th}$, 6$^{th}$, 10$^{th}$, 11$^{th}$} subcarriers of the OFDM symbol {3, 11}, and receives at least one of the DMRS ports 9, 10, 12 and 14 in the {0$^{th}$, 1$^{st}$, 5$^{th}$, 6$^{th}$, 10$^{th}$, 11$^{th}$} subcarriers of the OFDM symbol {4, 12}.

The Fifty-Ninth Example

Figure 55:
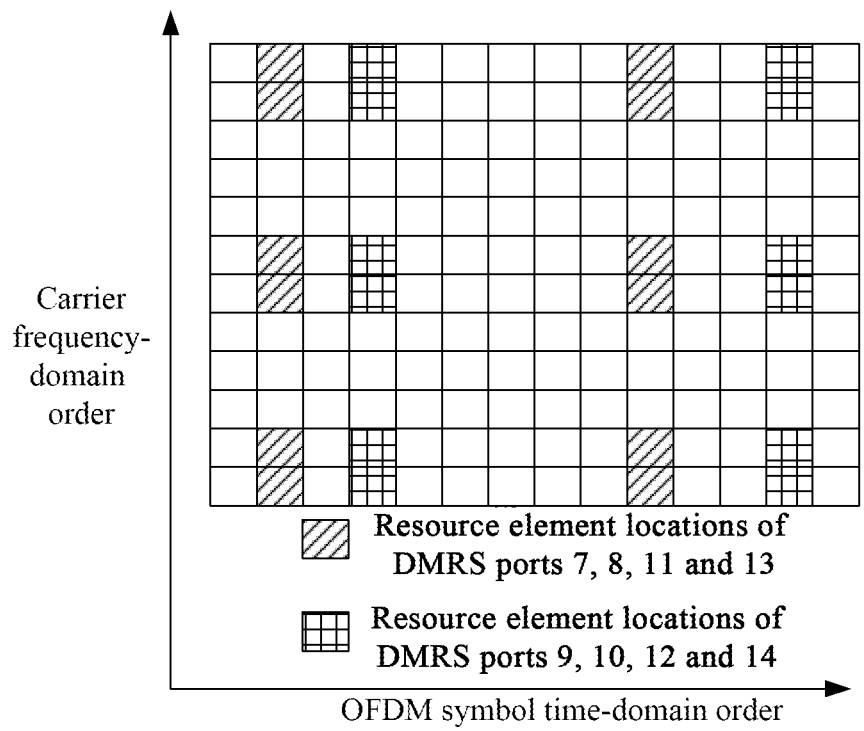

FIG. 55 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic Prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {0$^{th}$, 1$^{st}$, 5$^{th}$, 6$^{th}$, 10$^{th}$, 11$^{th}$} subcarriers of the OFDM symbol {1, 9}, and transmits at least one of the DMRS ports 9, 10, 12 and 14 in the {0$^{th}$, 1$^{st}$, 5$^{th}$, 6$^{th}$, 10$^{th}$, 11$^{th}$} subcarriers of the OFDM symbol {3, 12}.

The user equipment receives at least one of the DMRS ports 7, 8, 11 and 13 in the {0$^{th}$, 1$^{st}$, 5$^{th}$, 6$^{th}$, 10$^{th}$, 11$^{th}$} subcarriers of the OFDM symbol {1, 9}, and receives at least one of the DMRS ports 9, 10, 12 and 14 in the {0$^{th}$, 1$^{st}$, 5$^{th}$, 6$^{th}$, 10$^{th}$, 11$^{th}$} subcarriers of the OFDM symbol {3, 12}.

The Sixtieth Example

Figure 56:
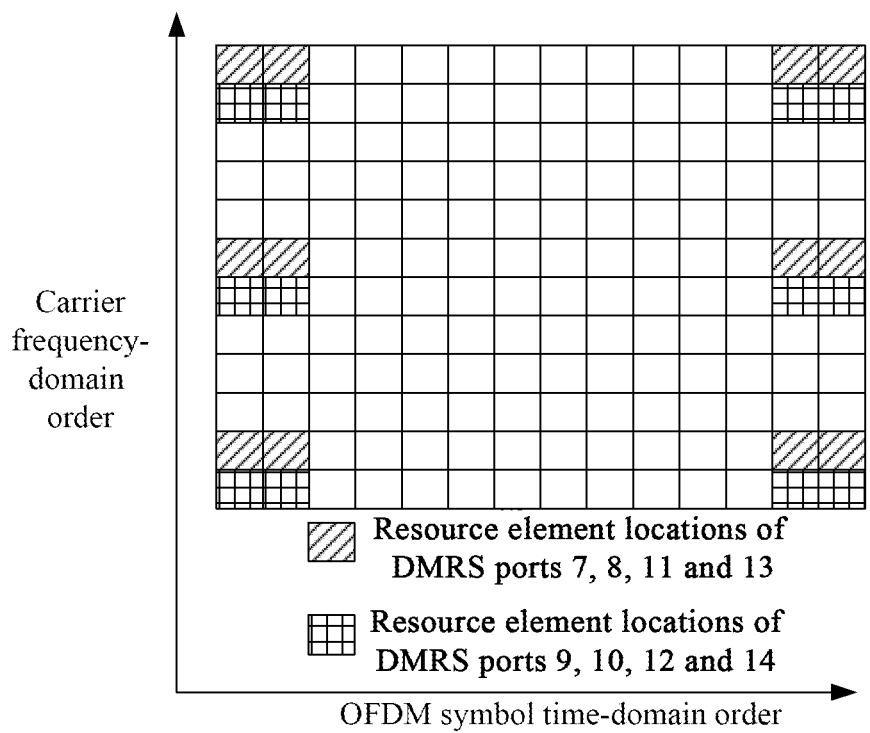

FIG. 56 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic Prefix) has a normal cyclic prefix length and the corresponding subframe is a non-special subframe whose subframe type is the subframe type 1 (FDD) or the subframe type 2 (TDD), the base station transmits at least one of the DMRS ports 7, 8, 11 and 13 in the {1$^{st}$, 6$^{th}$, 11$^{th}$} subcarriers of the OFDM symbol {0, 1, 12, 13}, and transmits at least one of the DMRS ports 9, 10, 12 and 14 in the {0$^{th}$, 5$^{th}$, 10$^{th}$} subcarriers of the OFDM symbol {0, 1, 12, 13}.

The user equipment receives at least one of the DMRS ports 7, 8, 11 and 13 in the {1$^{st}$, 6$^{th}$, 11$^{th}$} subcarriers of the OFDM symbol {0, 1, 12, 13}, and receives at least one of the DMRS ports 9, 10, 12 and 14 in the {0$^{th}$, 5$^{th}$, 10$^{th}$} subcarriers of the OFDM symbol {0, 1, 12, 13}.

The Sixty-First Example

Figure 57:
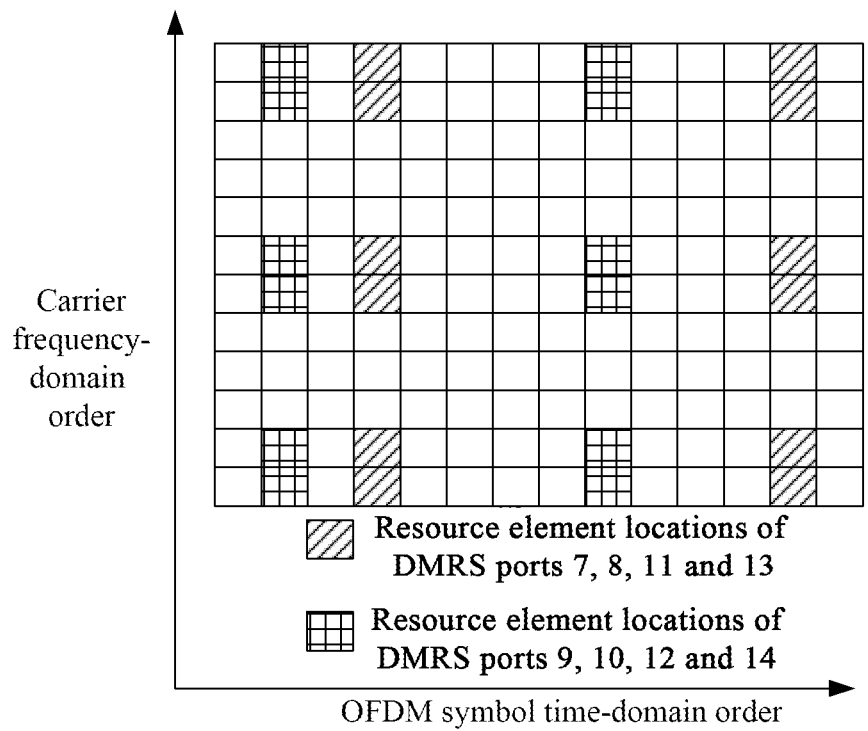

FIG. 57 shows the pattern of DMRS in one PRB Pair in the Normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length and the corresponding subframe is a non-special subframe whose subframe type is the subframe type 1 (FDD) or the subframe type 2 (TDD), the base station transmits at least one of the DMRS ports 9, 10, 12 and 14 in the {0$^{th}$, 1$^{st}$, 5$^{th}$, 6$^{th}$, 10$^{th}$, 11$^{th}$} subcarriers of the OFDM symbol {1, 8}, and transmits at least one of the DMRS ports 7, 8, 11 and 13 in the {0$^{th}$, 1$^{st}$, 5$^{th}$, 6$^{th}$, 10$^{th}$, 11$^{th}$} subcarriers of the OFDM symbol {3, 12}.

The user equipment receives at least one of the DMRS ports 9, 10, 12 and 14 in the {0$^{th}$, 1$^{st}$, 5$^{th}$, 6$^{th}$, 10$^{th}$, 11$^{th}$} subcarriers of the OFDM symbol {1, 8}, and receives at least one of the DMRS ports 7, 8, 11 and 13 in the {0$^{th}$, 1$^{st}$, 5$^{th}$, 6$^{th}$, 10$^{th}$, 11$^{th}$} subcarriers of the OFDM symbol {3, 12}.

The Sixty-Second Example

Figure 58:
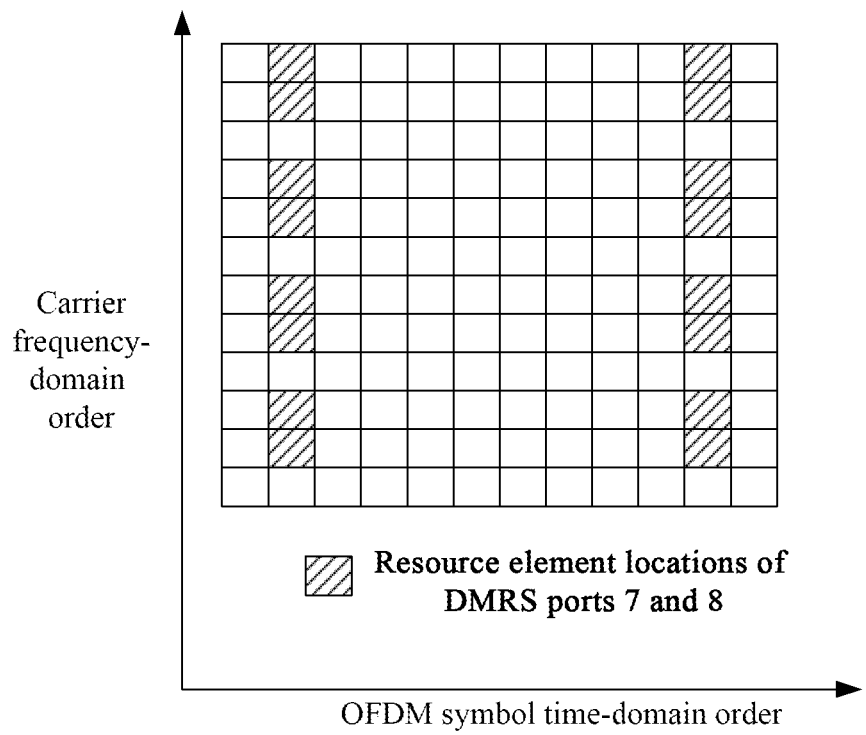

FIG. 58 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a non-special subframe whose subframe type is the subframe type 1 (FDD) or the subframe type 2 (TDD), the base station transmits at least one of the DMRS ports 7 and 8 in the {0$^{th}$, 1$^{st}$, 5$^{th}$, 6$^{th}$, 10$^{th}$, 11$^{th}$} subcarriers of the OFDM symbol {1, 10}.

The user equipment receives at least one of the DMRS ports 7 and 8 in the {0$^{th}$, 1$^{st}$, 5$^{th}$, 6$^{th}$, 10$^{th}$, 11$^{th}$} subcarriers of the OFDM symbol {1, 10}.

The Sixty-Third Example

Figure 59:
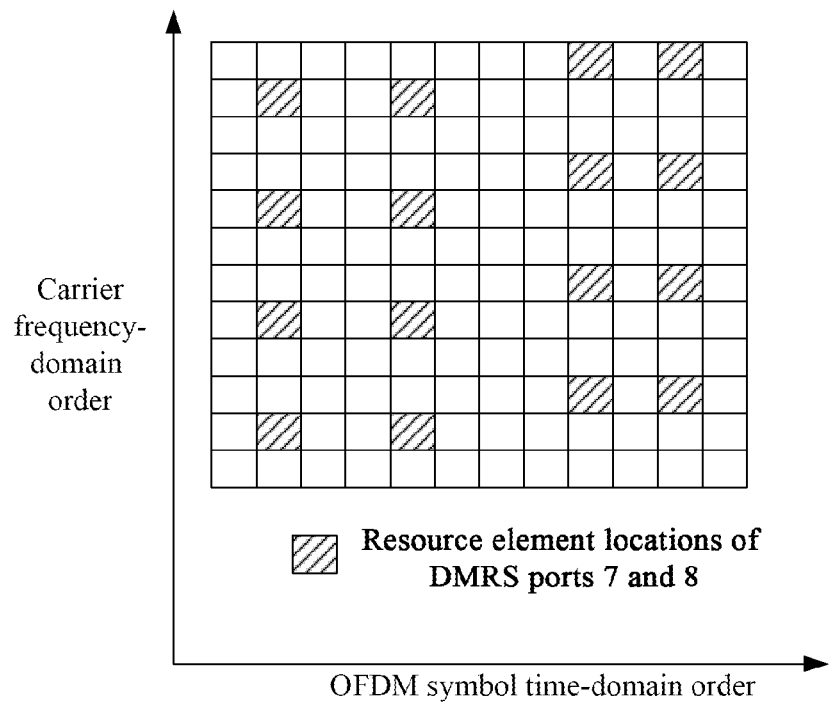

FIG. 59 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe is a non-special subframe whose subframe type is the subframe type 1 (FDD) or the subframe type 2 (TDD), the base station transmits at least one of the DMRS ports 7 and 8 in the {1$^{st}$, 4$^{th}$, 7$^{th}$, 10$^{th}$} subcarriers of the OFDM symbol {1, 4}, and the base station transmits at least one of the DMRS ports 7 and 8 in the {2$^{nd}$, 5$^{th}$, 8$^{th}$, 11$^{th}$} subcarriers of the OFDM symbol {8, 10}.

The user equipment receives at least one of the DMRS ports 7 and 8 in the {1$^{st}$, 4$^{th}$, 7$^{th}$, 10$^{th}$} subcarriers of the OFDM symbol {1, 4}, and receives at least one of the DMRS ports 7 and 8 in the {2$^{nd}$, 5$^{th}$, 8$^{th}$, 11$^{th}$} subcarriers of the OFDM symbol {8, 10}.

The Sixty-Fourth Example

Figure 60:
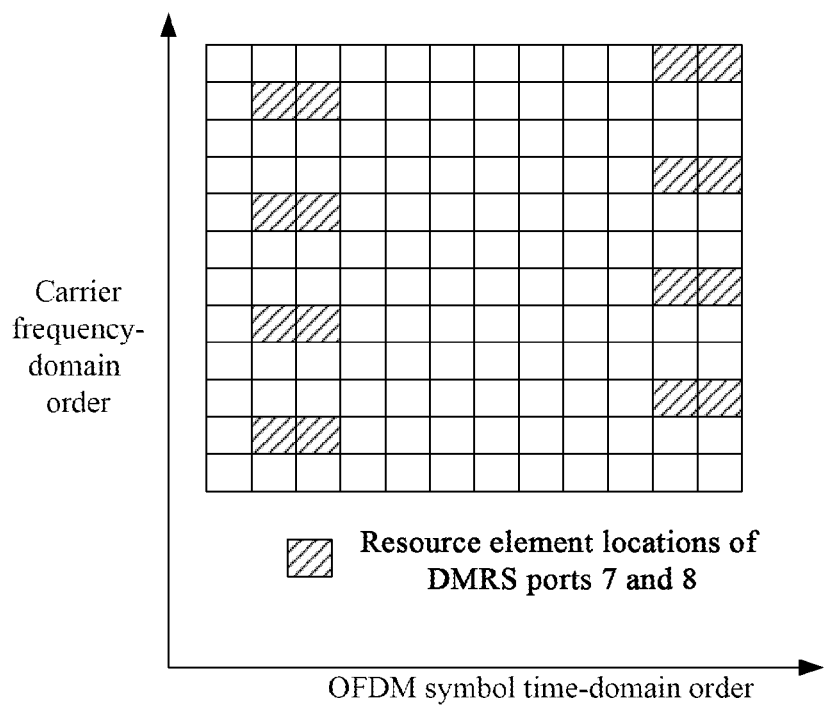

FIG. 60 shows the pattern of DMRS in one PRB Pair in the Extended CP subframe. The base station transmits the DMRS in locations of resource elements carrying the DMRS, and the user equipment receives the DMRS in the locations of resource elements carrying the DMRS.

When the CP (cyclic prefix) has an extended cyclic prefix length and the corresponding subframe belongs to the subframe type 1 (FDD), the base station transmits at least one of the DMRS ports 7 and 8 in the {1$^{st}$, 4$^{th}$, 7$^{th}$, 10$^{th}$} subcarriers of the OFDM symbol {1, 2}, and transmits at least one of the DMRS ports 7 and 8 in the {2$^{nd}$, 5$^{th}$, 8$^{th}$, 11$^{th}$} subcarriers of the OFDM symbol {10$^{th}$, 11}.

The user equipment receives at least one of the DMRS ports 7 and 8 in the {1$^{st}$, 4$^{th}$, 7$^{th}$, 10$^{th}$} subcarriers of the OFDM symbol {1, 2}, and receives at least one of the DMRS ports 7 and 8 in the {2$^{nd}$, 5$^{th}$, 8$^{th}$, 11$^{th}$} subcarriers of the OFDM symbol {10$^{th}$, 11}.

The Sixty-Fifth Example

Figure 61:
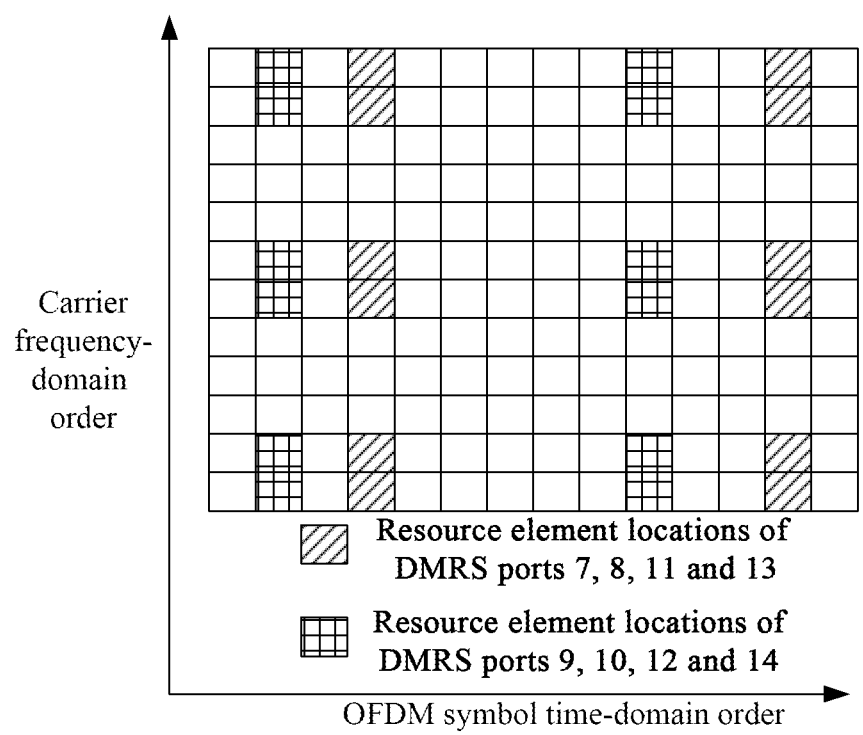

FIG. 61 shows the pattern of DMRS in one PRB Pair in the normal CP subframe. The base station transmits the DMRS in locations of resource elements carrying the DMRS, and the user equipment receives the DMRS in the locations of resource elements carrying the DMRS.

When the CP (cyclic prefix) has a normal cyclic prefix length, and the corresponding subframe is a non-special subframe whose subframe type is the subframe type 1 (FDD) or the subframe type 2 (TDD), the base station transmits at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{1, 9\}$, and transmits at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{3, 12\}$.

The user equipment receives at least one of the DMRS ports 9, 10, 12 and 14 in the $\{0^{th}, 1^{st}, 5^{th}, 6^{th}, 10^{th}, 11^{th}\}$ subcarriers of the OFDM symbol $\{1, 9\}$, and receives at least one of the DMRS ports 7, 8, 11 and 13 in the $\{0^{th}, 1^{st}, 5^{th}, 6^{th}, 10^{th}, 11^{th}\}$ subcarriers of the OFDM symbol $\{3, 12\}$.

The Second Embodiment

The patent document introduces a base station, wherein the base station comprises:
 a first module, configured to: perform frequency division multiplexing (FDM) and/or code division multiplexing (CDM) and/or time division multiplexing (TDM) on a plurality of demodulation reference signal (DMRS) ports;
 a second module, configured to: transmit the multiplexed DMRS.

Specifically, the second module transmits the DMRS in at least one of the following OFDM symbol groups, wherein the OFDM symbols x1~xn constitute one OFDM symbol group $\{x1, \ldots xn\}$, wherein xn<14, 0<n<5, and xn and n are integers:
 OFDM symbol group $\{0, 12\}$, OFDM symbol group $\{1, 13\}$, OFDM symbol group $\{0, 9\}$, OFDM symbol group $\{1, 10\}_5$ OFDM symbol group $\{0, 5\}$, OFDM symbol group $\{1, 6\}$, OFDM symbol group $\{0\}$, OFDM symbol group $\{1\}$, OFDM symbol group $\{2\}$, OFDM symbol group $\{3\}$, OFDM symbol group $\{1, 12\}$, OFDM symbol group $\{2, 13\}$, OFDM symbol group $\{1, 9\}$, OFDM symbol group $\{2, 10\}_5$ OFDM symbol group $\{1, 5\}$, OFDM symbol group $\{2, 6\}$, OFDM symbol group $\{3, 13\}$, OFDM symbol group $\{3, 10\}_5$ OFDM symbol group $\{3, 6\}$, OFDM symbol group $\{1, 11\}$, OFDM symbol group $\{3, 12\}$, OFDM symbol group $\{1, 10\}_5$ OFDM symbol group $\{3, 12\}$, OFDM symbol group $\{1, 8\}$, OFDM symbol group $\{3, 10\}_5$ OFDM symbol group $\{1, 6\}$, OFDM symbol group $\{3, 8\}$, OFDM symbol group $\{2, 12\}$, OFDM symbol group $\{3, 4, 11, 12\}$, OFDM symbol group $\{2, 3, 11, 12\}$, OFDM symbol group $\{1, 2, 11, 12\}$, OFDM symbol group $\{3, 4, 9, 10\}_5$ OFDM symbol group $\{3, 4\}$, OFDM symbol group $\{0, 8\}$, OFDM symbol group $\{0, 7\}$, OFDM symbol group $\{0, 6\}$, OFDM symbol group $\{1, 7\}$, OFDM symbol group $\{0, 3\}$, OFDM symbol group $\{1, 4\}$, OFDM symbol group $\{1, 9\}$, OFDM symbol group $\{3, 11\}$, OFDM symbol group $\{4, 13\}$, OFDM symbol group $\{0, 1, 12, 13\}$, OFDM symbol group $\{1, 2\}$, OFDM symbol group $\{10, 11\}$, OFDM symbol group $\{8, 10\}_5$ OFDM symbol group $\{3, 11\}$, OFDM symbol group $\{4, 12\}$, OFDM symbol group $\{1, 9\}$, OFDM symbol group $\{0, 1, 12, 13\}$.

For example, when a cyclic prefix (CP) has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{0, 12\}$:
 DMRS port 7, DMRS port 8, DMRS port 11 and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{1, 13\}$:
 DMRS port 9, DMRS port 10, DMRS port 12 and DMRS port 14; or
 it transmits at least one of the following DMRS ports in the $\{0^{th}, 1^{st}, 5^{th}, 6^{th}, 10^{th}, 11^{th}\}$ subcarriers of the OFDM symbol group $\{0, 9\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{1, 10\}$:
 DMRS port 9, DMRS port 10, DMRS port 12 and DMRS port 14; or,
 it transmits at least one of the following DMRS ports in the $\{0^{th}, 1^{st}, 5^{th}, 6^{th}, 10^{th}, 11^{th}\}$ subcarriers of the OFDM symbol group $\{0, 8\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
 DMRS port 9, DMRS port 10, DMRS port 12, and DMRS port 14; or
 it transmits at least one of the following DMRS ports in the $\{0^{th}, 1^{st}, 5^{th}, 6^{th}, 10^{th}, 11^{th}\}$ subcarriers of the OFDM symbol group $\{0, 7\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
 DMRS port 9, DMRS port 10, DMRS port 12, and DMRS port 14; or
 it transmits at least one of the following DMRS ports in the $\{0^{th}, 1^{st}, 5^{th}, 6^{th}, 10^{th}, 11^{th}\}$ subcarriers of the OFDM symbol group $\{0, 5\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{1, 6\}$:
 DMRS port 9, DMRS port 10, DMRS port 12 and DMRS port 14; or it transmits at least one of the following DMRS ports in the $\{0^{th}, 1^{st}, 5^{th}, 6^{th}, 10^{th}, 11^{th}\}$ subcarriers of the OFDM symbol $\{0\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarrier of the OFDM symbol $\{1\}$:
 DMRS port 9, DMRS port 10, DMRS port 12, and DMRS port 14.

When the CP has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{1, 12\}$:
 DMRS port 7, DMRS port 8, DMRS port 11, and DMRS port 13;
 it transmits at least one of the following DMRS ports in the $\{0^{th}, 1^{st}, 5^{th}, 6^{th}, 10^{th}, 11^{th}\}$ subcarriers of the OFDM symbol group $\{2, 13\}$:
 DMRS port 9, DMRS port 10, DMRS port 12, and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 10\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 9\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12, and DMRS port 14; or it transmits at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12, and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol $\{2\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7 and DMRS port 8.

When the CP has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{1, 12\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 13\}$:
DMRS port 9, DMRS port 10, DMRS port 12, and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 9\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12, and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11, and DMRS port 13; it transmits at least one of the following DMRS ports in the $\{0^{th}, 1^{st}, 5^{th}, 6^{th}, 10^{th}, 11^{th}\}$ subcarriers of the OFDM symbol group $\{3, 6\}$:
DMRS port 9, DMRS port 10, DMRS port 12, and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol $\{3\}$:
DMRS port 9, DMRS port 10, DMRS port 12, and DMRS port 14; or,
it transmits at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7 and DMRS port 8.

When the CP has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{1, 11\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14.

When the CP has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{1, 10\}$:
DMRS port 7, DMRS port 8, DMRS port 11, and DMRS port 13;

it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12 and DMRS port 14; or
it transmits at least one of the following DMRS ports in the $\{0^{th}, 1^{st}, 5^{th}, 6^{th}, 10^{th}, 11^{th}\}$ subcarriers of the OFDM symbol group $\{1, 6\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12 and DMRS port 14.

When the CP has a normal cyclic prefix length, the second module transmits at least one of the following DMRS ports in the $\{0^{th}, 1^{st}, 5^{th}, 6^{th}, 10^{th}, 11^{th}\}$ subcarriers of the OFDM symbol group $\{1, 11\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{2, 12\}$:
DMRS port 9, DMRS port 10, DMRS port 12, and DMRS port 14;
or, it transmits at least one of the following DMRS ports in the $\{0^{th}, 1^{st}, 5^{th}, 6^{th}, 10^{th}, 11^{th}\}$ subcarriers of the OFDM symbol group $\{3, 11\}$:
DMRS port 7, DMRS port 8, DMRS port 11 and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{4, 12\}$:
DMRS port 9, DMRS port 10, DMRS port 12, and DMRS port 14;
or,
it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14;
or,
it transmits at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 9, DMRS port 10, DMRS port 12, and DMRS port 14;
it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 7, DMRS port 8, DMRS port 11, and DMRS port 13;
or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14;
or,
it transmits at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 9, DMRS port 10, DMRS port 12, and DMRS port 14;
it transmits at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 7, DMRS port 8, DMRS port 11, and DMRS port 13.

It should be noted that, in the abovementioned examples, when the base station uses one layer to transmit data, the DMRS port 7 or port 8 is transmitted in a corresponding subcarrier of a corresponding OFDM symbol;
when the base station uses two layers to transmit data, the DMRS port 7 and port 8 are transmitted in corresponding subcarriers of a corresponding OFDM symbol, and two consecutive subcarriers of the same OFDM symbol uses the CDM method to multiplex two DMRS ports, wherein orthogonal masks can be [1, 1] and [1, −1];
when the base station uses three layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein the orthogonal masks can be [1,1] and [1, −1], and the port 9 is transmitted in a corresponding subcarrier of a corresponding OFDM symbol;
when the base station uses four layers to transmit data, the DMRS port 7, port 8, port 9 and port 10 are transmitted in corresponding subcarriers of corresponding OFDM symbols, and two consecutive subcarriers of the same OFDM symbol use the CDM method to multiplex two DMRS ports, wherein the orthogonal masks can be [1, 1] and [1, −1];
when the base station uses five layers to transmit data, the DMRS port 7, port 8, and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are transmitted in corresponding subcarriers of a corresponding OFDM symbol, and the two consecutive subcarriers of the same OFDM symbol use the CDM method to multiplex two DMRS ports, wherein the orthogonal masks can be [1, 1] and [1, −1];
when the base station uses six layers to transmit data, the DMRS port 7, port 8, and port 11 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses seven layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses eight layers to transmit data, the DMRS port 7, port 8, port 11 and port 13 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10, port 12 and port 14 are transmitted in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

Furthermore, when the CP has a normal cyclic prefix length, the second module can also transmit at least one of the following DMRS ports in the $\{1^{st}, 6^{th}, 11^{th}\}$ subcarriers of the OFDM symbol group $\{1, 3, 11, 12\}$:
  DMRS ports 7, 8, 11 and 13;
  it can transmit at least one of the following DMRS ports in the $\{0^{th}, 5^{th}, 10^{th}\}$ subcarriers of the OFDM symbol group $\{1, 3, 11, 12\}$:
  DMRS port 9, DMRS port 10, DMRS port 12 and DMRS port 14; or
  it can transmit at least one of the following DMRS ports in the $\{1^{st}, 6^{th}, 11^{th}\}$ subcarriers of the OFDM symbol group $\{1, 3, 9, 10\}$:
  DMRS port 7, DMRS port 8, DMRS port 11, and DMRS port 13;
  it can transmit at least one of the following DMRS ports in the $\{0^{th}, 5^{th}, 10^{th}\}$ subcarriers of the OFDM symbol group $\{1, 3, 9, 10\}$:
  DMRS port 9, DMRS port 10, DMRS port 12, and DMRS port 14; or,
  it can transmit at least one of the following DMRS ports in the $\{1^{st}, 6^{th}, 11^{th}\}$ subcarriers of the OFDM symbol group $\{1, 3, 8, 9\}$:
  DMRS port 7, DMRS port 8, DMRS port 11, and DMRS port 13;
  it can transmit at least one of the following DMRS ports in the $\{0^{th}, 5^{th}, 10^{th}\}$ subcarriers of the OFDM symbol group $\{1, 3, 8, 9\}$:
  DMRS port 9, DMRS port 10, DMRS port 12, and DMRS port 14; or,
  it can transmit at least one of the following DMRS ports in the $\{1^{st}, 6^{th}, 11^{th}\}$ subcarriers of the OFDM symbol group $\{1, 3, 7, 8\}$:
  DMRS port 7, DMRS port 8, DMRS port 11, and DMRS port 13;
  it can transmit at least one of the following DMRS ports in the $\{0^{th}, 5^{th}, 10^{th}\}$ subcarriers of the OFDM symbol group $\{1, 3, 7, 8\}$:
  DMRS port 9, DMRS port 10, DMRS port 12, and DMRS port 14; or
  it can transmit at least one of the following DMRS ports in the $\{1^{st}, 6^{th}, 11^{th}\}$ subcarriers of the OFDM symbol group $\{1, 3, 5, 6\}$:
  DMRS port 7, DMRS port 8, DMRS port 11, and DMRS port 13;
  it can transmit at least one of the following DMRS ports in the $\{0^{th}, 5^{th}, 10^{th}\}$ subcarriers of the OFDM symbol group $\{1, 3, 5, 6\}$:
  DMRS port 9, DMRS port 10, DMRS port 12, and DMRS port 14; or
  it can transmit at least one of the following DMRS ports in the $\{1^{st}, 6^{th}, 11^{th}\}$ subcarriers of the OFDM symbol group $\{1, 3\}$:
  DMRS port 7, DMRS port 8, DMRS port 11, and DMRS port 13;
  it can transmit at least one of the following DMRS ports in the $\{0^{th}, 5^{th}, 10^{th}\}$ subcarriers of the OFDM symbol group $\{1, 3\}$:
  DMRS port 9, DMRS port 10, DMRS port 12, and DMRS port 14.

When the CP has a normal cyclic prefix length, the second module transmits at least one of the following DMRS ports in the $\{1^{st}, 6^{th}, 11^{th}\}$ subcarriers of the OFDM symbol group $\{1, 3, 10, 12\}$:
  DMRS port 7, DMRS port 8, DMRS port 11, and DMRS port 13;
  it transmits at least one of the following DMRS ports in the $\{0^{th}, 5^{th}, 10^{th}\}$ subcarriers of the OFDM symbol group $\{1, 3, 10, 12\}$:
  DMRS port 9, DMRS port 10, DMRS port 12, and DMRS port 14; or,
  it transmits at least one of the following DMRS ports in the $\{1^{st}, 6^{th}, 11^{th}\}$ subcarriers of the OFDM symbol group $\{1, 3, 8, 10\}$:
  DMRS port 7, DMRS port 8, DMRS port 11, and DMRS port 13;

it transmits at least one of the following DMRS ports in the $\{0^{th}, 5^{th}, 10^{th}\}$ subcarriers of the OFDM symbol group $\{1, 3, 8, 10\}$:
DMRS port 9, DMRS port 10, DMRS port 12, and DMRS port 14; or,
it transmits at least one of the following DMRS ports in the $\{1^{st}, 6^{th}, 11^{th}\}$ subcarriers of the OFDM symbol group $\{1, 3, 6, 8\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{1, 3, 6, 8\}$:
DMRS port 9, DMRS port 10, DMRS port 12, and DMRS port 14.

When the CP has a normal cyclic prefix length, the second module transmits at least one of the following DMRS ports in the $\{1^{st}, 6^{th}, 11^{th}\}$ subcarriers of the OFDM symbol group $\{3, 4, 11, 12\}$:
DMRS port 7, DMRS port 8, DMRS port 11, and DMRS port 13; it transmits at least one of the following DMRS ports in the $\{0^{th}, 5^{th}, 10^{th}\}$ subcarriers of the OFDM symbol group $\{3, 4, 11, 12\}$:
DMRS port 9, DMRS port 10, DMRS port 12, and DMRS port 14; or,
it transmits at least one of the following DMRS ports in the $\{1^{st}, 6^{th}, 11^{th}\}$ subcarriers of the OFDM symbol group $\{3, 4, 10, 11\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{3, 4, 10, 11\}$:
DMRS port 9, DMRS port 10, DMRS port 12, and DMRS port 14; or,
it transmits at least one of the following DMRS ports in the $\{1^{st}, 6^{th}, 11^{th}\}$ subcarriers of the OFDM symbol group $\{3, 4, 9, 10\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{3, 4, 9, 10\}$:
DMRS port 9, DMRS port 10, DMRS port 12, and DMRS port 14; or
it transmits at least one of the following DMRS ports in the $\{1^{st}, 6^{th}, 11^{th}\}$ subcarriers of the OFDM symbol group $\{3, 4, 8, 9\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{3, 4, 8, 9\}$:
DMRS port 9, DMRS port 10, DMRS port 12, and DMRS port 14; or
it transmits at least one of the following DMRS ports in the $\{1^{st}, 6^{th}, 11^{th}\}$ subcarriers of the OFDM symbol group $\{3, 4\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{3, 4\}$:
DMRS port 9, DMRS port 10, DMRS port 12, and DMRS port 14.

When the CP has a normal cyclic prefix length, the second module transmits at least one of the following DMRS ports in the $\{1^{st}, 6^{th}, 11^{th}\}$ subcarriers of the OFDM symbol group $\{2, 3, 11, 12\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{2, 3, 11, 12\}$:
DMRS port 9, DMRS port 10, DMRS port 12, and DMRS port 14; or,
it transmits at least one of the following DMRS ports in the $\{1^{st}, 6^{th}, 11^{th}\}$ subcarriers of the OFDM symbol group $\{1, 2, 11, 12\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{1, 2, 11, 12\}$:
DMRS port 9, DMRS port 10, DMRS port 12, and DMRS port 14; or,
it transmits at least one of the following DMRS ports in the $\{1^{st}, 6^{th}, 11^{th}\}$ subcarriers of the OFDM symbol group $\{1, 2, 12, 13\}$:
DMRS port 7, DMRS port 8, DMRS port 11, and DMRS port 13;
it transmits at least one of the following DMRS ports in the $\{0^{th}, 5^{th}, 10^{th}\}$ subcarriers of the OFDM symbol group $\{1, 2, 12, 13\}$:
DMRS port 9, DMRS port 10, DMRS port 12, and DMRS port 14;
or,
it transmits at least one of the following DMRS ports in the $\{1^{st}, 6^{th}, 11^{th}\}$ subcarriers of the OFDM symbol group $\{0, 1, 12, 13\}$:
DMRS port 7, DMRS port 8, DMRS port 11, and DMRS port 13; or,
it transmits at least one of the following DMRS ports in the $\{0^{th}, 5^{th}, 10^{th}\}$ subcarriers of the OFDM symbol group $\{0, 1, 12, 13\}$:
DMRS port 9, DMRS port 10, DMRS port 12, and DMRS port 14.

It should be noted that, in the abovementioned examples, when the base station uses one layer to transmit data, the DMRS port 7 or port 8 is transmitted in a corresponding subcarrier resource element of a corresponding OFDM symbol;
when the base station uses two layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1];
when the base station uses three layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1], and the port 9 is transmitted in a corresponding subcarrier resource element of a corresponding OFDM symbol;
when the base station uses four layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1], and the DMRS port 9 and port 10 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1];

when the base station uses five layers to transmit data, the DMRS port 7, port 8 and port 11 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are transmitted in corresponding subcarriers of corresponding OFDM symbols, and the same subcarriers of two consecutive OFDM symbols or two closest adjacent OFDM symbols use the CDM method to multiplex two DMRS ports, wherein the orthogonal masks are [1, 1] and [1, −1];

when the base station uses six layers to transmit data, the DMRS port 7, port 8 and port 11 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses seven layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the base station uses eight layers to transmit data, the DMRS port 7, port 8, port 11 and port 13 are transmitted in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10, port 12 and port 14 are transmitted in corresponding subcarriers of corresponding OFDM symbols, a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

Furthermore, when the CP has an extended cyclic prefix length, the second module transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{1}, 5^{th}, 8^{th}, 11^{th}\}$ subcarriers of the OFDM symbol group $\{8, 9\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or it transmits at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or it transmits at least one of the DMRS ports 7 and 8 in the $\{1^{st}, 4^{th}, 7^{th}, 10^{th}\}$ subcarriers of the OFDM symbol group $\{0, 1\}$;

it transmits at least one of the DMRS ports 7 and 8 in the $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10, 11\}$.

When the base station uses one layer to transmit data, the DMRS port 7 or port 8 is transmitted in a corresponding subcarrier resource element of a corresponding OFDM symbol;

when the base station uses two layers to transmit data, the DMRS port 7 and port 8 are transmitted in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1].

When the CP has an extended cyclic prefix length, the second module transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or it transmits at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or it transmits at least one of the DMRS ports 7 and 8 in the $\{1^{st}, 2^{nd}, 4^{th}, 5^{th}, 6^{th}, 7^{th}, 8^{th}, 10^{th}, 11^{th}\}$ subcarriers of the OFDM symbol group $\{1, 7\}$; or it transmits at least one of the DMRS ports 7 and 8 in the $\{1^{st}, 2^{nd}, 4^{th}, 5^{th}, 6^{th}, 7^{th}, 8^{th}, 10^{th}, 11^{th}\}$ subcarriers of the OFDM symbol group $\{1, 6\}$; or it transmits at least one of the DMRS ports 7 and 8 in the $\{1^{st}, 2^{nd}, 4^{th}, 5^{th}, 6^{th}, 7^{th}, 8^{th}, 10^{th}, 11^{th}\}$ subcarriers of the OFDM symbol group $\{1, 3\}$; or it transmits at least one of the DMRS ports 7 and 8 in the $\{1^{st}, 2^{nd}, 4^{th}, 5^{th}, 6^{th}, 7^{th}, 8^{th}, 10^{th}, 11^{th}\}$ subcarriers of the OFDM symbol $\{1\}$; or it transmits at least one of the DMRS ports 7 and 8 in the $\{1^{st}, 2^{nd}, 4^{th}, 5^{th}, 6^{th}, 7^{th}, 8^{th}, 10^{th}, 11^{th}\}$ subcarriers of the OFDM symbol group $\{1, 10\}$; or it transmits at least one of the DMRS ports 7 and 8 in the $\{1^{st}, 4^{th}, 7^{th}, 10^{th}\}$ subcarriers of the OFDM symbol group $\{1, 4\}$ and the $\{2^{nd}, 5^{th}, 8^{th}, 11^{th}\}$ subcarriers of the OFDM symbol group $\{8, 10\}$.

It should be noted that, in the abovementioned examples, when the base station uses one layer to transmit data, the DMRS port 7 or port 8 is transmitted in a corresponding subcarrier of a corresponding OFDM symbol;

when the base station uses two layers to transmit data, the DMRS port 7 and port 8 are transmitted in corresponding subcarriers of a corresponding OFDM symbol, and two consecutive subcarriers of the same OFDM symbol use the CDM method to multiplex two DMRS ports, wherein the orthogonal masks are [1, 1] and [1, −1].

The Third Embodiment

The present embodiment introduces a user equipment which can implement the method in the abovementioned first embodiment, and the user equipment comprises:

a first module, configured to: store multiplexing information of demodulation reference signal (DMRS) ports, wherein the multiplexing information refers to: the DMRS going through frequency division multiplexing (FDM), and/or code division multiplexing (CDM), and/or time division multiplexing (TDM);

a second module, configured to: receive a plurality of demodulation reference signal (DMRS) ports.

Specifically, the second module receives the DMRS in at least one of the following OFDM symbol groups, wherein the OFDM symbols x1~xn constitute one OFDM symbol group $\{x1, \ldots xn\}$, wherein xn<14, 0<n<5, and xn and n are integers:

OFDM symbol group $\{0, 12\}$, OFDM symbol group $\{1, 13\}$, OFDM symbol group $\{0, 9\}$, OFDM symbol group $\{1, 10\}$, OFDM symbol group $\{0, 5\}$, OFDM symbol group $\{1, 6\}$, OFDM symbol group $\{0\}$, OFDM symbol group $\{1\}$, OFDM symbol group $\{2\}$, OFDM symbol group $\{3\}$, OFDM symbol group $\{1, 12\}$, OFDM symbol group $\{2, 13\}$, OFDM symbol group $\{1, 9\}$, OFDM symbol group $\{2, 10\}$, OFDM symbol group $\{1, 5\}$, OFDM symbol group $\{2, 6\}$, OFDM symbol group $\{3, 13\}$, OFDM symbol group $\{3, 10\}$, OFDM symbol group $\{3, 6\}$, OFDM symbol group $\{1, 11\}$, OFDM symbol group $\{3, 12\}$, OFDM symbol group $\{1, 10\}$, OFDM symbol group $\{3, 12\}$, OFDM symbol group $\{1, 8\}$, OFDM symbol group $\{3, 10\}$, OFDM symbol group $\{1, 6\}$, OFDM symbol group $\{3, 8\}$, OFDM symbol group $\{2, 12\}$, OFDM symbol group $\{3, 4, 11, 12\}$, OFDM symbol group $\{2, 3, 11, 12\}$, OFDM symbol group $\{1, 2, 11, 12\}$, OFDM symbol group $\{3, 4, 9, 10\}$, OFDM symbol group $\{3, 4\}$, OFDM symbol group $\{0, 8\}$, OFDM symbol group $\{0, 7\}$, OFDM symbol group $\{0, 6\}$, OFDM symbol group $\{1, 7\}$, OFDM symbol group $\{0, 3\}$, OFDM symbol group $\{1, 4\}$, OFDM symbol group $\{1, 9\}$, OFDM symbol group $\{3, 11\}$, OFDM symbol group $\{4, 13\}$, OFDM symbol group $\{0, 1, 12, 13\}$, OFDM symbol group $\{1, 2\}$, OFDM symbol group $\{10, 11\}$, OFDM symbol group $\{8, 10\}$, OFDM symbol group $\{3, 11\}$, OFDM symbol group $\{4, 12\}$, OFDM symbol group $\{1, 9\}$, OFDM symbol group $\{0, 1, 12, 13\}$.

For example, when the CP has a normal cyclic prefix length, the second module receives at least one of the following DMRS ports in the $\{0^{th}, 1^{st}, 5^{th}, 6^{th}, 10^{th}, 11^{th}\}$ subcarriers of the OFDM symbol group $\{0, 12\}$:

DMRS port 7, DMRS port 8, DMRS port 11, and DMRS port 13;

it receives one of the following DMRS ports in the $\{0^{th}, 1^{st}, 5^{th}, 6^{th}, 10^{th}, 11^{th}\}$ subcarriers of the OFDM symbol group $\{1, 13\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 9\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 10\}$:

DMRS port 9, DMRS port 10, DMRS port 12 and DMRS port 14; or, it receives at least one of the following DMRS ports in the $\{0^{th}, 1^{st}, 5^{th}, 6^{th}, 10^{th}, 11^{th}\}$ subcarriers of the OFDM symbol group $\{0, 8\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:

DMRS port 9, DMRS port 10, DMRS port 12, and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 7\}$:

DMRS port 7, DMRS port 8, DMRS port 11, and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{0, 5\}$:

DMRS port 7, DMRS port 8, DMRS port 11, and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{1, 6\}$:

DMRS port 9, DMRS port 10, DMRS port 12 and DMRS port 14; or it receives at least one of the following DMRS ports in the $\{0^{th}, 1^{st}, 5^{th}, 6^{th}, 10^{th}, 11^{th}\}$ subcarriers of the OFDM symbol $\{0\}$:

it receives at least one of the following DMRS ports in the $\{0^{th}, 1^{st}, 5^{th}, 6^{th}, 10^{th}, 11^{th}\}$ subcarriers of the OFDM symbol $\{1\}$:

DMRS port 9, DMRS port 10, DMRS port 12 and DMRS port 14.

When the CP has a normal cyclic prefix length, the second module receives at least one of the following DMRS ports in the $\{0^{th}, 1^{st}, 5^{th}, 6^{th}, 10^{th}, 11^{th}\}$ subcarriers of the OFDM symbol group $\{1, 12\}$:

DMRS port 7, DMRS port 8, DMRS port 11 and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{2, 13\}$:

DMRS port 9, DMRS port 10, DMRS port 12, and DMRS port 14; or it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 10\}$:
DMRS port 9, DMRS port 10, DMRS port 12 and DMRS port 14; or,
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 9\}$:
DMRS port 9, DMRS port 10, DMRS port 12, and DMRS port 14; or,
it receives at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11 and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 8\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 6\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol $\{2\}$:
DMRS port 9, DMRS port 10, DMRS port 12, and DMRS port 14; or,
it receives at least one of the DMRS ports 7 and 8 in the $\{0^{th}, 1^{st}, 5^{th}, 6^{th}, 10^{th}, 11^{th}\}$ subcarriers of the OFDM symbol $\{1\}$.

When the CP has a normal cyclic prefix length, the second module receives at least one of the following DMRS ports in the $\{0^{th}, 1^{st}, 5^{th}, 6^{th}, 10^{th}, 11^{th}\}$ subcarrier of OFDM symbol group $\{1, 12\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 13\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12, and DMRS port 14; or,
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 9\}$:
DMRS port 9, DMRS port 10, DMRS port 12, and DMRS port 14; or,
it receives at least one of the following DMRS ports in the $\{0^{th}, 1^{st}, 5^{th}, 6^{th}, 10^{th}, 11^{th}\}$ subcarriers of the OFDM symbol group $\{1, 7\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 5\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 6\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol $\{1\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol $\{3\}$:
DMRS port 9, DMRS port 10, DMRS port 12, and DMRS port 14; or,
it receives at least one of the DMRS port 7 and the DMRS port 8 in the $\{0^{th}, 1^{st}, 5^{th}, 6^{th}, 10^{th}, 11^{th}\}$ subcarriers of the OFDM symbol $\{1\}$.

When the CP has a normal cyclic prefix length, the second module receives at least one of the following DMRS ports in the $\{0^{th}, 1^{st}, 5^{th}, 6^{th}, 10^{th}, 11^{th}\}$ subcarriers of the OFDM symbol group $\{1, 11\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14.

When the CP has a normal cyclic prefix length, the second module receives at least one of the following DMRS ports in the $\{0^{th}, 1^{st}, 5^{th}, 6^{th}, 10^{th}, 11^{th}\}$ subcarriers of the OFDM symbol group $\{1, 10\}$:
DMRS port 7, DMRS port 8, DMRS port 11, and DMRS port 13;

it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 10\}$:
DMRS port 9, DMRS port 10, DMRS port 12, and DMRS port 14; or
it receives at least one of the following DMRS ports in the $\{0^{th}, 1^{st}, 5^{th}, 6^{th}, 10^{th}, 11^{th}\}$ subcarriers of the OFDM symbol group $\{1, 6\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 8\}$:
DMRS port 9, DMRS port 10, DMRS port 12, and DMRS port 14.

When the CP has a normal cyclic prefix length, the second module receives at least one of the following DMRS ports in the $\{0^{th}, 1^{st}, 5^{th}, 6^{th}, 10^{th}, 11^{th}\}$ subcarriers of the OFDM symbol group $\{1, 1, 1\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{2, 12\}$:
DMRS port 9, DMRS port 10, DMRS port 12, and DMRS port 14;
or,
it receives at least one of the following DMRS ports in the $\{0^{th}, 1^{st}, 5^{th}, 6^{th}, 10^{th}, 11^{th}\}$ subcarriers of the OFDM symbol group $\{3, 11\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{4, 12\}$:
DMRS port 9, DMRS port 10, DMRS port 12, and DMRS port 14;
or,
it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14;
or,
it receives at least one of the following DMRS ports in the $\{0^{th}, 1^{st}, 5^{th}, 6^{th}, 10^{th}, 11^{th}\}$ subcarriers of the OFDM symbol group $\{1, 9\}$:
DMRS port 9, DMRS port 10, DMRS port 12, and DMRS port 14;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 7, DMRS port 8, DMRS port 11, and DMRS port 13;
or,
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 7, DMRS port 8, DMRS port 11, and DMRS port 13;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 9, DMRS port 10, DMRS port 12, and DMRS port 14;
or,
it receives at least one of the following DMRS ports in the $\{0^{th}, 1^{st}, 5^{th}, 6^{th}, 10^{th}, 11^{th}\}$ subcarriers of the OFDM symbol group $\{1, 8\}$:
DMRS port 9, DMRS port 10, DMRS port 12, and DMRS port 14;
it receives at least one of the following DMRS ports in the $\{0^{th}, 1^{st}, 5^{th}, 6^{th}, 10^{th}, 11^{th}\}$ subcarriers of the OFDM symbol group $\{3, 12\}$:
DMRS port 7, DMRS port 8, DMRS port 11, and DMRS port 13.

In should be noted that, in the abovementioned examples, the DMRS port 7 or port 8 is received in a corresponding subcarrier of a corresponding OFDM symbol;
when the user equipment uses two layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein orthogonal masks can be [1, 1] and [1, −1];
when the user equipment uses three layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1], and the port 9 is transmitted in a corresponding subcarrier of a corresponding OFDM symbol;
when the user equipment uses four layers to receive data, the DMRS port 7 and port 8 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1], and the DMRS port 9 and port 10 are received in corresponding subcarriers of a corresponding OFDM symbol, and two consecutive subcarriers of the same OFDM symbol use the CDM method to multiplex two DMRS ports, wherein the orthogonal masks are [1, 1] and [1, −1];
when the user equipment uses five layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are received in corresponding subcarriers of a corresponding OFDM symbol, and two consecutive subcarriers of the same OFDM symbol use the CDM method to multiplex two DMRS ports, wherein the orthogonal masks can be [1, 1] and [1, −1];

when the user equipment uses six layers to receive data, the DMRS port 7, port 8 and port 11 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are [1, 1, 1, 1], [1, 1, −1, −1], [1, −1, −1, 1], [1, −1, 1, −1], and the DMRS port 9, port 10 and port 12 are received in corresponding subcarriers of corresponding OFDM symbols, a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses seven layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses eight layers to receive data, the DMRS port 7, port 8, port 11 and port 13 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10, port 12 and port 14 are received in corresponding subcarriers of corresponding OFDM symbols, and a total of four resource elements: two consecutive subcarriers of the same OFDM symbol and the same two consecutive subcarriers of another OFDM symbol in the same OFDM group use the CDM method to multiplex four DMRS ports, wherein the orthogonal masks are [1, 1, 1, 1], [1, 1, −1, −1], [1, −1, −1, 1] and [1, −1, 1, −1].

Furthermore, when the CP has a normal cyclic prefix length, the second module receives at least one of the following DMRS ports in the $\{1^{st}, 6^{th}, 11^{th}\}$ subcarriers of the OFDM symbol group $\{1, 3, 11, 12\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{1, 3, 11, 12\}$:

DMRS port 9, DMRS port 10, DMRS port 12 and DMRS port 14; or it receives at least one of the following DMRS ports in the $\{1^{st}, 6^{th}, 11^{th}\}$ subcarriers of the OFDM symbol group $\{1, 3, 9, 10\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 9, 10\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 3, 8, 9\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 8, 9\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 3, 7, 8\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 7, 8\}$:

DMRS port 9, DMRS port 10, DMRS port 12, and DMRS port 14; or it receives at least one of the following DMRS ports in the $\{1^{st}, 6^{th}, 11^{th}\}$ subcarriers of the OFDM symbol group $\{1, 3, 5, 6\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 5, 6\}$:

DMRS port 9, DMRS port 10, DMRS port 12, and DMRS port 14; or it receives at least one of the following DMRS ports in the $\{1^{st}, 6^{th}, 11^{th}\}$ subcarriers of the OFDM symbol group $\{1, 3\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3\}$:

DMRS port 9, DMRS port 10, DMRS port 12, and DMRS port 14.

When the CP has a normal cyclic prefix length, the second module receives at least one of the following DMRS ports in the $\{1^{st}, 6^{th}, 11^{th}\}$ subcarriers of the OFDM symbol group $\{1, 3, 10, 12\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 10, 12\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 3, 8, 10\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 8, 10\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 3, 6, 8\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 3, 6, 8\}$:

DMRS port 9, DMRS port 10, DMRS port 12, and DMRS port 14.

When the CP has a normal cyclic prefix length, the second module receives at least one of the following DMRS ports in the $\{1^{st}, 6^{th}, 11^{th}\}$ subcarriers of the OFDM symbol group $\{3, 4, 11, 12\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{3, 4, 11, 12\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{3, 4, 10, 11\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{3, 4, 10, 11\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{3, 4, 9, 10\}$:

DMRS port 7, DMRS port 8, DMRS port 11 and DMRS port 13;

it receives at least one of the following DMRS ports in the $\{0^{th}, 5^{th}, 10^{th}\}$ subcarriers of the OFDM symbol group $\{3, 4, 9, 10\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{3, 4, 8, 9\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{3, 4, 8, 9\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{3, 4\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{3, 4\}$:

DMRS port 9, DMRS port 10, DMRS port 12, and DMRS port 14.

When the CP has a normal cyclic prefix length, the second module receives at least one of the following DMRS ports in the $\{1^{st}, 6^{th}, 11^{th}\}$ subcarriers of the OFDM symbol group $\{2, 3, 11, 12\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{2, 3, 11, 12\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 2, 11, 12\}$:

DMRS port 7, DMRS port 8, DMRS port 11, and DMRS port 13;

it receives at least one of the following DMRS ports in the $\{0^{th}, 5^{th}, 10^{th}\}$ subcarriers of the OFDM symbol group $\{1, 2, 11, 12\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{1, 2, 12, 13\}$:

DMRS port 7, DMRS port 8, DMRS port 11, and DMRS port 13; it receives at least one of the following DMRS ports in the $\{0^{th}, 5^{th}, 10^{th}\}$ subcarriers of the OFDM symbol group $\{1, 2, 12, 13\}$:

DMRS port 9, DMRS port 10, DMRS port 12, and DMRS port 14; or, it receives at least one of the following DMRS ports in the $\{1^{st}, 6^{th}, 11^{th}\}$ subcarriers of the OFDM symbol group $\{0, 1, 12, 13\}$:

DMRS port 7, DMRS port 8, DMRS port 11, and DMRS port 13; or it receives at least one of the following DMRS ports in the $\{0^{th}, 5^{th}, 10^{th}\}$ subcarriers of the OFDM symbol group $\{0, 1, 12, 13\}$:

DMRS port 9, DMRS port 10, DMRS port 12, and DMRS port 14.

It should be noted that, in the abovementioned examples, when the user equipment uses one layer to receive data, the DMRS port 7 or port 8 is transmitted in a corresponding subcarrier resource element of a corresponding OFDM symbol;

when the user equipment uses two layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1];

when the user equipment uses three layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1], and the port 9 is received in a corresponding subcarrier resource element of a corresponding OFDM symbol;

when the user equipment uses four layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks can be [1, 1] and [1, −1], and the DMRS port 9 and port 10 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1];

when the user equipment uses five layers to receive data, the DMRS port 7, port 8 and port 11 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS ports 9 and 10 are received in corresponding subcarriers of corresponding OFDM symbols, and the same subcarriers of two consecutive OFDM symbols or two closest adjacent OFDM symbols use the CDM method to multiplex two DMRS ports, wherein the orthogonal masks are [1, 1] and [1, −1];

when the user equipment uses six layers to receive data, the DMRS port 7, port 8 and port 11 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10 and port 12 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses seven layers to receive data, the DMRS port 7, port 8, port 11 and port 13 are received in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1], and the DMRS port 9, port 10 and port 12 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1];

when the user equipment uses eight layers to receive data, the DMRS port 7, port 8, port 11 and port 13 are received in corresponding subcarriers of corresponding OFDM symbols, and a total of four resource elements: the same subcarriers of four OFDM symbols use the CDM method to multiplex three DMRS ports, wherein the orthogonal masks are any three of [1, 1, 1, 1], [1, 1, −1, −1], [1, −1, −1, 1] and [1, −1, 1, −1], and the DMRS port 9, port 10, port 12 and port 14 are received in corresponding subcarriers of corresponding OFDM symbols, and a total of four resource elements: the same subcarriers of four OFDM symbols use the CDM method to multiplex four DMRS ports, wherein the orthogonal masks are [1, 1, 1, 1], [1, 1, −1, −1], [1, −1, −1, 1] and [1, −1, 1, −1].

When the CP has an extended cyclic prefix length, the second module may also receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{9, 10\}$; or it may receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{8, 9\}$; or it may receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{7, 8\}$; or it may receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{6, 7\}$; or it may receive at least one of the DMRS ports 7 and 8 in the $\{1^{st}, 4^{th}, 7^{th}, 10^{th}\}$ subcarriers of the OFDM symbol group $\{0, 1\}$ and the $\{2^{nd}, 5^{th}, 8^{th}, 11^{th}\}$ subcarriers of the OFDM symbol group $\{3, 4\}$; or it may receive at least one of the DMRS ports 7 and 8 in the $\{1^{st}, 4^{th}, 7^{th}, 10^{th}\}$ subcarriers of the OFDM symbol group $\{0, 1\}$; or, it may receive at least one of the DMRS ports 7 and 8 in the $\{1^{st}, 4^{th}, 7^{th}, 10^{th}\}$ subcarriers of the OFDM symbol group $\{1, 2\}$ and the $\{2^{nd}, 5^{th}, 8^{th}, 11^{th}\}$ subcarriers of the OFDM symbol group $\{10, 11\}$.

When the user equipment uses one layer to receive data, the DMRS port 7 or port 8 is received in a corresponding subcarrier resource element of a corresponding OFDM symbol;

when the user equipment uses two layers to receive data, the DMRS port 7 and port 8 are received in corresponding subcarriers of corresponding OFDM symbols, and two resource elements of the same subcarriers of two consecutive OFDM symbols or two closest adjacent OFDM symbols use the CDM method to multiplex two DMRS ports, wherein the orthogonal masks are [1, 1] and [1, −1].

When the CP has an extended cyclic prefix length, the second module receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or, it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 9\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 8\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 7\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 6\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 3\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol group $\{1, 10\}$; or it receives at least one of the DMRS ports 7 and 8 in the $\{1^{st}, 4^{th}, 7^{th}, 10^{th}\}$ subcarriers of the OFDM symbol group $\{1, 4\}$ and the $\{2^{nd}, 5^{th}, 8^{th}, 11^{th}\}$ subcarriers of the OFDM symbol group $\{8, 10\}$; or it receives at least one of the DMRS ports 7 and 8 in the $\{1^{st}, 2^{nd}, 4^{th}, 5^{th}, 7^{th}, 8^{th}, 10^{th}, 11^{th}\}$ subcarriers of the OFDM symbol $\{1\}$.

It should be noted that, in the abovementioned examples, when the user equipment uses one layer to receive data, the DMRS port 7 or port 8 is received in a corresponding subcarrier of a corresponding OFDM symbol;

when the user equipment uses two layers to receive data, the DMRS port 7 and port 8 are received in corresponding subcarriers of a corresponding OFDM symbol, and two consecutive subcarriers of the same OFDM symbol uses the CDM method to multiplex two DMRS ports, wherein the orthogonal masks are [1, 1] and [1, −1].

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present application is not limited to any specific form of hardware and software combinations. The present application is not limited to the LTE system, the systems in other standards are also included in the protection scope of the present patent if they has the same technology.

The above description is only the preferred embodiments of the patent document and is not intended to limit the protection scope of the patent document. Any modifications, equivalent replacements and improvements and so on made within the spirit and principle of the patent document should be included within the protection scope of the patent document.

INDUSTRIAL APPLICABILITY

The technical scheme of the present application makes the DMRS demodulation performance boost greatly, especially after taking into account its use in the 256QAM modulation method in the future, and balances interpolation performance of various PRB Pairs in one sub-frame, and it also avoids collisions between the DMRS and the RCRS, the PSS/SSS as well as the CSI-RS.

What is claimed is:

1. A method for transmitting a demodulation reference signal, comprising:
a base station transmitting a plurality of demodulation reference signal (DMRS) ports through frequency division multiplexing (FDM) and/or code division multiplexing (CDM) and/or time division multiplexing (TDM); wherein
when the base station uses eight layers to transmit data, DMRS port 7, port 8, port 11 and port 13 transmit data in corresponding subcarriers of corresponding OFDM symbols, and a total of four resource elements: two consecutive subcarriers of a same OFDM symbol and same two consecutive subcarriers of another OFDM symbol in a same OFDM group use the CDM method to multiplex four DMRS ports, wherein orthogonal masks are [1, 1, 1, 1], [1, 1, −1, −1], [1, −1, −1, 1] and [1, −1, 1, −1].

2. The method of claim 1, wherein the base station transmits a DMRS in at least one OFDM group, wherein OFDM symbols x1-xn constitute one OFDM symbol group $\{x1, x2, \ldots xn\}$, xn<14, 0<n<5, and xn and n are integers.

3. The method of claim 2, wherein,
when a cyclic prefix (CP) has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{0, 12\}$:
DMRS port 7, DMRS port 8, DMRS port 11 and DMRS port 13;
the base station transmits one of following DMRS ports in $\{0^{th}, 1^{st}, 5^{th}, 6^{th}, 10^{th}, 11^{th}\}$ subcarriers of OFDM symbol group $\{1, 13\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{0, 9\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{1, 10\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol group $\{0, 8\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{1, 9\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{0, 7\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{0, 5\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{1, 6\}$:
DMRS port 9, DMRS port 10, DMRS port 12 and DMRS port 14; or the base station transmits at least one of following DMRS ports in $\{0^{th}, 1^{st}, 5^{th}, 6^{th}, 10^{th}, 11^{th}\}$ subcarriers of OFDM symbol $\{0\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol $\{1\}$:

DMRS port 9, DMRS port 10, DMRS port 12 and DMRS port 14;
or
when a CP has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{1, 12\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{2, 13\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{1, 9\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{2, 10\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{2, 9\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol group $\{1, 7\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{2, 8\}$:
DMRS port 9, DMRS port 10, DMRS port 12 and DMRS port 14; or the base station symbol group $\{1, 5\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{2, 6\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol $\{1\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol $\{2\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol $\{1\}$:
DMRS port 7 and DMRS port 8;
or
when a CP has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{1, 12\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{3, 13\}$:
DMRS port 9, DMRS port 10, DMRS port 12 and DMRS port 14; or the base station transmits at least one of following DMRS ports in $\{0^{th}, 1^{st}, 5^{th}, 6^{th}, 10^{th}, 11^{th}\}$ subcarriers of OFDM symbol group $\{1, 9\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{3, 10\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{3, 9\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol group $\{1, 7\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{3, 8\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{1, 5\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol group $\{3, 6\}$:
DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol $\{1\}$:
DMRS port 7, DMRS port 8, DMRS port 11 and DMRS port 13;
the base station transmits at least one of following DMRS ports in $\{0^{th}, 1^{st}, 5^{th}, 6^{th}, 10^{th}, 11^{th}\}$ subcarriers of OFDM symbol $\{3\}$:
DMRS port 9, DMRS port 10, DMRS port 12 and DMRS port 14; or,
the base station transmits at least one of following DMRS ports in $\{0^{th}, 1^{st}, 5^{th}, 6^{th}, 10^{th}, 11^{th}\}$ subcarriers of OFDM symbol $\{1\}$:
DMRS port 7 and DMRS port 8.
4. The method of claim 2, wherein when a CP has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{1, 11\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 9, DMRS port 10, DMRS port 12 and DMRS port 14;
or
when a CP has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{1, 10\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 10\}$:
  DMRS port 9, DMRS port 10, DMRS port 12 and DMRS port 14; or
the base station transmits at least one of following DMRS ports in $\{0^{th}, 1^{st}, 5^{th}, 6^{th}, 10^{th}, 11^{th}\}$ subcarriers of OFDM symbol group $\{1, 6\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 8\}$:
  DMRS port 9, DMRS port 10, DMRS port 12 and DMRS port 14;
or
when a CP has a normal cyclic prefix length, the base station transmits at least one of following DMRS ports in $\{0^{th}, 1^{st}, 5^{th}, 6^{th}, 10^{th}, 11^{th}\}$ subcarriers of OFDM symbol group $\{1, 11\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{2, 12\}$:
  DMRS port 9, DMRS port 10, DMRS port 12 and DMRS port 14;
or, the base station transmits at least one of following DMRS ports in $\{0^{th}, 1^{st}, 5^{th}, 6^{th}, 10^{th}, 11^{th}\}$ subcarriers of OFDM symbol group $\{3, 11\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{4, 12\}$:
  DMRS port 9, DMRS port 10, DMRS port 12 and DMRS port 14;
or, the base station transmits at least one of following DMRS ports in $\{0^{th}, 1^{st}, 5^{th}, 6^{th}, 10^{th}, 11^{th}\}$ subcarriers of OFDM symbol group $\{1, 9\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 9, DMRS port 10, DMRS port 12 and DMRS port 14;
or, the base station transmits at least one of following DMRS ports in $\{0^{th}, 1^{st}, 5^{th}, 6^{th}, 10^{th}, 11^{th}\}$ subcarriers of OFDM symbol group $\{1, 9\}$:
  DMRS port 9, DMRS port 10, DMRS port 12 and DMRS port 14;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 7, DMRS port 8, DMRS port 11 and DMRS port 13;
or, the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
  DMRS port 7, DMRS port 8, DMRS port 11 and DMRS port 13;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 9, DMRS port 10, DMRS port 12 and DMRS port 14;
or, the base station transmits at least one of following DMRS ports in $\{0^{th}, 1^{st}, 5^{th}, 6^{th}, 10^{th}, 11^{th}\}$ subcarriers of OFDM symbol group $\{1, 8\}$:
  DMRS port 9, DMRS port 10, DMRS port 12 and DMRS port 14;
  the base station transmits at least one of following DMRS ports in $\{0^{th}, 1^{st}, 5^{th}, 6^{th}, 10^{th}, 11^{th}\}$ subcarriers of OFDM symbol group $\{3, 12\}$:
  DMRS port 7, DMRS port 8, DMRS port 11 and DMRS port 13.

5. The method of claim 2, wherein when a CP has a normal cyclic prefix length, the base station transmits at least one of following DMRS ports in $\{1^{st}, 6^{th}, 11^{th}\}$ subcarriers of OFDM symbol group $\{1, 3, 11, 12\}$:
  DMRS ports 7, 8, 11 and 13;
  the base station transmits at least one of following DMRS ports in $\{0^{th}, 5^{th}, 10^{th}\}$ subcarriers of OFDM symbol group $\{1, 3, 11, 12\}$:
  DMRS port 9, DMRS port 10, DMRS port 12 and DMRS port 14; or
  the base station transmits at least one of following DMRS ports in $\{1^{st}, 6^{th}, 11^{th}\}$ subcarriers of OFDM symbol group $\{1, 3, 9, 10\}$:
  DMRS port 7, DMRS port 8, DMRS port 11 and DMRS port 13;
  the base station transmits at least one of following DMRS ports in $\{0^{th}, 5^{th}, 10^{th}\}$ subcarriers of OFDM symbol group $\{1, 3, 9, 10\}$:
  DMRS port 9, DMRS port 10, DMRS port 12 and DMRS port 14; or,
  the base station transmits at least one of following DMRS ports in $\{1^{st}, 6^{th}, 11^{th}\}$ subcarriers of OFDM symbol group $\{1, 3, 8, 9\}$:
  DMRS port 7, DMRS port 8, DMRS port 11 and DMRS port 13;
  the base station transmits at least one of following DMRS ports in $\{0^{th}, 5^{th}, 10^{th}\}$ subcarriers of OFDM symbol group $\{1, 3, 8, 9\}$:
  DMRS port 9, DMRS port 10, DMRS port 12 and DMRS port 14; or, the base station transmits at least one of following DMRS ports in {1$^{st}$, 6$^{th}$, 11$^{th}$} subcarriers of OFDM symbol group {1, 3, 7, 8}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3, 7, 8}:
DMRS port 9, DMRS port 10, DMRS port 12 and DMRS port 14; or
the base station transmits at least one of following DMRS ports in {1$^{st}$, 6$^{th}$, 11$^{th}$} subcarriers of OFDM symbol group {1, 3, 5, 6}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3, 5, 6}:
DMRS port 9, DMRS port 10, DMRS port 12 and DMRS port 14; or
the base station transmits at least one of following DMRS ports in {1$^{st}$, 6$^{th}$, 11$^{th}$} subcarriers of OFDM symbol group {1, 3}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3}:
DMRS port 9, DMRS port 10, DMRS port 12 and DMRS port 14;
or
when a CP has a normal cyclic prefix length, the base station transmits at least one of following DMRS ports in {1$^{st}$, 6$^{th}$, 11$^{th}$} subcarriers of OFDM symbol group {1, 3, 10, 12}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3, 10, 12}:
DMRS port 9, DMRS port 10, DMRS port 12 and DMRS port 14; or,
the base station transmits at least one of following DMRS ports in {Pt, 6$^{th}$, 11$^{th}$} subcarriers of OFDM symbol group {1, 3, 8, 10}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3, 8, 10}:
DMRS port 9, DMRS port 10, DMRS port 12 and DMRS port 14; or,
the base station transmits at least one of following DMRS ports in {1$^{st}$, 6$^{th}$, 11$^{th}$} subcarriers of OFDM symbol group {1, 3, 6, 8}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 3, 6, 8}:
DMRS port 9, DMRS port 10, DMRS port 12 and DMRS port 14;
or
when a CP has a normal cyclic prefix length, the base station transmits at least one of following DMRS ports in {1$^{st}$, 6$^{th}$, 11$^{th}$} subcarriers of OFDM symbol group {3, 4, 11, 12}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {3, 4, 11, 12}:
DMRS port 9, DMRS port 10, DMRS port 12 and DMRS port 14; or,
the base station transmits at least one of following DMRS ports in {1$^{st}$, 6$^{th}$, 11$^{th}$} subcarriers of OFDM symbol group {3, 4, 10, 11}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {3, 4, 10, 11}:
DMRS port 9, DMRS port 10, DMRS port 12 and DMRS port 14; or,
the base station transmits at least one of following DMRS ports in {1$^{st}$, 6$^{th}$, 11$^{th}$} subcarriers of OFDM symbol group {3, 4, 9, 10}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {3, 4, 9, 10}:
DMRS port 9, DMRS port 10, DMRS port 12 and DMRS port 14; or
the base station transmits at least one of following DMRS ports in {1$^{st}$, 6$^{th}$, 11$^{th}$} subcarriers of OFDM symbol group {3, 4, 8, 9}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {3, 4, 8, 9}:
DMRS port 9, DMRS port 10, DMRS port 12 and DMRS port 14; or
the base station transmits at least one of following DMRS ports in {1$^{st}$, 6$^{th}$, 11$^{th}$} subcarriers of OFDM symbol group {3, 4}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {3, 4}:
DMRS port 9, DMRS port 10, DMRS port 12 and DMRS port 14.

6. The method of claim 2, wherein when a CP has a normal cyclic prefix length, the base station transmits at least one of following DMRS ports in {1$^{st}$, 6$^{th}$, 11$^{th}$} subcarriers of OFDM symbol group {2, 3, 11, 12}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {2, 3, 11, 12}:
DMRS port 9, DMRS port 10, DMRS port 12 and DMRS port 14; or,
the base station transmits at least one of following DMRS ports in {1$^{st}$, 6$^{th}$, 11$^{th}$} subcarriers of OFDM symbol group {1, 2, 11, 12}:
DMRS port 7, DMRS port 8, DMRS port 11 and DMRS port 13;
the base station transmits at least one of following DMRS ports in {0$^{th}$, 5$^{th}$, 10$^{th}$} subcarriers of OFDM symbol group {1, 2, 11, 12}:

DMRS port 9, DMRS port 10, DMRS port 12 and DMRS port 14; or, the base station transmits at least one of following DMRS ports in $\{1^{st}, 6^{th}, 11^{th}\}$ subcarriers of OFDM symbol group $\{1, 2, 12, 13\}$:

DMRS port 7, DMRS port 8, DMRS port 11 and DMRS port 13;

the base station transmits at least one of following DMRS ports in $\{0^{th}, 5^{th}, 10^{th}\}$ subcarriers of OFDM symbol group $\{1, 2, 12, 13\}$:

DMRS port 9, DMRS port 10, DMRS port 12 and DMRS port 14; or, the base station transmits at least one of following DMRS ports in $\{1^{st}, 6^{th}, 11^{th}\}$ subcarriers of OFDM symbol group $\{0, 1, 12, 13\}$:

DMRS port 7, DMRS port 8, DMRS port 11 and DMRS port 13;

the base station transmits at least one of following DMRS ports in $\{0^{th}, 5^{th}, 10^{th}\}$ subcarriers of OFDM symbol group $\{0, 1, 12, 13\}$:

DMRS port 9, DMRS port 10, DMRS port 12 and DMRS port 14.

7. The method of claim 2, wherein when a CP has an extended cyclic prefix length, the base station transmits at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{9, 10\}$; or the base station transmits at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{8, 9\}$; or the base station transmits at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{7, 8\}$; or the base station transmits at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{6, 7\}$; or the base station transmits at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{3, 4\}$; or the base station transmits at least one of DMRS ports 7 and 8 in $\{1^{st}, 4^{th}, 7^{th}, 10^{th}\}$ subcarriers of OFDM symbol group $\{0, 1\}$;

the base station transmits at least one of DMRS ports 7 and 8 in $\{1^{st}, 4^{th}, 7^{th}, 10^{th}\}$ subcarriers of OFDM symbol group $\{1, 2\}$ and $\{2^{nd}, 5^{th}, 8^{th}, 11^{th}\}$ subcarriers of OFDM symbol group $\{10, 11\}$.

8. The method of claim 2, wherein, when a CP has an extended cyclic prefix length, the base station transmits at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 10\}$; or the base station transmits at least one of DMRS ports 7 and 8 in $\{1^{st}, 2^{nd}, 4^{th}, 5^{th}, 7^{th}, 8th, 10^{th}, 11^{th}\}$ subcarriers of OFDM symbol group $\{1, 9\}$; or the base station transmits at least one of DMRS ports 7 and 8 in $\{1^{st}, 2^{nd}, 4^{th}, 5^{th}, 7^{th}, 8th, 10^{th}, 11^{th}\}$ subcarriers of OFDM symbol group $\{1, 8\}$; or the base station transmits at least one of DMRS ports 7 and 8 in $\{1^{st}, 2^{nd}, 4^{th}, 5^{th}, 7^{th}, 8th, 10^{th}, 11^{th}\}$ subcarriers of OFDM symbol group $\{1, 7\}$; or the base station transmits at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 6\}$; or the base station transmits at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 3\}$; or the base station transmits at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol $\{1\}$; or the base station transmits at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 10\}$; or the base station transmits at least one of DMRS ports 7 and 8 in $\{1^{st}, 4^{th}, 7^{th}, 10^{th}\}$ subcarriers of OFDM symbol group $\{1, 4\}$ and $\{2^{nd}, 5^{th}, 8^{th}, 11^{th}\}$ subcarriers of OFDM symbol $\{8, 10\}$.

9. A method for transmitting a demodulation reference signal, comprising:

a user equipment receiving a plurality of demodulation reference signal (DMRS) ports through frequency division multiplexing (FDM) and/or code division multiplexing (CDM) and/or time division multiplexing (TDM); wherein when the user equipment uses eight layers to receive data, DMRS port 7, port 8, port 11 and port 13 receive data in corresponding subcarriers of corresponding OFDM symbols, and a total of four resource elements: two consecutive subcarriers of a same OFDM symbol and same two consecutive subcarriers of another OFDM symbol in a same OFDM group use the CDM method to multiplex four DMRS ports, wherein orthogonal masks are [1, 1, 1, 1], [1, 1, −1, −1], [1, −1, −1, 1] and [1, −1, 1, −1].

10. The method of claim 9, wherein the user equipment receives a DMRS in at least one OFDM symbol group, wherein OFDM symbols x1-xn constitute one OFDM symbol group $\{x1, x2, \ldots xn\}$, xn<14, 0<n<5, and xn and n are integers.

11. The method of claim 10, wherein, when a cyclic prefix (CP) has a normal cyclic prefix length, the user equipment receives at least one of following DMRS ports in $\{0^{th}, 1^{st}, 5^{th}, 6^{th}, 10^{th}, 11^{th}\}$ subcarriers of OFDM symbol group $\{0, 12\}$:

DMRS port 7, DMRS port 8, DMRS port 11 and DMRS port 13;

the user equipment receives one of following DMRS ports in $\{0^{th}, 1^{st}, 5^{th}, 6^{th}, 10^{th}, 11^{th}\}$ subcarriers of OFDM symbol group $\{1, 13\}$:

DMRS port 9, DMRS port 10, DMRS port 12 and DMRS port 14; or the user equipment receives at least one of following DMRS ports in $\{0^{th}, 1^{st}, 5^{th}, 6^{th}, 10^{th}, 11^{th}\}$ subcarriers of OFDM symbol group $\{0, 9\}$:

DMRS port 7, DMRS port 8, DMRS port 11 and DMRS port 13;

the user equipment receives at least one of following DMRS ports in $\{0^{th}, 1^{st}, 5^{th}, 6^{th}, 10^{th}, 11^{th}\}$ subcarriers of OFDM symbol group $\{1, 10\}$:

DMRS port 9, DMRS port 10, DMRS port 12 and DMRS port 14; or, the user equipment receives at least one of following DMRS ports in $\{0^{th}, 1^{st}, 5^{th}, 6^{th}, 10^{th}, 11^{th}\}$ subcarriers of OFDM symbol group $\{0, 8\}$:

DMRS port 7, DMRS port 8, DMRS port 11 and DMRS port 13;

the user equipment receives at least one of following DMRS ports in $\{0^{th}, 1^{st}, 5^{th}, 6^{th}, 10^{th}, 11^{th}\}$ subcarriers of OFDM symbol group $\{1, 9\}$:

DMRS port 9, DMRS port 10, DMRS port 12 and DMRS port 14; or the user equipment receives at least one of following DMRS ports in {0$^{th}$, 1$^{st}$, 5$^{th}$, 6$^{th}$, 10$^{th}$, 11$^{th}$} subcarriers of OFDM symbol group {0, 7}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 8}:
DMRS port 9, DMRS port 10, DMRS port 12 and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {0, 5}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 6}:
DMRS port 9, DMRS port 10, DMRS port 12 and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {0}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1}:
DMRS port 9, DMRS port 10, DMRS port 12 and DMRS port 14;
or
when a CP has a normal cyclic prefix length, the user equipment at least receives one of following DMRS ports in {0$^{th}$, 1$^{st}$, 5$^{th}$, 6$^{th}$, 10$^{th}$, 11$^{th}$} subcarrier of OFDM symbol group {1, 12}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 13}:
DMRS port 9, DMRS port 10, DMRS port 12 and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 9}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 10}:
DMRS port 9, DMRS port 10, DMRS port 12 and DMRS port 14; or,
the user equipment receives at least one of following DMRS ports in {0$^{th}$, 1$^{st}$, 5$^{th}$, 6$^{th}$, 10$^{th}$, 11$^{th}$} subcarrier of OFDM symbol group {1, 8}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 9}:
DMRS port 9, DMRS port 10, DMRS port 12 and DMRS port 14; or,
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 7}:
DMRS port 7, DMRS port 8, DMRS port 11 and DMRS port 13;

the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 8}:
DMRS port 9, DMRS port 10, DMRS port 12 and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 5}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 6}:
DMRS port 9, DMRS port 10, DMRS port 12 and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol {1}:
DMRS port 7, DMRS port 8, DMRS port 11 and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol {2}:
DMRS port 9, DMRS port 10, DMRS port 12 and DMRS port 14; or,
the user equipment receives at least one of DMRS port 7 and DMRS port 8 in {0$^{th}$, 1$^{st}$, 5$^{th}$, 6$^{th}$, 10$^{th}$, 11$^{th}$} subcarriers of OFDM symbol {1};
or
when a CP has a normal cyclic prefix length, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 12}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarrier of OFDM symbol group {3, 13}:
DMRS port 9, DMRS port 10, DMRS port 12, and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 9}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 10}:
DMRS port 9, DMRS port 10, DMRS port 12, and DMRS port 14; or,
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 8}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 9}:
DMRS port 9, DMRS port 10, DMRS port 12, and DMRS port 14; or,
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 7}:
DMRS port 7, DMRS port 8, DMRS port 11, and DMRS port 13;

the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 8}:
DMRS port 9, DMRS port 10, DMRS port 12, and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 5}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 6}:
DMRS port 9, DMRS port 10, DMRS port 12, and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol {1}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol {3}:
DMRS port 9, DMRS port 10, DMRS port 12, and DMRS port 14; or,
the user equipment receives at least one of DMRS port 7 and DMRS port 8 in {0$^{th}$, 1$^{st}$, 5$^{th}$, 6$^{th}$, 10$^{th}$, 11$^{th}$} subcarriers of OFDM symbol 111.

12. The method of claim 10, wherein,
when a CP has a normal cyclic prefix length, the user equipment at least receives one of following DMRS ports in {0$^{th}$, 1$^{st}$, 5$^{th}$, 6$^{th}$, 10$^{th}$, 11$^{th}$} subcarriers of OFDM symbol group {1, 11}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 9, DMRS port 10, DMRS port 12, and DMRS port 14;
or
when a CP has a normal cyclic prefix length, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 10}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 9, DMRS port 10, DMRS port 12, and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 8}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 10}:
DMRS port 9, DMRS port 10, DMRS port 12, and DMRS port 14; or
the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 6}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 8}:
DMRS port 9, DMRS port 10, DMRS port 12, and DMRS port 14;
or
when a CP has a normal cyclic prefix length, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 11}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {2, 12}:
DMRS port 9, DMRS port 10, DMRS port 12, and DMRS port 14;
or, the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 11}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {4, 12}:
DMRS port 9, DMRS port 10, DMRS port 12, and DMRS port 14;
or, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 9}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 9, DMRS port 10, DMRS port 12, and DMRS port 14;
or, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 9}:
DMRS port 9, DMRS port 10, DMRS port 12, and DMRS port 14;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 7, DMRS port 8, DMRS port 11, and DMRS port 13;
or, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 8}:
DMRS port 7, DMRS port 8, DMRS port 11, and DMRS port 13;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 9, DMRS port 10, DMRS port 12, and DMRS port 14;
or, the user equipment receives at least one of following DMRS ports in {0$^{th}$, 1$^{st}$, 5$^{th}$, 6$^{th}$, 10$^{th}$, 11$^{th}$} subcarriers of OFDM symbol group {1, 8}:
DMRS port 9, DMRS port 10, DMRS port 12, and DMRS port 14;
the user equipment receives at least one of following DMRS ports in {0$^{th}$, 1$^{st}$, 5$^{th}$, 6$^{th}$, 10$^{th}$, 11$^{th}$} subcarriers of OFDM symbol group {3, 12}:
DMRS port 7, DMRS port 8, DMRS port 11, and DMRS port 13.

13. The method of claim 10, wherein, when a CP has a normal cyclic prefix length, the user equipment receives at least one of following DMRS ports in $\{1^{st}, 6^{th}, 11^{th}\}$ subcarriers of OFDM symbol group $\{1, 3, 11, 12\}$:
DMRS port 7, DMRS port 8, DMRS port 11 and DMRS port 13;

the user equipment receives at least one of following DMRS ports in $\{0^{th}, 5^{th}, 10^{th}\}$ subcarriers of OFDM symbol group $\{1, 3, 11, 12\}$:
DMRS port 9, DMRS port 10, DMRS port 12 and DMRS port 14; or the user equipment receives at least one of following DMRS ports in $\{1^{st}, 6^{th}, 11^{th}\}$ subcarriers of OFDM symbol group $\{1, 3, 9, 10\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 9, 10\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 3, 8, 9\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 8, 9\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 3, 7, 8\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 7, 8\}$:
DMRS port 9, DMRS port 10, DMRS port 12, and DMRS port 14; or the user equipment receives at least one of following DMRS ports in $\{1^{st}, 6^{th}, 11^{th}\}$ subcarriers of OFDM symbol group $\{1, 3, 5, 6\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 5, 6\}$:
DMRS port 9, DMRS port 10, DMRS port 12, and DMRS port 14; or the user equipment receives at least one of following DMRS ports in $\{1^{st}, 6^{th}, 11^{th}\}$ subcarriers of OFDM symbol group $\{1, 3\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3\}$:
DMRS port 9, DMRS port 10, DMRS port 12, and DMRS port 14.

14. The method of claim 10, wherein, when a CP has a normal cyclic prefix length, the user equipment receives at least one of following DMRS ports in $\{1^{st}, 6^{th}, 11^{th}\}$ subcarriers of OFDM symbol group $\{1, 3, 10, 12\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 10, 12\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 3, 8, 10\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 8, 10\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 3, 6, 8\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 3, 6, 8\}$:
DMRS port 9, DMRS port 10, DMRS port 12, and DMRS port 14.

15. The method of claim 10, wherein, when a CP has a normal cyclic prefix length, the user equipment receives at least one of following DMRS ports in $\{1^{st}, 6^{th}, 11^{th}\}$ subcarriers of OFDM symbol group $\{3, 4, 11, 12\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{3, 4, 11, 12\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{3, 4, 10, 11\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{3, 4, 10, 11\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{3, 4, 9, 10\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{3, 4, 9, 10\}$:
DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{3, 4, 8, 9\}$:
DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{3, 4, 8, 9\}$:

DMRS port 9, DMRS port 10, DMRS port 12, and DMRS port 14; or the user equipment receives at least one of following DMRS ports in $\{1^{st}, 6^{th}, 11^{th}\}$ subcarriers of OFDM symbol group $\{3, 4\}$:

DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{3, 4\}$:

DMRS port 9, DMRS port 10, DMRS port 12, and DMRS port 14.

16. The method of claim 10, wherein, when a CP has a normal cyclic prefix length, the user equipment receives at least one of following DMRS ports in $\{1^{st}, 6^{th}, 11^{th}\}$ subcarriers of OFDM symbol group $\{2, 3, 11, 12\}$:

DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{2, 3, 11, 12\}$:

DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 2, 11, 12\}$:

DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 2, 11, 12\}$:

DMRS port 9, DMRS port 10, DMRS port 12, and DMRS port 14; or, the user equipment receives at least one of following DMRS ports in $\{1^{st}, 6^{th}, 11^{th}\}$ subcarriers of OFDM symbol group $\{1, 2, 12, 13\}$:

DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{1, 2, 12, 13\}$:

DMRS port 9, DMRS port 10, DMRS port 12, and DMRS port 14; or the user equipment receives at least one of following DMRS ports in $\{1^{st}, 6^{th}, 11^{th}\}$ subcarriers of OFDM symbol group $\{0, 1, 12, 13\}$:

DMRS port 7, DMRS port 8, DMRS port 11, and DMRS port 13;

the user equipment receives at least one of following DMRS ports in $\{0^{th}, 5^{th}, 10^{th}\}$ subcarriers of OFDM symbol group $\{0, 1, 12, 13\}$:

DMRS port 9, DMRS port 10, DMRS port 12, and DMRS port 14.

17. The method of claim 10, wherein, when a CP has an extended cyclic prefix length, the user equipment receives at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{9, 10\}$; or the user equipment receives at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{8, 9\}$; or the user equipment receives at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{7, 8\}$; or the user equipment receives at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{6, 7\}$; or the user equipment receives at least one of DMRS ports 7 and 8 in $\{1^{st}, 4^{th}, 7^{th}, 10^{th}\}$ subcarriers of OFDM symbol group $\{0, 1\}$ and $\{2^{nd}, 5^{th}, 8^{th}, 11^{th}\}$ subcarriers of OFDM symbol group $\{3, 4\}$; or the user equipment receives at least one of DMRS ports 7 and 8 in $\{1^{st}, 4^{th}, 7^{th}, 10^{th}\}$ subcarriers of OFDM symbol group $\{0, 1\}$; or the user equipment receives at least one of DMRS ports 7 and 8 in $\{1^{st}, 4^{th}, 7^{th}, 10^{th}\}$ subcarriers of OFDM symbol group $\{1, 2\}$ and $\{2^{nd}, 5^{th}, 8^{th}, 11^{th}\}$ subcarriers of OFDM symbol $\{10, 11\}$.

18. The method of claim 10, wherein, when a CP has an extended cyclic prefix length, the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 10\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 9\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 8\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 7\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 6\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 3\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol group $\{1, 10\}$; or the user equipment receives at least one of DMRS ports 7 and 8 in $\{1^{st}, 4^{th}, 7^{th}, 10^{th}\}$ subcarriers of OFDM symbol group $\{1, 4\}$ and $\{2^{nd}, 5^{th}, 8^{th}, 11^{th}\}$ subcarriers of OFDM symbol $\{8, 10\}$; or the user equipment receives at least one of DMRS ports 7 and 8 in $\{1^{st}, 2^{nd}, 4^{th}, 5^{th}, 7^{th}, 8^{th}, 10^{th}, 11^{th}\}$ subcarriers of OFDM symbol $\{1\}$.

19. A base station, wherein the base station comprises:

a first module, configured to: perform frequency division multiplexing (FDM) and/or code division multiplexing (CDM) and/or time division multiplexing (TDM) on a plurality of demodulation reference signal (DMRS) ports;

a second module, configured to: transmit a multiplexed DMRS; wherein when the base station uses eight layers to transmit data, DMRS port 7, port 8, port 11 and port 13 transmit data in corresponding subcarriers of corresponding OFDM symbols, and a total of four resource elements: two consecutive subcarriers of a same OFDM symbol and same two consecutive subcarriers of another OFDM symbol in a same OFDM group use the CDM method to multiplex four DMRS ports, wherein orthogonal masks are [1, 1, 1, 1], [1, 1, −1, −1], [1, −1, −1, 1] and [1, −1, 1, −1].

20. A user equipment, wherein the user equipment comprises:

a first module, configured to: store multiplexing information of demodulation reference signal (DMRS) ports, wherein the multiplexing information refers to: a DMRS going through frequency division multiplexing (FDM) and/or code division multiplexing (CDM) and/or time division multiplexing (TDM);

a second module, configured to: receive a plurality of demodulation reference signal (DMRS) ports; wherein when the user equipment uses eight layers to receive data, DMRS port 7, port 8, port 11 and port 13 receive data in corresponding subcarriers of corresponding OFDM symbols, and a total of four resource elements: two consecutive subcarriers of a same OFDM symbol and same two consecutive subcarriers of another OFDM symbol in a same OFDM group use the CDM method to multiplex four DMRS ports, wherein orthogonal masks are [1, 1, 1, 1], [1, 1, −1, −1], [1, −1, −1, 1] and [1, −1, 1, −1].

* * * * *